US012789274B2

(12) United States Patent
Ming et al.

(10) Patent No.: US 12,789,274 B2
(45) Date of Patent: Nov. 10, 2026

(54) ONE-HANDED BLADE CHANGE MECHANISM FOR A POWER TOOL

(71) Applicant: TECHTRONIC CORDLESS GP, Anderson, SC (US)

(72) Inventors: Qiang Ming, Dongguan (CN); Peng Zhang, Dongguan (CN); Yang Liu, Dongguan (CN); Teo Scott, Anderson, SC (US); Patrick Sullivan, Anderson, SC (US); Zachary P. Scott, Pendleton, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 332 days.

(21) Appl. No.: 18/496,085

(22) Filed: Oct. 27, 2023

(65) Prior Publication Data

US 2024/0149359 A1 May 9, 2024

Related U.S. Application Data

(60) Provisional application No. 63/381,496, filed on Oct. 28, 2022.

(51) Int. Cl.
*B23D 51/10* (2006.01)
*B23D 49/16* (2006.01)

(52) U.S. Cl.
CPC ............. *B23D 51/10* (2013.01); *B23D 49/16* (2013.01)

(58) Field of Classification Search
CPC ........ B23D 51/10; B23D 49/16; B23D 51/08; B23D 49/14; B23D 49/162; B23D 49/167;

(Continued)

(56) References Cited

U.S. PATENT DOCUMENTS 5,487,221 A 1/1996 Oda et al.
5,573,255 A 11/1996 Salpaka (Continued)

FOREIGN PATENT DOCUMENTS

CN 2647482 Y 10/2004
CN 201009009 Y 1/2008

(Continued)

OTHER PUBLICATIONS

Extended European Search Report for Application No. 23206056.6 dated Feb. 2, 2024 (9 pages).

*Primary Examiner* — Ghassem Alie
(74) *Attorney, Agent, or Firm* — Michael Best & Friedrich LLP

(57) ABSTRACT

A blade change mechanism configured to attach a blade to a transmission rod of a power tool, the blade change mechanism including a support body, a blade retention structure, and a component. The blade retention structure is coupled to the support body and includes a blade retention component movable to hold the blade in a locked state in response to engagement of the blade with the blade change mechanism on insertion of the blade. The component is movable to vary the blade retention component to hold the blade in the locked state. The component is further movable to vary the blade retention component to an unlocked state in which the blade retention structure is disengaged from the blade. The blade retention structure is held in the unlocked state absent the blade being fully inserted into the blade change mechanism.

11 Claims, 38 Drawing Sheets

(58) Field of Classification Search
CPC .. B23D 61/123; B23D 31/1072; B27B 19/00; B27B 19/02; Y10T 279/17717; Y10T 279/17752; Y10T 83/9481; Y10T 83/9461
USPC .......... 30/166.3, 339, 392, 394, 523; 279/81
See application file for complete search history.

(56) References Cited

U.S. PATENT DOCUMENTS

| | | | | |
|---|---|---|---|---|
| 5,575,071 | A | 11/1996 | Phillips et al. | |
| 5,819,421 | A | 10/1998 | Giacometti et al. | |
| 5,946,810 | A | 9/1999 | Hoelderlin et al. | |
| 6,047,477 | A | 4/2000 | Di Nicolantonio | |
| 6,209,208 | B1 | 4/2001 | Marinkovich et al. | |
| 6,276,065 | B1 | 8/2001 | Osada et al. | |
| 6,308,425 | B1 | 10/2001 | Schumann | |
| 6,612,039 | B2 | 9/2003 | Kakiuchi et al. | |
| 6,725,548 | B1 | 4/2004 | Kramer et al. | |
| 6,735,876 | B2 | 5/2004 | Hirabayashi | |
| 6,810,782 | B2 | 11/2004 | Wuensch et al. | |
| 6,851,194 | B1 * | 2/2005 | Chen | B23D 51/10 30/392 |
| 7,040,023 | B2 * | 5/2006 | Nemazi | B23D 51/10 279/81 |
| 7,111,405 | B2 | 9/2006 | Delfini et al. | |
| 7,251,897 | B2 | 8/2007 | Shuhua | |
| 7,441,338 | B2 | 10/2008 | Delfini et al. | |
| 7,665,216 | B2 | 2/2010 | Yasheng | |
| 7,748,125 | B2 | 7/2010 | Rakaczki | |
| 7,861,418 | B2 | 1/2011 | Kretschmar et al. | |
| 7,871,080 | B2 | 1/2011 | Marini et al. | |
| 8,024,865 | B2 | 9/2011 | Kaiser et al. | |
| 8,082,671 | B2 | 12/2011 | Saegesser | |
| 8,117,757 | B2 | 2/2012 | Kuo | |
| 8,181,973 | B2 | 5/2012 | Dezheng et al. | |
| 8,272,135 | B2 | 9/2012 | Zhou | |
| 8,393,625 | B2 | 3/2013 | Marini et al. | |
| 8,641,049 | B2 | 2/2014 | Marini et al. | |
| 8,813,372 | B2 | 8/2014 | Scott | |
| 8,813,373 | B2 | 8/2014 | Scott | |
| 9,038,278 | B2 | 5/2015 | Kani et al. | |
| 9,205,502 | B2 | 12/2015 | Sugino | |
| 10,029,322 | B2 | 7/2018 | Van Wambeke et al. | |
| 10,661,364 | B2 | 5/2020 | Laett | |
| 10,835,972 | B2 | 11/2020 | Wyler | |
| 11,065,698 | B2 | 7/2021 | Cholst et al. | |
| 2004/0035010 | A1 | 2/2004 | Kakiuchi et al. | |
| 2004/0163264 | A1 | 8/2004 | Simonz | |
| 2005/0246901 | A1 | 11/2005 | Chengdao et al. | |
| 2007/0131075 | A1 | 6/2007 | Zhang et al. | |
| 2009/0071015 | A1 | 3/2009 | Scott | |
| 2009/0277022 | A1 * | 11/2009 | Limberg | B23D 51/10 279/81 |
| 2013/0174426 | A1 | 7/2013 | Saegesser et al. | |
| 2020/0353546 | A1 | 11/2020 | Hu et al. | |
| 2021/0046562 | A1 | 2/2021 | Zhou | |
| 2021/0213548 | A1 | 7/2021 | Castanos et al. | |
| 2021/0308778 | A1 | 10/2021 | Cholst et al. | |

FOREIGN PATENT DOCUMENTS

| | | | | |
|---|---|---|---|---|
| CN | 201009010 | Y | 1/2008 | |
| CN | 100453226 | C | 1/2009 | |
| CN | 100453227 | C | 1/2009 | |
| CN | 201537748 | U | 8/2010 | |
| CN | 102059397 | A | 5/2011 | |
| CN | 201906886 | U | 7/2011 | |
| CN | 202212648 | U | 5/2012 | |
| CN | 202701497 | U | 1/2013 | |
| CN | 102962516 | A | 3/2013 | |
| CN | 203804326 | U | 9/2014 | |
| CN | 205764199 | U | 12/2016 | |
| CN | 206356659 | U | 7/2017 | |
| CN | 108544021 | A | 9/2018 | |
| CN | 208276286 | U | 12/2018 | |
| CN | 109332810 | A | 2/2019 | |
| CN | 209407569 | U | 9/2019 | |
| CN | 213379625 | U | 6/2021 | |
| CN | 113275655 | A | 8/2021 | |
| CN | 215238252 | U | 12/2021 | |
| DE | 4102011 | A1 | 12/1991 | |
| DE | 9305188 | U1 | 6/1993 | |
| DE | 19532494 | A1 | 3/1997 | |
| DE | 10163177 | A1 | 7/2003 | |
| DE | 102020212319 | A1 | 3/2022 | |
| DE | 102020212320 | A1 | 3/2022 | |
| EP | 0623413 | A1 | 11/1994 | |
| EP | 0732165 | A1 | 9/1996 | |
| EP | 0940210 | A1 | 9/1999 | |
| EP | 1172167 | A1 | 1/2002 | |
| EP | 2236233 | A1 | 10/2010 | |
| EP | 2554314 | A1 | 2/2013 | |
| EP | 2641685 | A2 * | 9/2013 | B23D 61/123 |
| EP | 3520942 | A1 | 8/2019 | |
| EP | 3636371 | A1 | 4/2020 | |
| GB | 2302060 | A | 1/1997 | |
| GB | 2336805 | A | 11/1999 | |
| GB | 2338205 | A | 12/1999 | |
| GB | 2344563 | A | 6/2000 | |
| WO | 9527583 | A1 | 10/1995 | |
| WO | 2004054746 | A1 | 7/2004 | |

* cited by examiner

ONE-HANDED BLADE CHANGE MECHANISM FOR A POWER TOOL

CROSS-REFERENCE TO RELATED APPLICATION

This application claims the benefit of U.S. Provisional Patent Application No. 63/381,496, filed Oct. 28, 2022, the entire content of which is incorporated herein by reference.

TECHNICAL FIELD

The present disclosure relates to power tools, and more particularly to blade change mechanisms and the like.

BACKGROUND

Cutting tools, such as reciprocating saws, typically include a clamp for securing a cutting blade thereto. Such blade clamps may be adjustable between a locked configuration, where the blade is secured to a portion of a cutting tool, and an unlocked configuration, where the blade is removable from the portion of the cutting tool.

SUMMARY

In one independent aspect, a blade change mechanism includes a blade retention structure and a blade release structure. The blade retention structure is configured to hold the blade in a locked position on engagement of the blade with the blade change mechanism. The blade release structure is configured to disengage the blade retention structure from the blade as the blade change mechanism is transitioned from the locked position to an unlocked position in response to movement of a component of the blade release structure.

In some aspects, the user may hold the blade and apply force to the blade and thus the blade retention component to move the blade retention component to the locked position.

In some aspects, the user may hold the blade release component to apply a force to disengage the blade from the blade retention component.

In some aspects, the blade change mechanism may include a component having a cam surface which forces a pin to press against the blade in a locked position thereof.

In some aspects, the blade change mechanism may include a compression spring configured to hold the blade change mechanism in an unlocked position.

In some aspects, the blade change mechanism may include a tension spring configured to bias a component of the blade change mechanism toward an unlocked position.

In some aspects, the component is an eject bar which is configured to eject the blade from the blade change mechanism as the blade change mechanism is moved from the locked position to the unlocked position.

In some aspects, the blade change mechanism includes a component configured to abut the blade as the blade is connected to the blade change mechanism.

In some aspects, the component is a finger configured to abut a base surface of the blade.

In some aspects, the component is a projection configured to abut a finger of the blade.

In some aspects, the blade change mechanism includes a first component having a first ramp and a second component having a second ramp which engages the first ramp to hold the blade change mechanism in the locked position.

In some aspects, the first component is rotatable relative to the second component to transition the blade change mechanism between the locked position and the unlocked position.

In some aspects, at least one of the first component and the second component includes a block configured to hold the blade change mechanism in the unlocked position.

In some aspects, the user may secure the blade to the blade change mechanism or release the blade from the blade change mechanism with a single hand.

In another independent aspect, a blade change mechanism configured to attach a blade to a transmission rod of a power tool, the blade change mechanism including a support body, a blade retention structure, and a component. The blade retention structure is coupled to the support body and includes a blade retention component movable to hold the blade in a locked state in response to engagement of the blade with the blade change mechanism on insertion of the blade. The component is movable to vary the blade retention component to hold the blade in the locked state. The component is further movable to vary the blade retention component to an unlocked state in which the blade retention structure is disengaged from the blade. The blade retention structure is held in the unlocked state absent the blade being fully inserted into the blade change mechanism.

In another independent aspect, a blade change mechanism configured to attach a blade to a transmission rod of a power tool, the blade change mechanism including a trigger sleeve, a cam, and a pin. The trigger sleeve includes a first retaining structure having a tab or a cavity. The cam includes a cam surface and a second retaining structure having the other of the tab or the cavity. The pin is movable on movement of the cam between a locked position in which the blade is coupled to the transmission rod and an unlocked position in which the blade is decoupled from the transmission rod. The pin is movable to the locked position in response to insertion of the blade into the blade change mechanism and movement of the cam and cam surface. The pin is configured to be held in the unlocked state by engagement of the first retaining structure and the second retaining structure.

In another independent aspect, a blade clamp mechanism configured to attach a blade to a transmission rod of a power tool, the blade change mechanism including a trigger sleeve, a cam, and a pin. The trigger sleeve includes a bar. The cam includes a cam surface and an abutment surface. The pin is movable upon movement of the cam between a locked position in which the blade is attached to the transmission rod and an unlocked position in which the blade is detached from the transmission rod. The pin is moved to the locked position in response to insertion of the blade into the blade change mechanism and movement of the cam and cam surface. The cam is held in an unlocked state corresponding with the unlocked position of the pin by engagement of the abutment surface and the bar.

Other aspects of the disclosure will become apparent by consideration of the detailed description and accompanying drawings.

DETAILED DESCRIPTION

Before any aspects are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
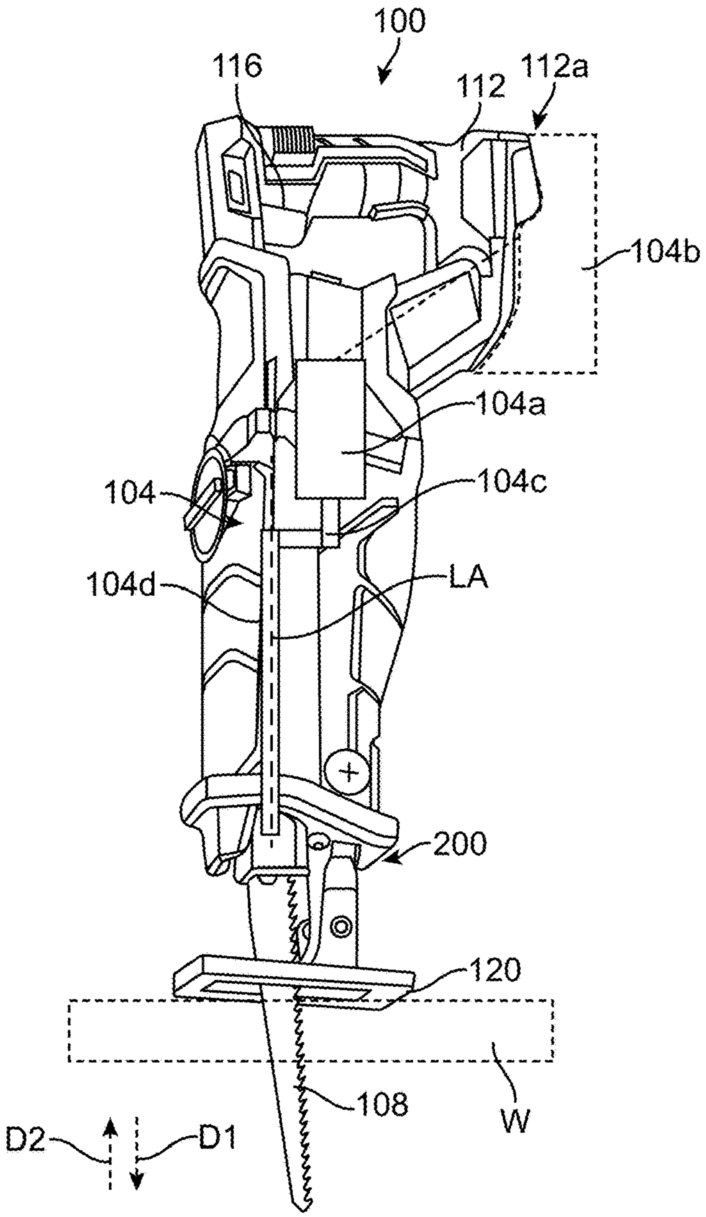
FIG. 1 is a side view of an exemplary power tool such as a reciprocating saw including a blade change mechanism.

FIG. 1 illustrates an exemplary power tool 100 (e.g., illustrated as a reciprocating saw 100) including a drive mechanism 104 that is configured to drive a blade 108. The drive mechanism 104 includes a motor 104*a* that is operatively connected to a battery pack 104*b* to receive power from the battery pack 104*b*. The motor 104*a* includes an output shaft 104*c* that drives a transmission rod 104*d*. The power tool 100 also includes a housing 112 that has a battery receptacle 112*a* to support and receive the battery pack 104*b*. The power tool 100 further includes a trigger 116 that, when actuated (e.g., depressed or engaged), supplies power from the battery pack 104*b* to the motor 104*a* to power the drive mechanism 104. The illustrated power tool 100 further includes a shoe 120 that is coupled to the housing 112 and that contacts a workpiece W when the power tool 100 is placed on, over, or against the workpiece W during a cutting action.

The transmission rod 104*d* is coupled to the blade 108 via a blade change or blade clamp mechanism 200. The blade change mechanism 200 is movable between a locked position in which the blade 108 is secured to the drive mechanism 104 and an unlocked position in which the blade 108 is removable from (e.g., removably coupled to) drive mechanism 104. In the exemplary blade change mechanism 200, the blade 108 may be ejected as the blade change mechanism 200 reaches or nears the unlocked position. The blade change mechanism 200 (FIG. 3) may include a longitudinal axis LA that substantially aligns with (e.g., within +/−5 degrees) a rod axis RA of the transmission rod 104*d* and, when the blade 108 (FIG. 2) is secured to the drive mechanism 104 via the blade change mechanism 200 in a slot 106 (FIG. 8A) of the transmission rod 104*d*, the blade 108 extends along the longitudinal axis LA. When the blade 108 is attached to the power tool 100, the drive mechanism 104 may provide motive force to reciprocate the blade 108 to make a cut in the workpiece W as the reciprocating saw 100 moves relative to the workpiece W (or vice versa). In the illustrated construction, when the blade 108 is coupled to the blade change mechanism 200, the blade 108 is configured to reciprocate (e.g., elliptical reciprocation, linear reciprocation, etc.) along a first direction D1 (e.g., a plunging direction) extending away from the housing 112 (FIG. 1) and an opposite, second direction D2 (e.g., a retracting direction) extending generally toward the housing 112. The first direction D1 and the second direction D2 are each substantially aligned with the longitudinal axis LA.

Figure 2:
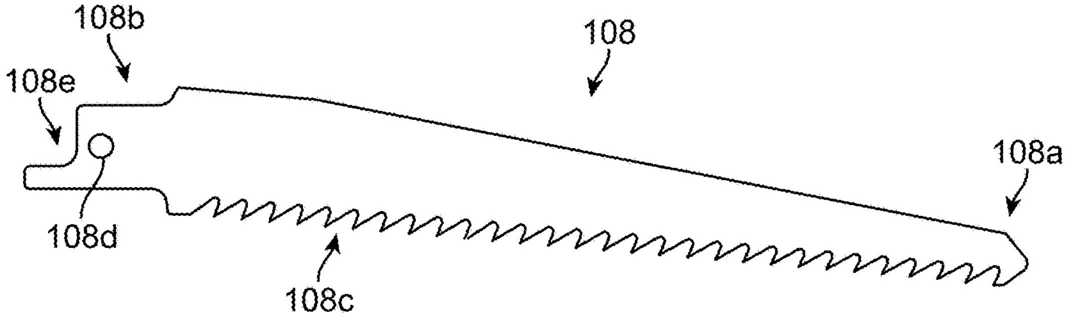
FIG. 2 is a side view of a blade for the reciprocating saw of FIG. 1.

FIG. 2 illustrates the exemplary blade 108 that includes a tip end 108*a*, an opposite base end 108*b*, and a plurality of teeth 108*c* on one side of the blade 108 between the tip end 108*a* and the base end 108*b*. The base end 108*b* is configured to be coupled to the drive mechanism 104 and has a hole 108*d* and a tab 108*e* extending from the base end 108*b*. As will be explained in detail below, in some embodiments of the blade change mechanism 200, either the base end 108*b* or the finger 108*e* are configured to press on a component of the blade change mechanism 200 to lock the blade 108 to the drive mechanism 104. In the locked position, a component of the blade change mechanism 200 may at least partially engage the hole 108*d* to hold the blade 108 in the locked (e.g., secured) position.

Figure 3:
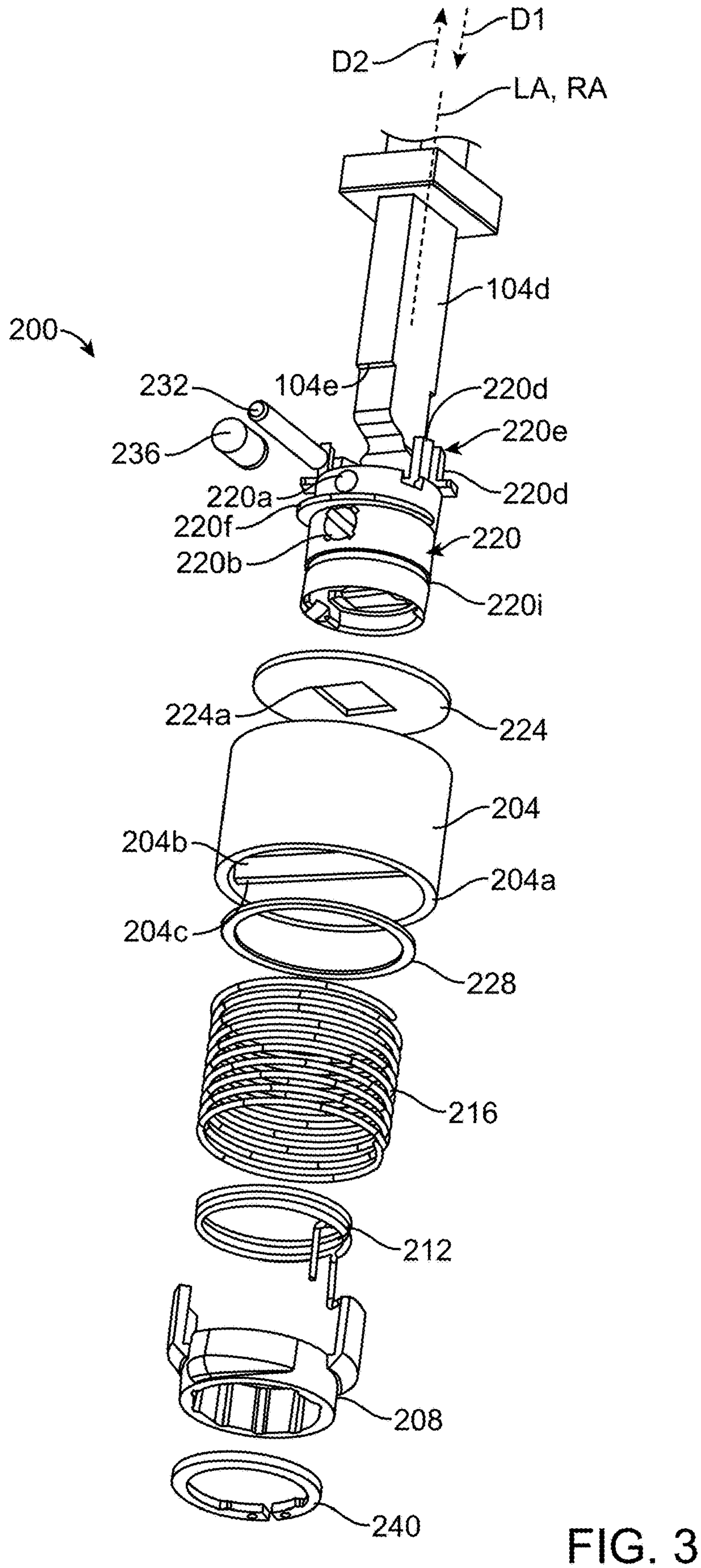
FIG. 3 is an exploded view of an exemplary blade change mechanism including an eject sleeve, a clamp body, a trigger sleeve, a torsional spring, and a compression spring.

FIG. 3 illustrates the blade change mechanism 200 in an exploded view. The blade change mechanism 200 may include a trigger sleeve 204, an eject sleeve 208, a torsional spring 212, a compression spring 216, a clamp body 220, a first washer 224, a second washer 228, a pin 232, a lock pin 236, and a retainer 240. The blade change mechanism 200 is movable between a locked position or state (FIGS. 6A, 7A) and an unlocked position or state (FIGS. 6C, 6D, 7B) to secure the blade 108 to the drive mechanism 104. While moving between the locked position and the unlocked position, the blade change mechanism 200 may be temporarily oriented in a transition position or state (FIG. 6C).

The trigger sleeve 204 may include an annular body 204*a* and a bar 204*b* that spans the interior of the annular body 204*a* (i.e., the bar 204*b* defines a secant of the annular body 204*a* when viewed from an end of the annular body 204*a*). The bar 204*b* includes a first end surface 204*c* which faces the first direction D1 and a second end surface 204*d* (FIGS. 6A-6D) that is opposite the first end surface 204*c* and faces the second direction D2. As best illustrated in FIGS. 6A-6D, the trigger sleeve 204 is biased in the first direction D1 which, as will be described below, corresponds with the locked position of the blade change mechanism 200.

Figure 4A:
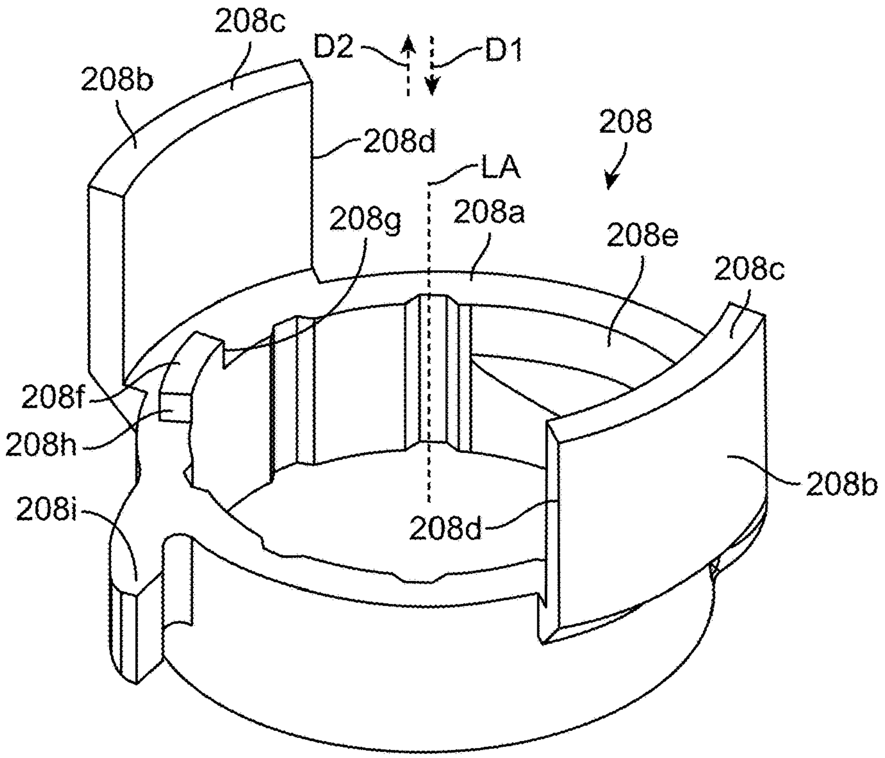
FIG. 4A is a perspective view of the eject sleeve blade change mechanism of FIG. 3.
Figure 4B:
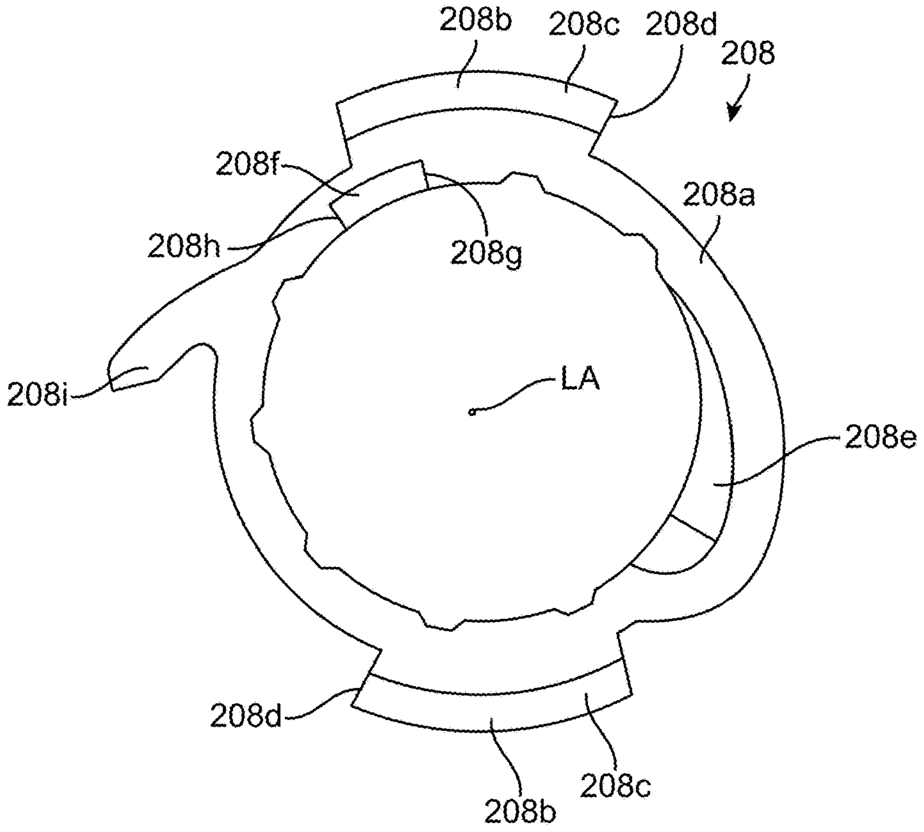
FIG. 4B is an end view of the eject sleeve of FIG. 4A.

With reference to FIGS. 3, 4A, and 4B the eject sleeve 208 is generally annular in shape and includes a body 208*a* with sidewalls 208*b* that extend from opposite sides of an outer periphery of the body 208*a* along the axis LA. As shown, the sidewalls 208*b* have end surfaces 208*c* and abutment surfaces 208*d* disposed between the end surfaces 208*c* and the body 208*a*. The interior of the body 208*a* defines a cam surface 208*e*. The eject sleeve 208 further includes a projection 208*f* that is positioned adjacent the inner annulus of the body 208*a*. The projection 208*f* extends in the first direction D1 from the body 208*a* and forms a first stop surface 208*g* one side and a second stop surface 208*h* at an opposite side. The eject sleeve 208 also has a spring receiving arm 208*i* that extends radially outwardly relative to the longitudinal axis LA from the outer surface of the body 208*a*. In the illustrated embodiment, the cam surface 208*e* and the spring receiving arm 208*i* are generally opposite each other on the body 208*a*. As illustrated in FIG. 3, the torsional spring 212 is coupled to the eject sleeve 208.

Figure 5A:
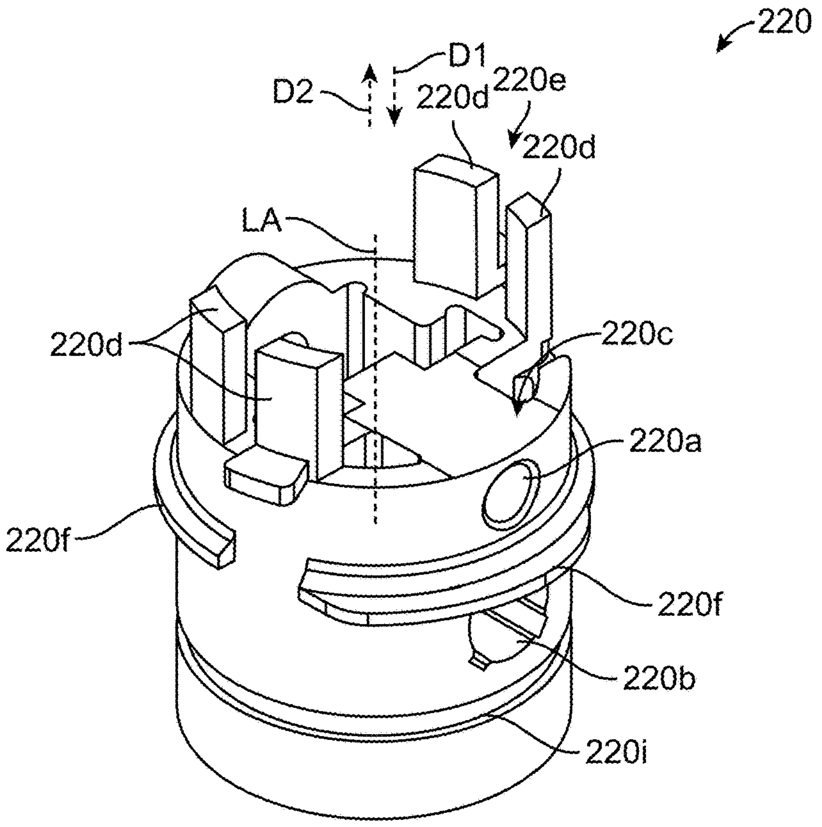
FIG. 5A is a perspective view of the clamp body of blade change mechanism of FIG. 3.
Figure 5B:
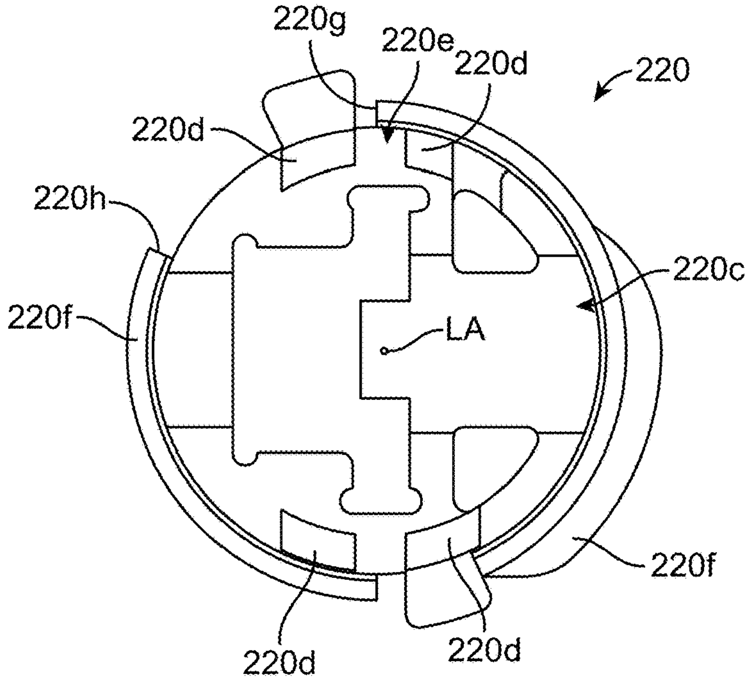
FIG. 5B is an end view of the clamp body of FIG. 5A.

FIGS. 3, 5A, and 5B illustrate the clamp body 220 that includes a first hole 220*a* that is configured to receive the pin 232, which secures the transmission rod 104*d* to the clamp body 220. The clamp body 220 also includes a second hole 220*b* that is configured to receive the lock pin 236. The clamp body 220 includes a surface 220*c* that faces in the second direction D2, and alignment projections 220*d* that extend in the second direction D2 from the surface 220*c* and toward the housing 112. As shown, the clamp body 220 includes two pairs of alignment projections 220*d* that are opposite each other, with each pair of alignment projections 220*d* positioned adjacent a radially outer portion of the clamp body 220. In some constructions, the clamp body 220 may only include one pair of alignment projections 220*d*. Each pair of alignment projections 220*d* are spaced a small distance apart from each other to define a bar receiving slot 220*e*. The clamp body 220 also includes an outwardly extending rib 220*f* that extends radially outward from and circumferentially around at least a portion of the clamp body 220. The illustrated rib 220*f* is defined by segments (FIG. 5B) and includes a first stop surface 220*g* and a second stop surface 220*h*. As best shown in FIG. 5A, the clamp body 220 may include an inwardly extending channel 220*i* that extends radially into the clamp body 220 and circumferentially around the body and is configured to receive the retainer 240.

Figure 6A:
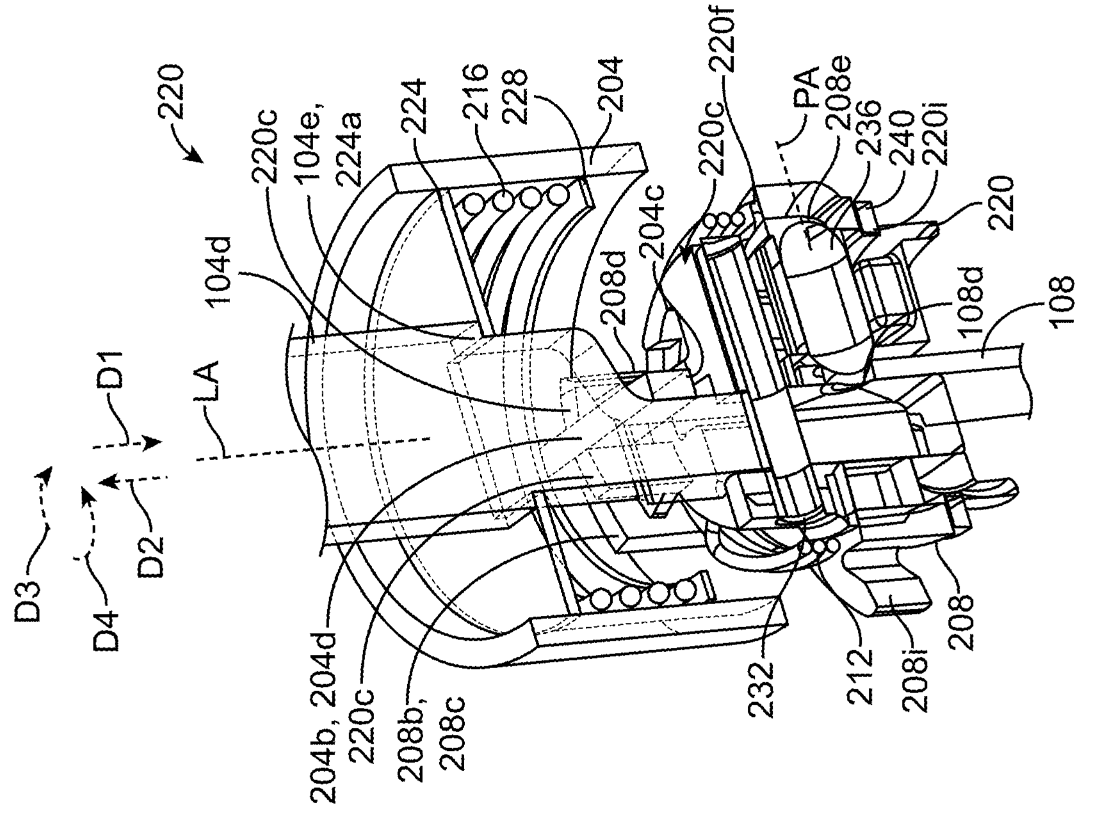
FIG. 6A is a cross-sectional view of the blade change mechanism of FIG. 3 in a locked position.
Figure 6B:
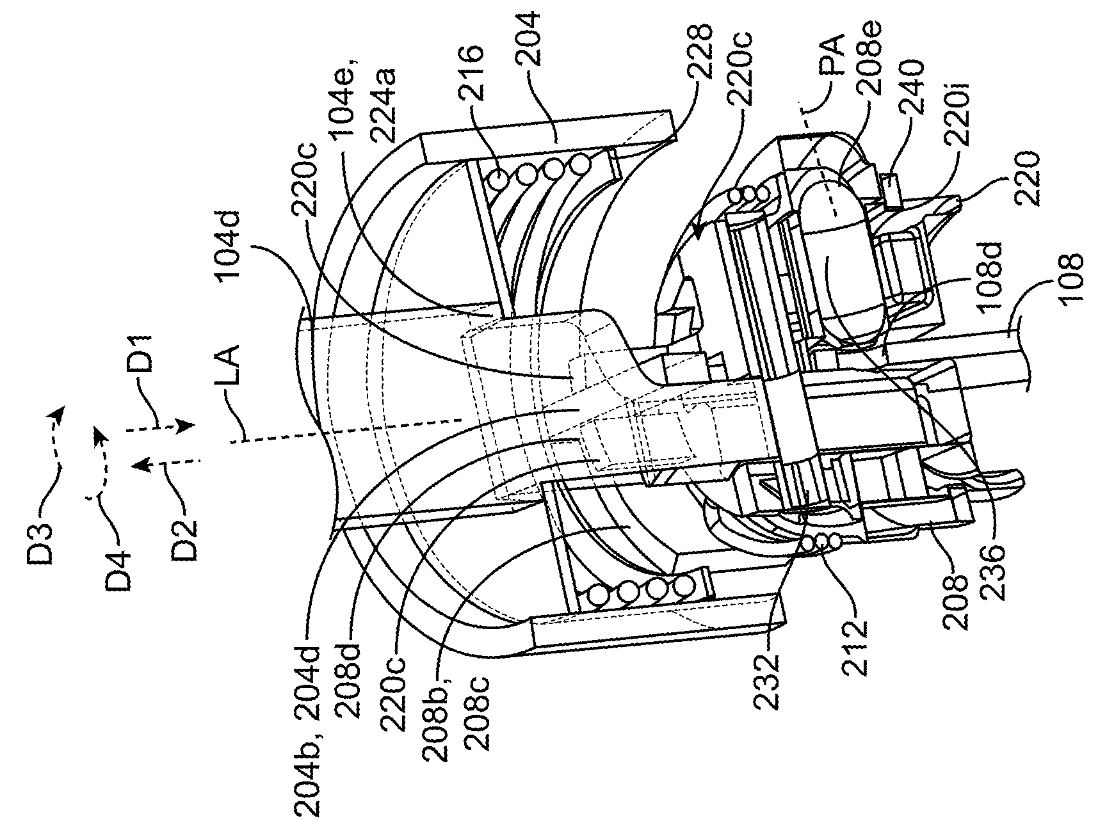
FIG. 6B is a cross-sectional view of the blade change mechanism of FIG. 3 in a transitional position between the locked position of FIG. 6A and an unlocked position.
Figure 6D:
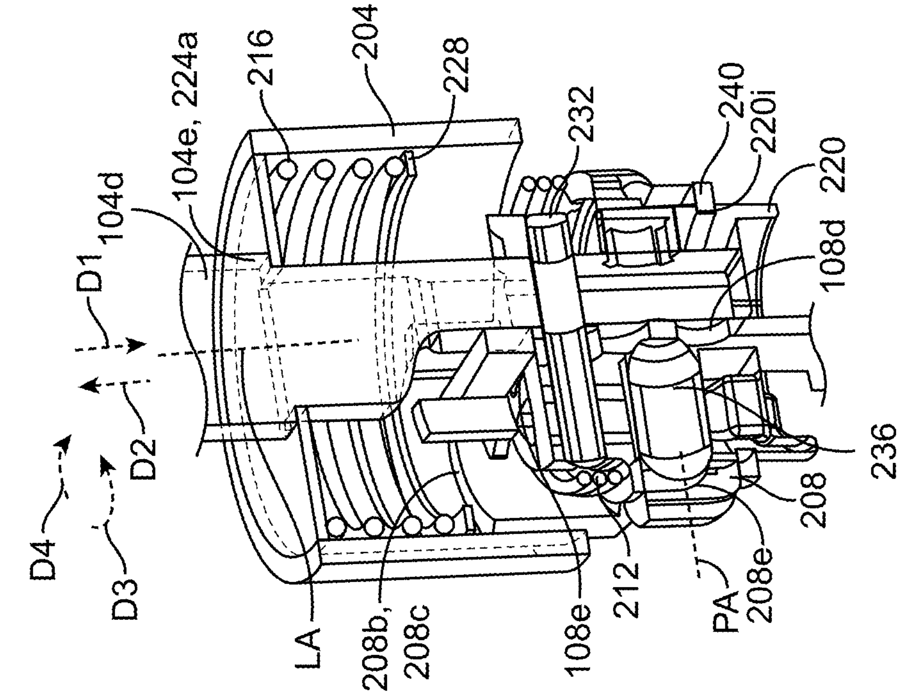
FIG. 6D is another cross-sectional view of the blade change mechanism of FIG. 3 in the unlocked position taken opposite the cross-sectional view of FIG. 6C.
Figure 6C:
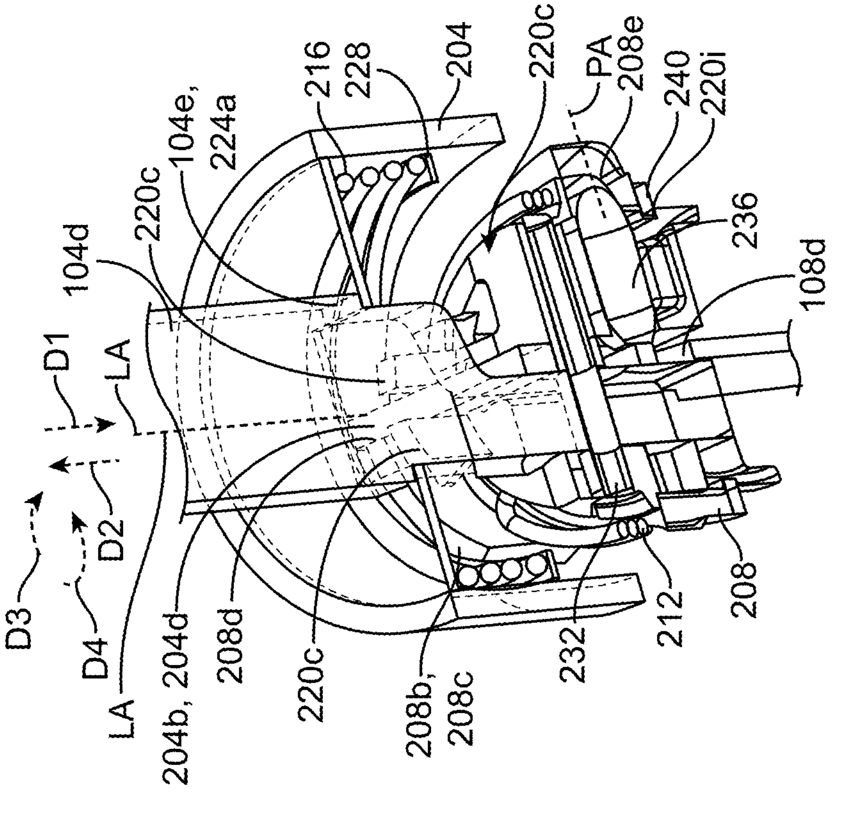
FIG. 6C is a cross-sectional view of the blade change mechanism of FIG. 3 in the unlocked position.
Figure 7A:
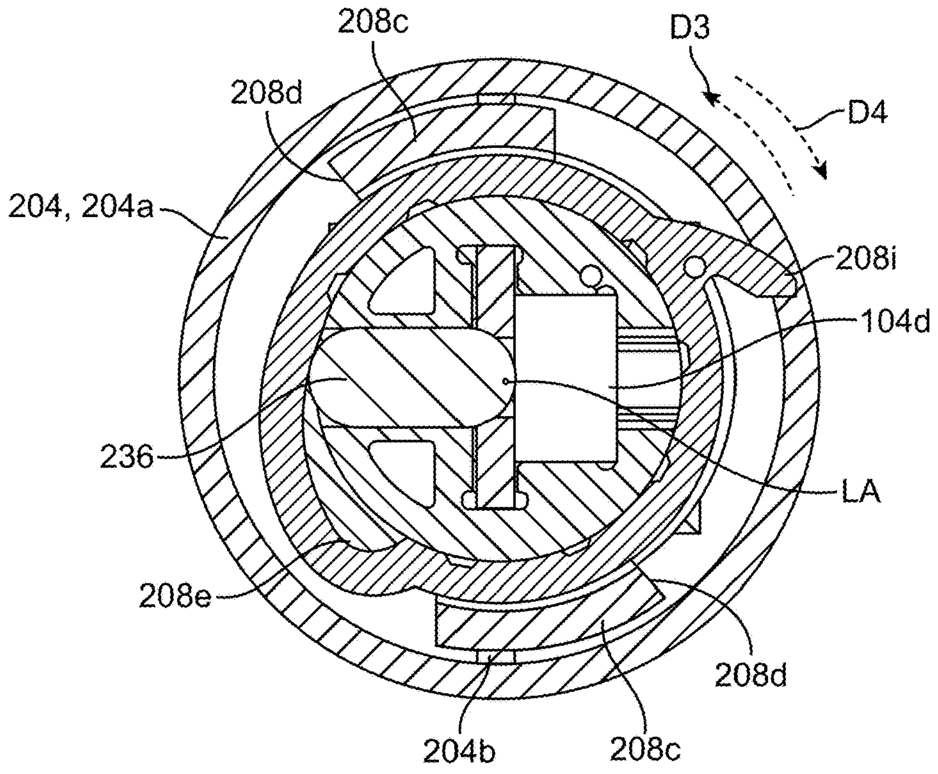
FIG. 7A is a cross-sectional view of the blade change mechanism of FIG. 3 in the locked position taken perpendicularly from a longitudinal axis of the blade change mechanism and in intersection with a lock pin of the blade change mechanism.
Figure 7B:
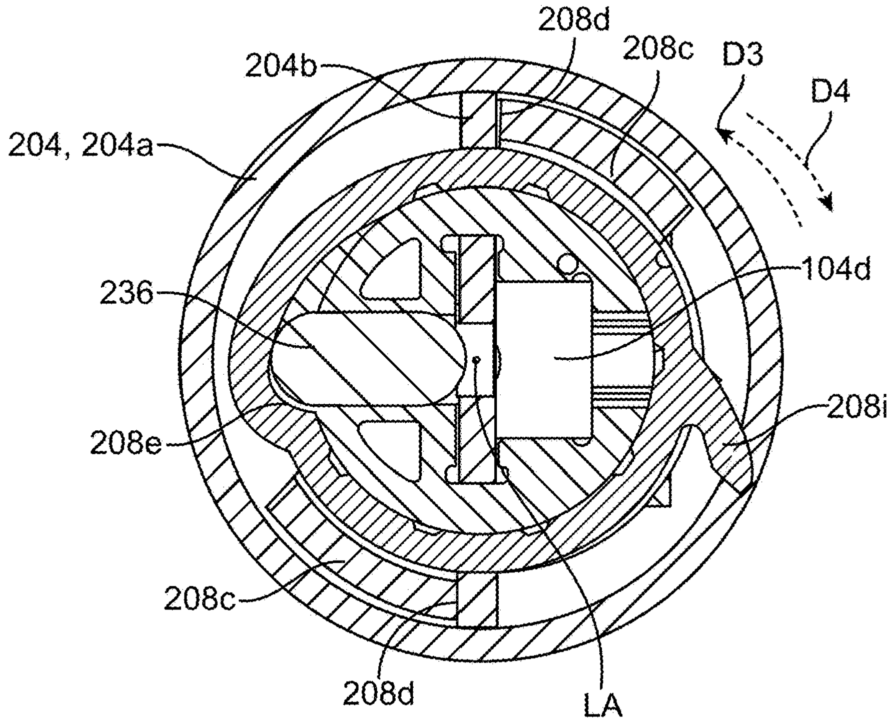
FIG. 7B is a cross-sectional view of the blade change mechanism of FIG. 3 in the unlocked position taken perpendicularly from the longitudinal axis of the blade change mechanism and in intersection with the lock pin of the blade change mechanism.

FIGS. 6A-6D illustrate the blade change mechanism 200 in the locked position (FIG. 6A), in a transition state (FIG. 6B) between the locked position and the unlocked position, and in the unlocked position (FIGS. 6C, 6D). As best shown in FIGS. 6A and 7A, the blade 108 is secured to the blade change mechanism 200 in the locked position. More specifically, the lock pin 236 is pressed along a pin axis PA into engagement with the hole 108*d* of the blade 108. The pin axis PA extends perpendicular relative to the longitudinal axis LA, and the lock pin 236 secures the blade 108 to the blade change mechanism 200 when the blade change mechanism 200 is in the locked position. With continued reference to FIGS. 6A and 7A, the first end surface 204*c* of the bar 204*b* presses on the end surface 208*c* of the sidewalls 208*b* via a compressive force from the compression spring 216. The compression spring 216 spans the first washer 224 and the second washer 228, and biases the bar 204*b* (and the trigger sleeve 204) in the direction D1. In the locked position, the compression spring 216 is in a compressed or loaded state. The first washer 224 abuts a shoulder 104*e* of the transmission rod 104*d* and has a cutout 224*a* that is engaged by the shoulder 104*e* to inhibit slipping of the first washer 224 in the second direction D2. The torsional spring 212 may act on the eject sleeve 208 in a first rotational direction D3. In the locked position, the torsional spring 212 is in a relaxed or unloaded state, and the eject sleeve 208 is held with the bar 204*b* and remains aligned with the end surface 208*c* along the longitudinal axis LA.

In the illustrated embodiment, the lock pin 236, cam surface 208*e*, and torsional spring 212 may define a blade retention structure that holds the blade 108 in the locked position until release of the blade 108 is desired. In the illustrated locked position, the lock pin 236 contacts the blade 108 and the lock pin 236 is held in position by the cam surface 208*e*. The eject sleeve 208 and thus the cam surface 208*e* are biased toward the locked position by the torsional spring 212. It will be appreciated that the blade retention structure may include other components or structure to additionally or separately hold the blade in the locked position.

In the illustrated embodiment, the bar 204*b*, abutment surfaces 208*d*, and compression spring 216 define a blade release structure that selectively releases the blade 108 from the locked position to the unlocked position. In the illustrated unlocked position, the bar 204*b* is held in engagement with the abutment surfaces 208*d* by the compression spring 216. It will be appreciated that the blade retention structure may include other components or structure to additionally or separately hold the blade in the unlocked position.

FIG. 6B illustrates a transition position of the blade change mechanism 200. In transitioning the blade change mechanism 200 from the locked position to the unlocked position, the user may apply a loosening force to (i.e., act upon) the eject sleeve 208 in a second rotational direction D4 which opposes the first rotational direction D3 and thus the force of the torsional spring 212. The transition position illustrated in FIG. 6B relates to a position in which the eject sleeve 208 has been rotated sufficiently to both receive the lock pin 236 radially within the cam surface 208*e* and to locate the bar 204*b* out of rotational alignment with the end surface 208*c*. In other words, the bar 204*b* now is positioned in alignment with the abutment surface 208*d*. In this transition position of the blade change mechanism 200, the torsional spring 212 is placed, by the user, into a compressed (e.g., loaded) state. Upon reaching this transitioning position of FIG. 6B, the compression spring 216 relaxes (e.g., to a relaxed, unloaded state) by pressing the second washer 228 and thus the bar 204*b* in the first direction D1. Such movement locates the trigger sleeve 204 and the blade change mechanism 200 in the locked position of FIGS. 6C, 6D.

As the blade change mechanism 200 moves to the unlocked state, the torsional spring 212 operates with the cam surface 208*e* to locate the lock pin 236 at least partially within the cam surface 208*e* (FIG. 7B) and to allow the compression spring 216 to relax enough to push the finger 108*e* of the blade 108 in the first direction D1 to eject the blade 108 in the first direction D1 from the blade change mechanism 200.

To return the blade 108 or another blade 108 into engagement with the blade change mechanism 200, the opposite process may be carried out. The blade 108 may be translated along the second direction D2 against the bias of the compression spring 216. Such movement moves the compression spring 216 from a relaxed (e.g., unloaded) state to a compressed (e.g., loaded) state. Once the blade 108 is translated a sufficient distance along the direction D2, the abutment surface 208*d* no longer presses against the bar 204*b*, as illustrated in the transition position of FIG. 6B. Once reaching this position (i.e., in response to reaching this position), the torsional spring 212 may move from a compressed (e.g., loaded) state to a relaxed (e.g., unloaded) state, and the eject sleeve 208 will rotate along the direction D4. With this rotation, the bar 204*b* will once again be aligned with the end surfaces 208*c* of the eject sleeve 208, and the lock pin 236 will once again engage the hole 108*d* of the blade 108.

Additional movements of some components of the blade change mechanism 200 are restricted by other components of the blade change mechanism 200. For example, rotation of the eject sleeve 208 is restricted by the rib 220*f*. More specifically, the first stop surface 208*g* and the second stop surface 208*h* are configured to abut the first stop surface 220*g* and the second stop surface 220*h* while the eject sleeve

208 is rotated about the longitudinal axis LA relative to the clamp body 220. Further, the eject sleeve 208 is inhibited from axial displacement by the rib 220*f* and the retainer 240 (See FIG. 6A). Other movement restrictions and limitations are present in the blade change mechanism 200.

In sum, to lock the blade 108 to the blade change mechanism 200, the user may simply translate the blade 108 into the blade change mechanism 200 along the direction D1. To unlock and subsequently remove the blade 108 from the blade change mechanism 200, the user may simply rotate the eject sleeve 208. Accordingly, the user may use a single hand to either lock or unlock the blade 108 with respect to the blade change mechanism 200. The user may use their other hand to, in some cases, support the reciprocating saw 100 while performing this blade replacement and/or exchange. In this way, a blade changeout process may be simplified, expedited, and improved.

Figure 8A:
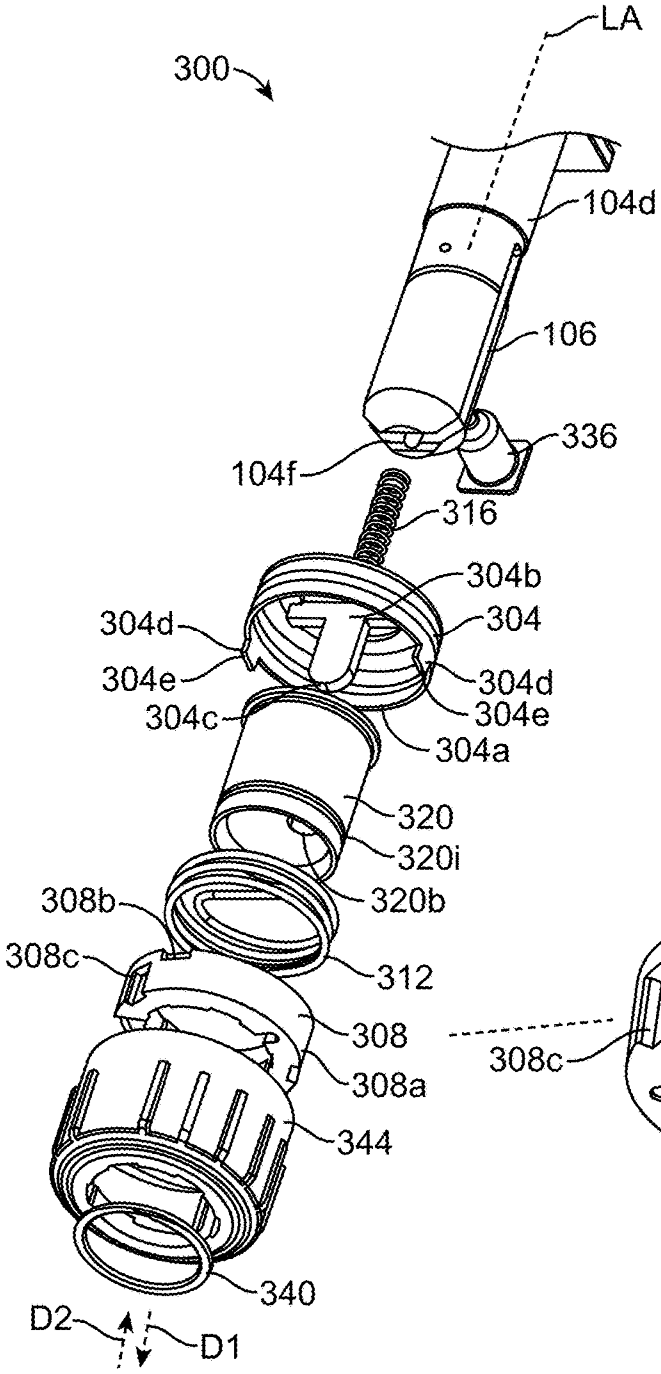
FIG. 8A is an exploded view of another blade change mechanism.

FIG. 8A illustrates another embodiment of a blade change mechanism 300. The blade change mechanism 300 may be movable between a locked position in which the blade 108 is secured to the drive mechanism 104, and an unlocked position in which the blade 108 is removable from (e.g., removably coupled to) drive mechanism 104. In the exemplary blade change mechanism 300, the blade 108 is ejected from the blade change mechanism 300 as the blade change mechanism 300 approaches or reaches the unlocked position. The blade change mechanism 300 may include a body 320 which supports a trigger sleeve 304. The trigger sleeve 304 is movable axially along the longitudinal axis LA of the blade change mechanism 300. The blade change mechanism 300 further includes a rear cam 308 and a front cam 344. The transmission rod 104*d* includes a hole 104*f* that receives a first spring 316 of the blade change mechanism 300. The first spring 316 biases the trigger sleeve 304 in the first direction D1. In the illustrated embodiment, the first spring 316 is a compression spring. A second spring 312 biases the rear cam 308 to the locked position. In the illustrated embodiment, the second spring 312 is a torsional spring. A washer 340 engages a void 320*i* of the body 320 to secure the axial position of the rear cam 308 and the front cam 344 to the body 320. The body 320 further includes a hole 320*b* which receives a lock pin 336 that which is engageable with the blade 108 in the locked position of the blade change mechanism 300.

As shown in FIG. 8A, the trigger sleeve 304 includes a body 304*a*. In the illustrated embodiment, the body 304*a* is generally annular in shape, although, as described below with regard to FIGS. 8D-8G, the trigger sleeve 304 may be defined by other shapes. A bar 304*b* spans the body 304*a*. As shown, the bar 304*b* defines a secant of the body 304*a* when viewed from an end of the body 304*a*. The bar 304*b* includes a finger 304*c* which extends in the first direction D1 from the bar 304*b*. Finally, the trigger sleeve 304 includes a plurality of tabs 304*d*. The tabs 304*d* extend in the first direction D1 from the body 304*a*. The tabs 304*d* terminate at end surfaces 304*e* which are furthest away from the body 304*a*.

Figure 8B:
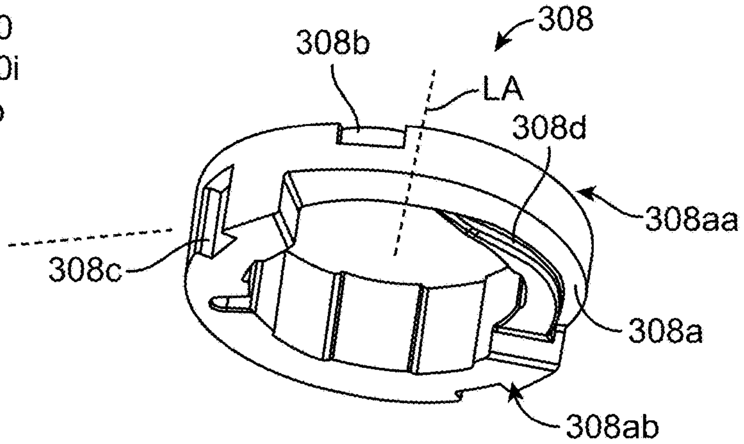
FIG. 8B is a perspective view of a rear cam of the blade change mechanism of FIG. 8A.

FIG. 8B illustrates the rear cam 308 in detail. The rear cam 308 includes a body 308*a* which is generally annular in shape. The rear cam 308 includes cavities 308*b* in communication with a first axial end 308*aa* of the body 308*a* and slots 308*c* in communication with an opposite second axial end 308*ab* of the body 308*a*. The rear cam 308 further includes a ramped surface 308*d* which varies in thickness in a direction extending radially from the longitudinal axis LA.

Figure 8C:
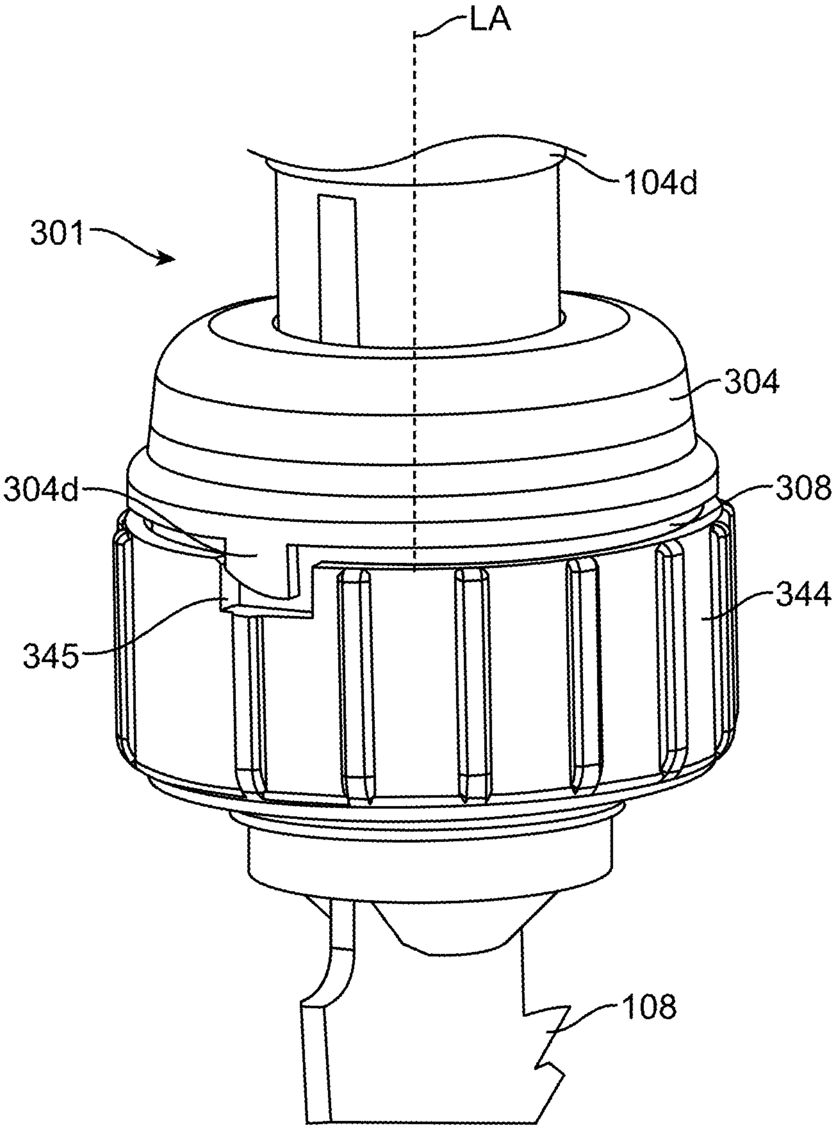
FIG. 8C is a perspective view of another alternate blade change mechanism.

FIG. 8C illustrates another embodiment (reference numeral 301) of a blade change mechanism 301 that is similar to the blade change mechanism 300 and like features are labeled with the same reference numerals. As shown, cavities 345 are defined on the front cam 344 and the tabs 304*d* are configured to be seated within the cavities 345. The cavities 345 function in a manner that is similar to the above-described cavities 308*b* of the rear cam 308. Accordingly, either the front cam 344 (as shown in FIG. 8C) or the rear cam 308 (as shown in FIGS. 8A and 8B) may engage the tabs 304*d*.

Figure 8D:
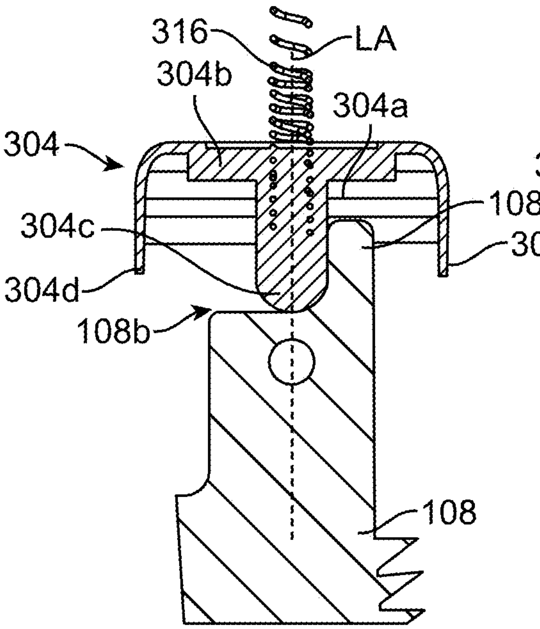
FIG. 8D is a cross-sectional view of a trigger sleeve of the blade change mechanism of FIG. 8A.

FIG. 8D illustrates exemplary interaction between the trigger sleeve 304 of the blade change mechanism 300 and the blade 108. As shown, the body 304*a* is annular in shape, which may inhibit undesired ingress of dust into the blade change mechanism 300. It should be appreciated that the trigger sleeve 304 may have other shapes (e.g., hexagonal, square, etc.). The trigger sleeve 304 includes two tabs 304*d* that are opposite each other (spaced 180 degrees around the longitudinal axis LA), although the trigger sleeve 304 may have one tab 304*d* or more than two tabs 304*d*. In embodiments of the trigger sleeve 304 with more than one tab 304*d*, the tabs 304*d* may be spaced apart about the longitudinal axis LA in any desired arrangement (equally spaced or unequally spaced). The first spring 316 is configured to bias the finger 304*c* against the base end 108*b* of the blade 108.

Figure 8E:
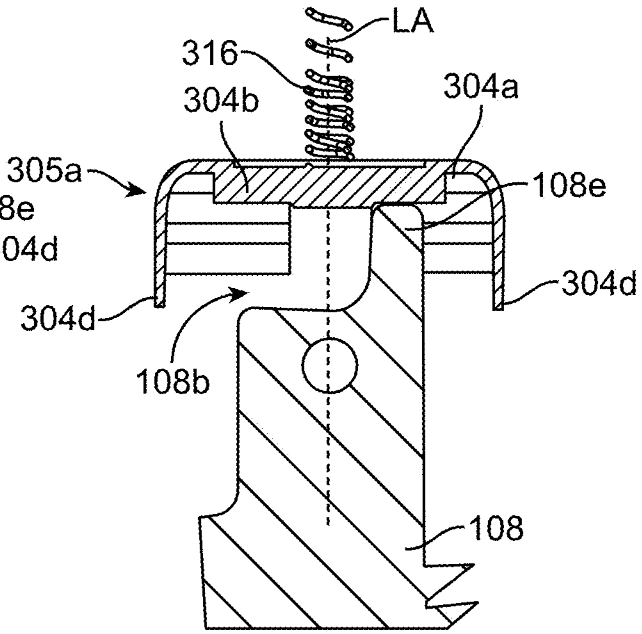
FIG. 8E is a cross-sectional view of an alternate trigger sleeve for use with the blade change mechanism of FIG. 8A.
Figure 8F:
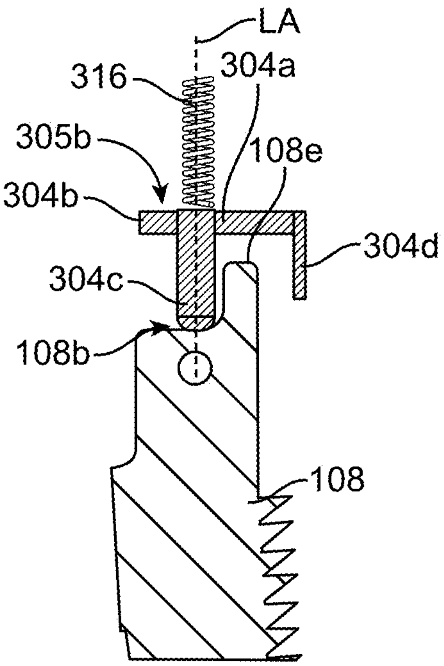
FIG. 8F is a side view of another alternate trigger sleeve for use with the blade change mechanism of FIG. 8A.
Figure 8G:
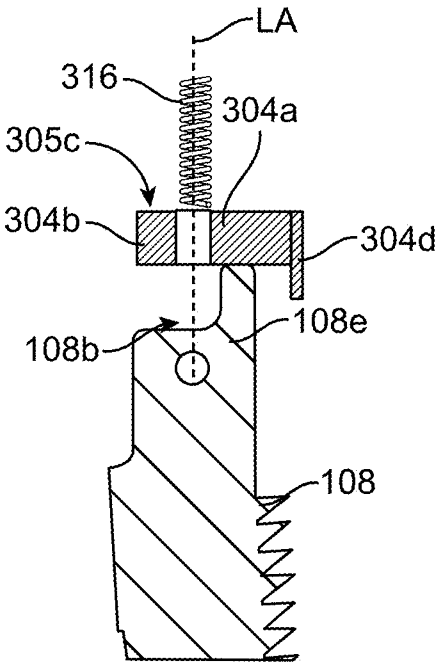
FIG. 8G is a side view of another alternate trigger sleeve for use with the blade change mechanism of FIG. 8A.

The trigger sleeve 304 may take different forms as shown in FIGS. 8E-8G. FIG. 8E illustrates a trigger sleeve 305*a* that has the above-described annular body 304*a* and bar 304*b*, but not the finger 304*c*. In this embodiment, the first spring 316 is configured to bias the bar 304*b* against the finger 108*e* of the blade 108. FIGS. 8F and 8G illustrate other exemplary trigger sleeves 305*b*, 305*c* that include bodies 304*a* with non-annular shapes (e.g., defined by the bar 304*b* and the tab 304*d*). In some instances, blade change mechanisms 300 including the trigger sleeves 305*b*, 305*c* may be provided with dust ingress protection other than via the shape of the trigger sleeves 305*b*, 305*c*.

With reference to FIG. 8F, the trigger sleeve 305*b* has a finger 304*c* and the first spring 316 is configured to bias the finger 304*c* against the base end 108*b* of the blade 108. With reference to FIG. 8G, the first spring 316 is configured to bias the bar 304*b* against the finger 108*e* of the blade 108. In each of these exemplary embodiments, the trigger sleeve 304, 305*a*, 305*b*, 305*c* provides a surface (e.g., the bar 304*b* or the finger 304*c*) to receive a bias force from the first spring 316 and to transmit the force to the blade 108. Each trigger sleeve 304, 305*a*, 305*b*, 305*c* also has at least one tab 304*d* for engaging a corresponding cavity (e.g., the cavities 308*b*, 345). Other than these features, the shapes of the trigger sleeves 304, 305*a*, 305*b*, 305*c* may be altered depending on desired characteristics. Embodiments other than those illustrated in FIGS. 8D-8G are possible.

Figure 9:
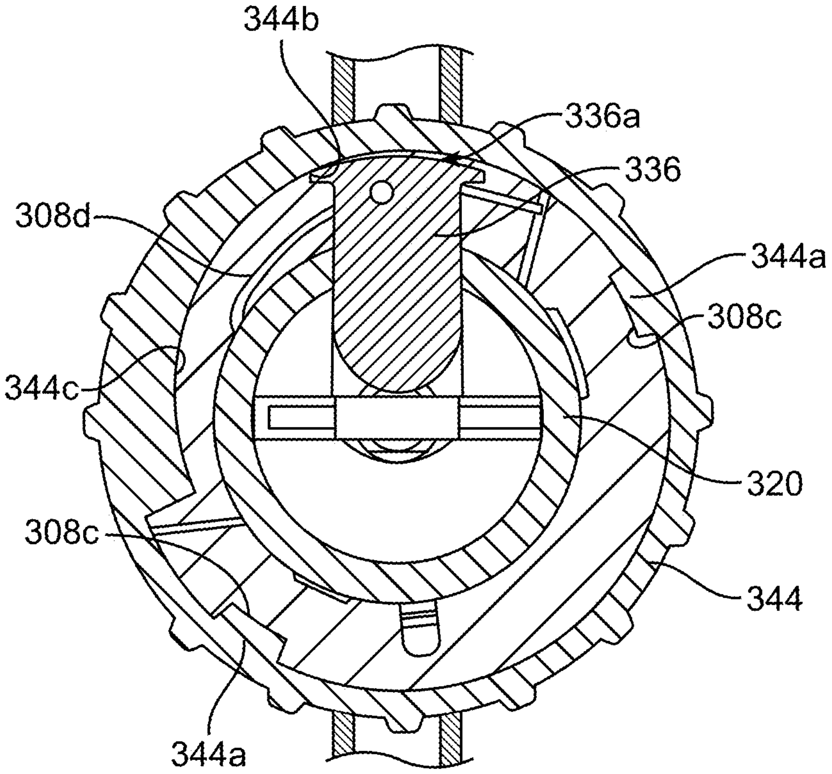
FIG. 9 is a cross-sectional view of the blade change mechanism of FIG. 8A in an unlocked position.
Figure 10:
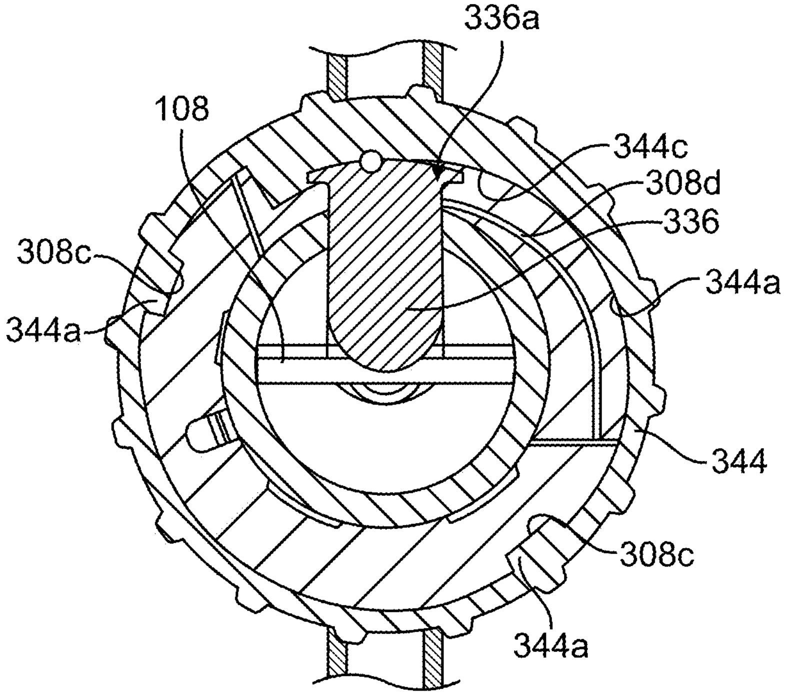
FIG. 10 is a cross-sectional view of the blade change mechanism of FIG. 8A in a locked position.
Figure 11:
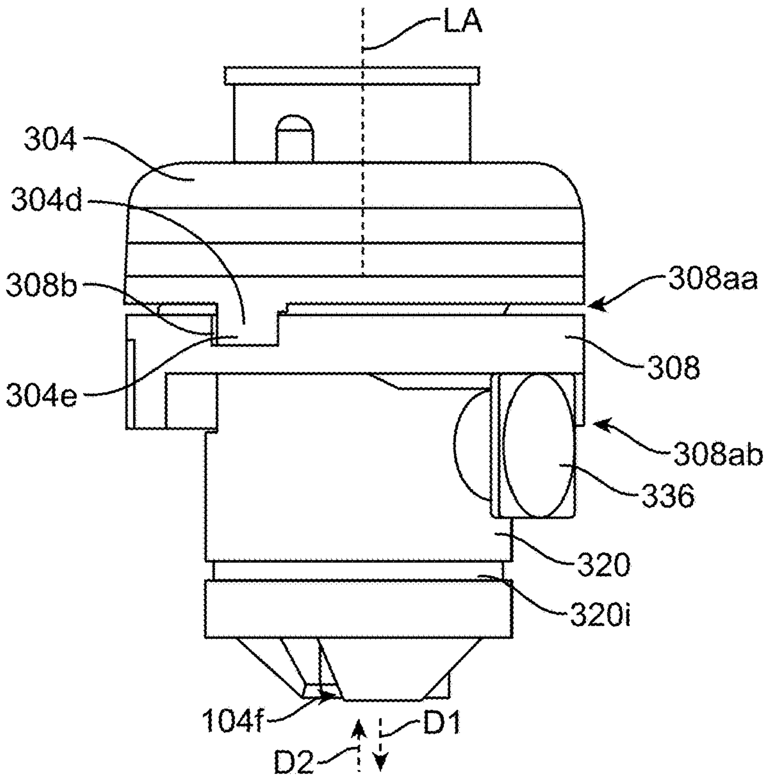
FIG. 11 is a side view of the blade change mechanism of FIG. 8A in the unlocked position.
Figure 12:
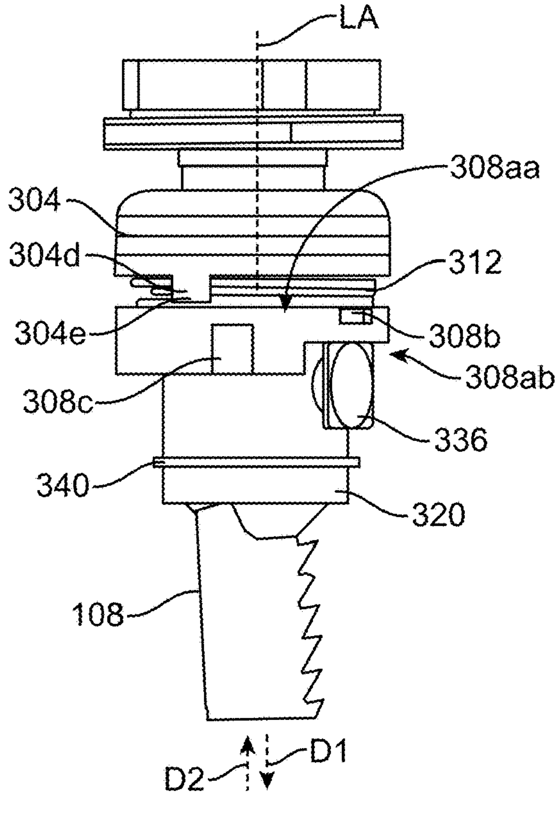
FIG. 12 is a side view of the blade change mechanism of FIG. 8A in the locked position.

FIGS. 9 and 11 illustrate the blade change mechanism 300 in an unlocked position, and FIGS. 10 and 12 illustrate the blade change mechanism 300 in a locked position. In each of these positions, the front cam 344 has projections 344*a* that are engaged with the slots 308*c* of the rear cam 308. As such, rotation of the front cam 344 rotates the rear cam 308. In the unlocked position of FIG. 9, the ramped surface 308*d* of the rear cam 308 presses a cap 336*a* of the lock pin 336 to a retracted position against a generally annular inner surface 344*b* of the front cam 344.

As illustrated in FIG. 11, the trigger sleeve 304 is held in the unlocked position relative to the rear cam 308 due to the tabs 304*d* being in radial and axial alignment with the cavities 308*b*. The trigger sleeve 304 is biased along the first direction D1 to the position illustrated in FIG. 11 by the first spring 316 to hold the trigger sleeve 304 against the rear cam 308 (and hold the tabs 304*d* in the cavities 308*b*). In this position, the end surfaces 308*e* of the tabs 304*d* are axially disposed in the cavities 308*b*, and rotational movement of the rear cam 308 relative to the trigger sleeve 304 is inhibited by the tabs 304*d* engaging walls that define the cavities 308*b*. As shown, the tabs 304*d* and the cavities 308*b* are generally rectangular in shape, although other shapes for either or both the tabs 304*d* and the cavities 308*b* may be possible and are considered herein. In the illustrated embodiment, the cavities 308*b* are depressions that extend from the first axial end 308*aa* of the body 308*a* without being connected to the second axial end 308*ab* of the body 308*a*.

With reference to FIG. 12, to transition the blade change mechanism 300 from the unlocked position to the locked position, a blade 108 is moved in the second direction D2 (e.g., translated) into contact with the trigger sleeve 304. As the blade 108 moves in the second direction D2, the base end 108*b* and/or the finger 108*e* of the blade 108 may press on either or both of the finger 304*c* or the bar 304*b* of the trigger sleeve 304 depending on the embodiment of the trigger sleeve 304 as described above with regard to FIGS. 8D-8G. In the example shown in FIG. 12, the base end 108*b* of the blade 108 presses on the finger 304*c* to move the trigger sleeve 304 in the second direction D2, which disengages the trigger sleeve 304 from the rear cam 308. The end surfaces 304*e* are no longer received in the cavities 308*b* after the trigger sleeve 304 has moved a certain amount, and the second spring 312 acts on or rotationally biases the rear cam 308 about the longitudinal axis LA such that the rear cam 308 moves to the locked position as shown in FIGS. 10 and 12.

As illustrated in FIG. 10, in the locked position, the cap 336*a* of the lock pin 336 presses against a cam surface 344*c* of the front cam 344. The cam surface 344*c* extends radially inwardly from the annular inner surface 344*b* of the front cam 344 and towards the longitudinal axis LA. Accordingly, while the blade change mechanism 300 is transitioned toward the locked position, the lock pin 336 translates radially inwardly towards the longitudinal axis LA and into the hole 108*d* of the blade 108. The second spring 312 provides force to hold the rear cam 308 in the locked position.

To transition back to the unlocked position, the user acts on the front cam 344 to overcome the rotational force of the second spring 312. Rotation of the front cam 344, which rotates the rear cam 308, relocates the tabs 304*d* in radial alignment with the cavities 308*b*. due to the bias force of the first spring 316, the trigger sleeve 304 translates in the first direction D1 to eject the blade 108 from the blade change mechanism 300 and to reposition the blade change mechanism 300 in the unlocked position.

In the illustrated embodiment, the lock pin 336, cam surface 344*c*, and second spring 312 define a blade retention structure that holds the blade 108 in the locked position until release of the blade 108 is desired. In the illustrated locked position, the lock pin 336 contacts the blade 108 and the lock pin 336 is held in position by the cam surface 344*c*. The front cam 344 and the cam surface 344*c* are biased toward the locked position by the second spring 312. It will be appreciated that the blade retention structure may include other components or structure to additionally or separately hold the blade in the locked position.

In the illustrated embodiment, the tabs 304*d*, cavities 308*b*, and first spring 316 define a blade release structure that selectively releases the blade 108 from the locked position to the unlocked position. In the illustrated unlocked position, the tabs 304*d* is held in engagement with the cavities 308*b* by the first spring 316. It will be appreciated that the blade retention structure may include other components or structure to additionally or separately hold the blade in the unlocked position.

Figure 13A:
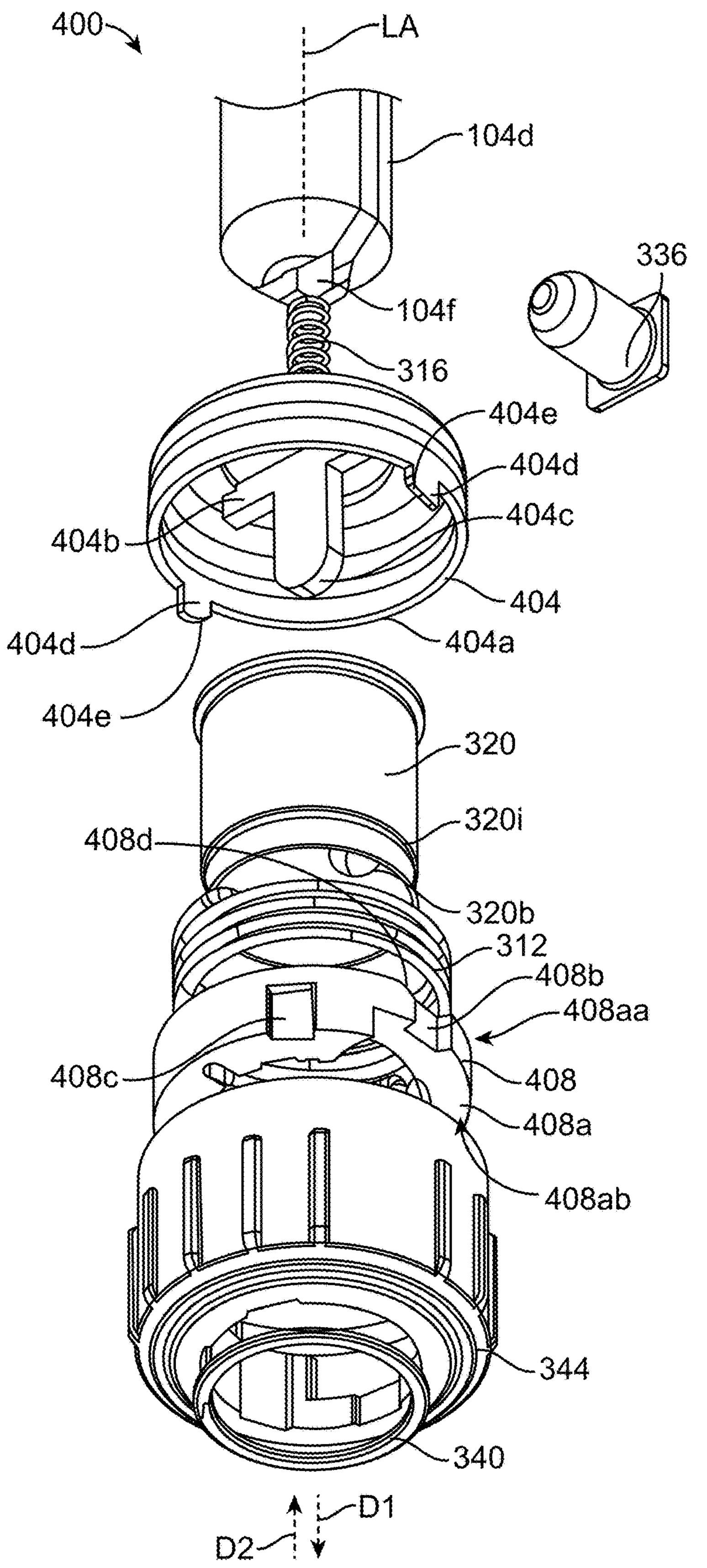
FIG. 13A is an exploded view of another blade change mechanism that is similar to the blade change mechanism of FIGS. 8A-12.
Figure 13C:
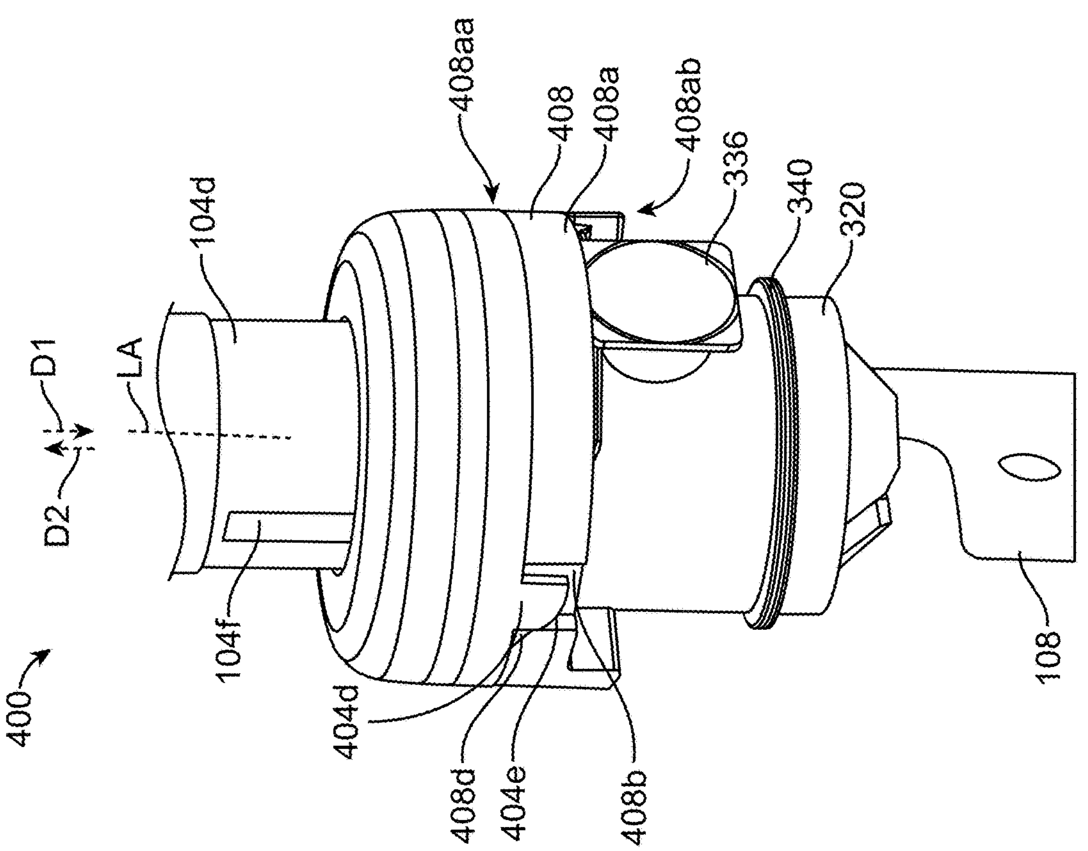
FIG. 13C is a perspective view of the blade exchange mechanism of FIG. 13B in an unlocked position.
Figure 13B:
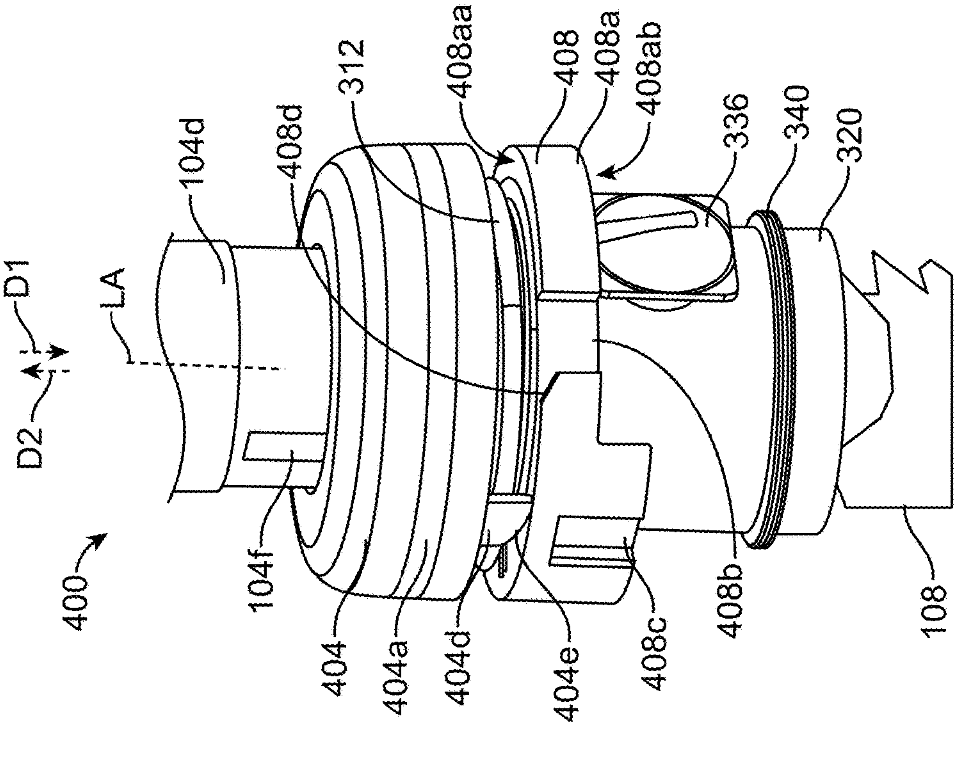
FIG. 13B is a perspective view of the blade exchange mechanism of FIG. 13A in a locked position.

The blade change mechanism 400 illustrated in FIGS. 13A-13C illustrates an alternative embodiment similar to the blade change mechanism 300. The blade change mechanism 400 is movable between a locked position in which the blade 108 is secured to the drive mechanism 104 and an unlocked position in which the blade 108 is removable from (e.g., removably coupled to) drive mechanism 104. In the exemplary blade change mechanism, as the blade change mechanism 400 reaches or nears the unlocked position, the blade 108 is ejected from the blade change mechanism 400. The rear cam 308 and the trigger sleeve 304 have been replaced with a rear cam 408 and a trigger sleeve 404. However, the remaining components of the blade change mechanism 300 function similarly in the blade change mechanism 400.

In the blade change mechanism 400, the trigger sleeve 404 includes a similar body 404*a*, bar 404*b*, and finger 404*c*. However, the tabs 404*d* of the trigger sleeve 404 include angled surfaces 404*e*. Accordingly, the tabs 404*d* are not rectangular in shape. Similarly, the rear cam 408 includes a body 408*a* having a plurality of cavities 408*b* and a plurality of slots 408*c*. The cavities 408*b* of the blade change mechanism 400 include angled surfaces 408*d*. The angled surface 408*d* is angled in a radial direction about the longitudinal axis LA and cutting into the body 408*a* from the remainder of the cavity 408*b*. Accordingly, the cavities 408*b* are not rectangular in shape. In the illustrated embodiment, the cavities 408*b* are through cavities which extend from a first axial end 408*aa* of the rear cam 408 through an opposite second axial end 408*ab* of the body 408*a*. However, the cavities 408*b* need not be through cavities (i.e., the cavities 408*b* do not need to extend through both the first axial end 408*aa* and the second axial end 408*ab*). The angled surfaces 404*e*, 408*d* of the tabs 404*d* and cavities 408*b* promote easier retraction of the trigger sleeve 404 in the first direction D1 and into engagement with the rear cam 408 to hold the blade change mechanism 400 in the unlocked position. This blade change mechanism 400 provides one example of tabs 404*d* and cavities 408*b* which have the same general shape (i.e., each including a corresponding angled surface) but being differently shaped. In other embodiments, the tabs 404*d* and cavities 408*b* may be similarly shaped, but not rectangularly shaped. In other embodiments, the tabs 404*d* and cavities 408*b* may be differently shaped, but not include corresponding angled surfaces.

FIGS. 14A-15B illustrate another embodiment of a blade change mechanism 500. The blade change mechanism 500 is movable between a locked position in which the blade 108 is secured to the drive mechanism 104 and an unlocked position in which the blade 108 is removable from (e.g., removably coupled to) drive mechanism 104. In the exemplary blade change mechanism, as the blade change mechanism 500 reaches or nears the unlocked position, the blade 108 is ejected from the blade change mechanism 500. The blade change mechanism 500 exemplifies another embodiment in which a trigger sleeve 504 is translatable in a direction (i.e., the directions D1, D2) parallel to the longitudinal axis LA. Components of the blade change mechanism 500 that are similar to the blade change mechanisms 300, 400 are annotated with '500' series reference numerals.

Figure 14A:
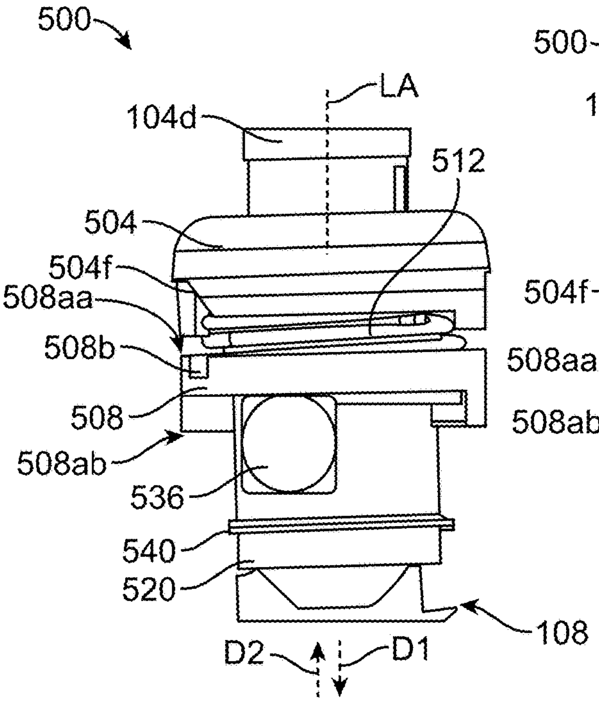
FIG. 14A is a side view of another blade change mechanism in a locked position.
Figure 14B:
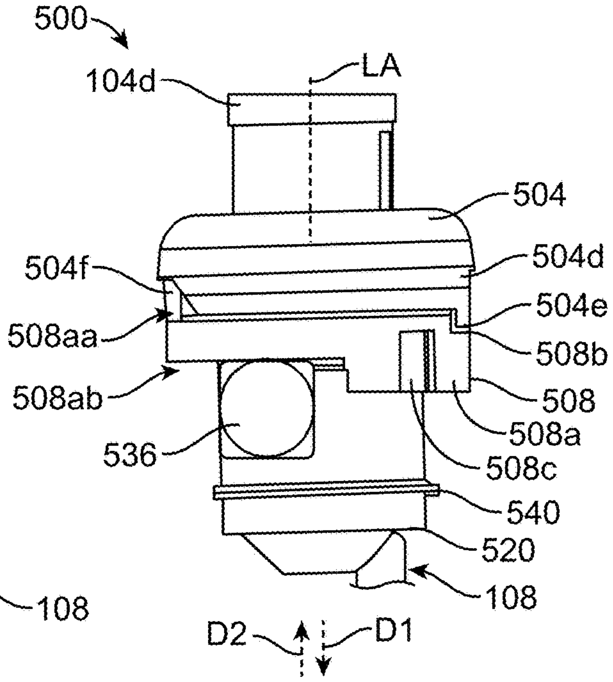
FIG. 14B is a side view of the blade change mechanism of FIG. 14A in an unlocked position.
Figure 14C:
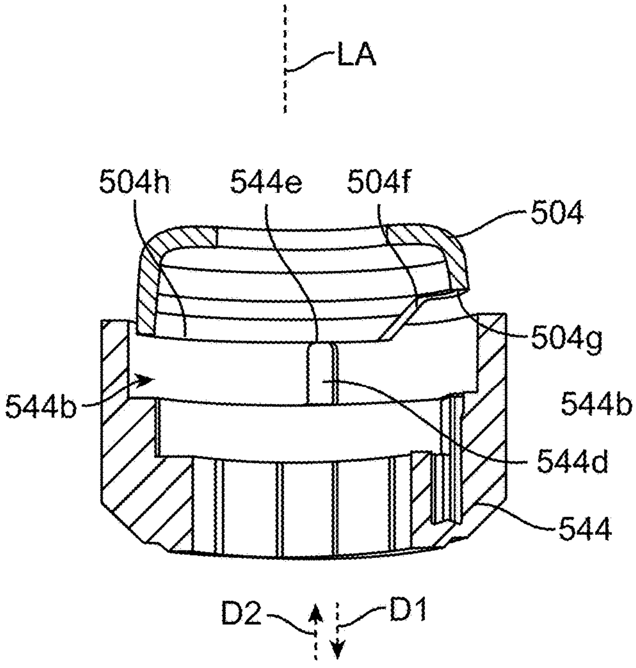
FIG. 14C is a cross-sectional view of a trigger sleeve and front cam of the blade change mechanism of FIG. 14A.
Figure 14D:
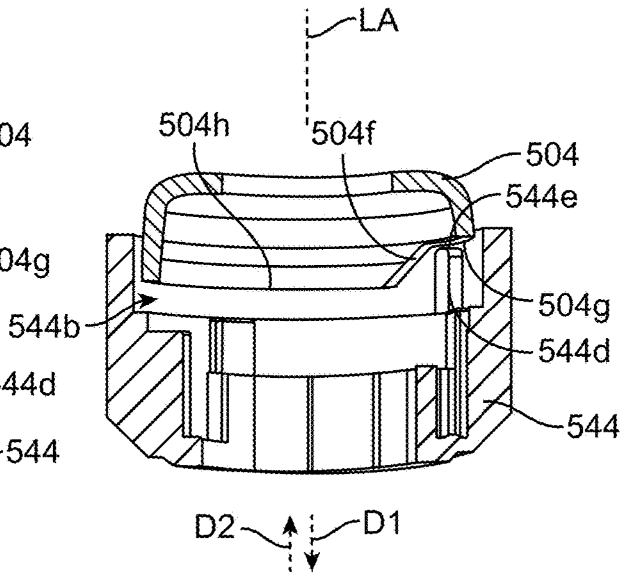
FIG. 14D is a cross-sectional view of the trigger sleeve and front cam of the blade change mechanism of FIG. 14B.

As shown, the blade change mechanism 500 includes a front cam 544 that has at least one rib 544*d*. FIGS. 14C and 14D illustrate one rib 544*d* that extends radially inward toward the longitudinal axis LA from an annular inner surface 544*b* of the front cam 544. The rib 544*d* also extends along the longitudinal axis LA and the rib 544*d* terminates at an end surface 544*e*. The front cam 544 may have more than one rib 544*d*. For example, and with reference to FIGS. 15A, 15B, the illustrated embodiment includes two ribs 544*d* that are located opposite from each other (i.e., the ribs 544*d* are equally spaced circumferentially). In some embodiments, the ribs 544*d* may be unequally spaced circumferentially. In other embodiments, more than two ribs 544*d* may be provided.

Figure 15A:
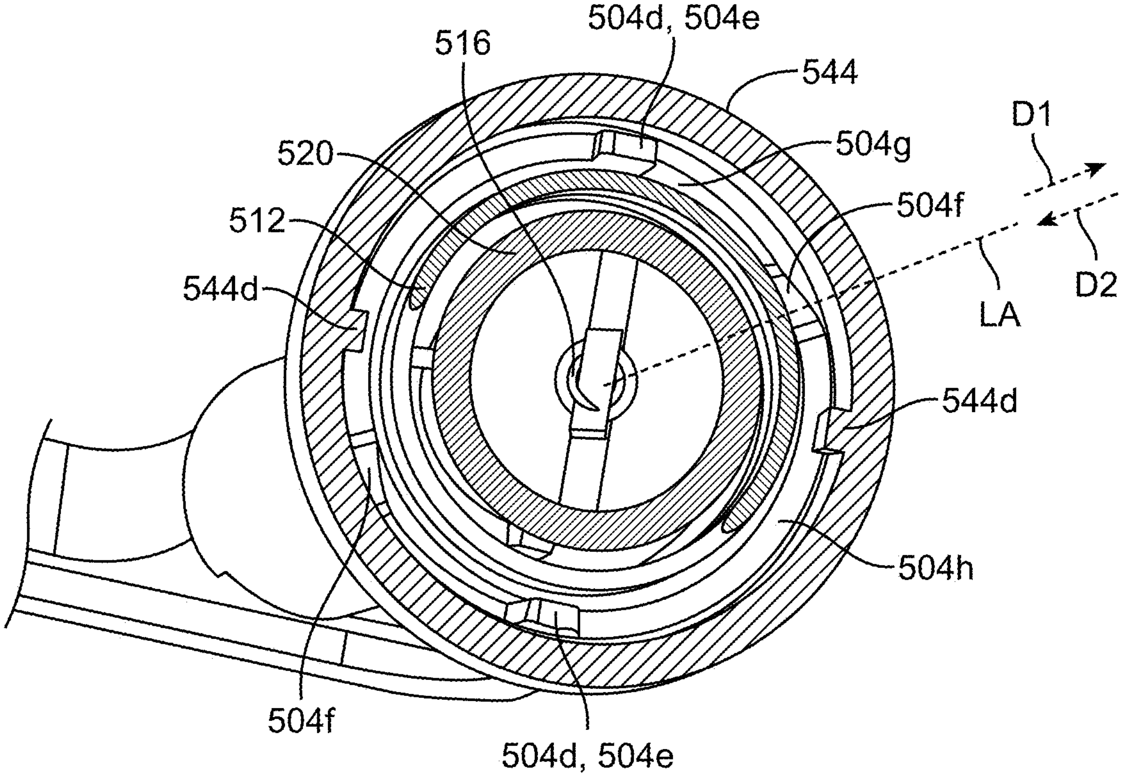
FIG. 15A is a cross-sectional view of the blade change mechanism of FIG. 14A in the locked position.
Figure 15B:
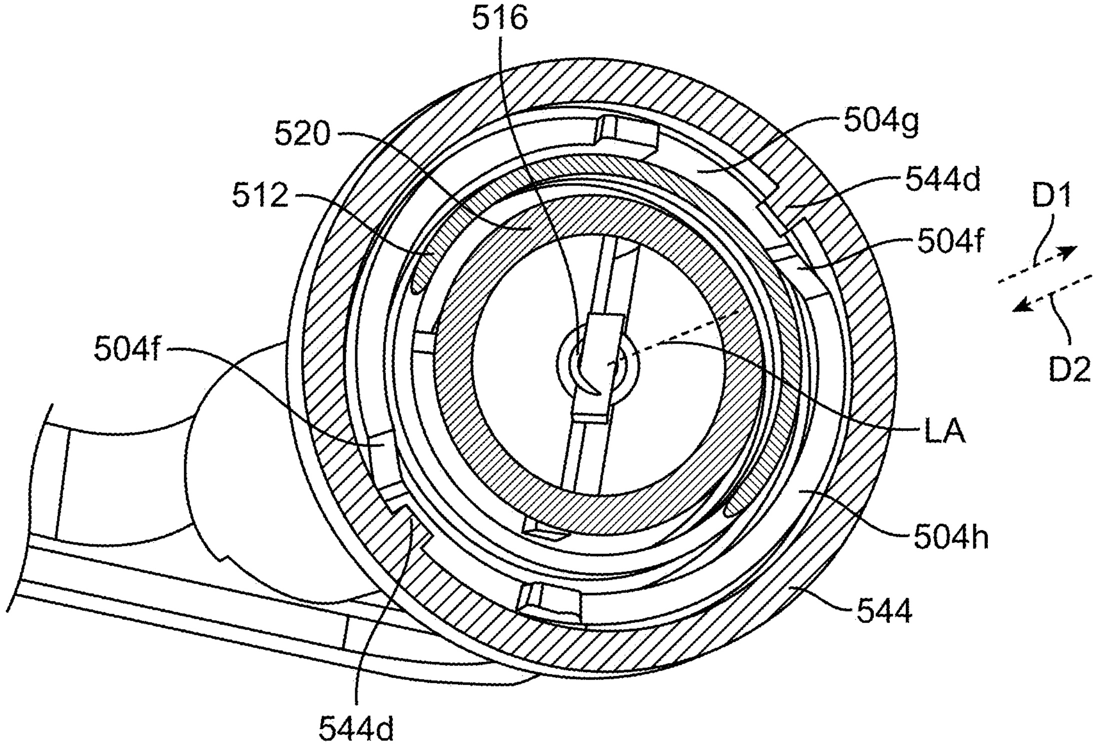
FIG. 15B is a cross-sectional view of the blade change mechanism of FIG. 14B in the unlocked position.

As best shown in FIGS. 15A, 15B, the trigger sleeve 504 of the blade change mechanism 500 includes a ramped surface 504*f*. The ramped surface 504*f* is angled in a direction transverse to the longitudinal axis LA such that, as the front cam 544 is rotated relative to the trigger sleeve 504, the ramped surface 504*f* presses on the end surface 544*e* of the rib 544*d* against the bias of the first spring 516. The ramped surface 504*f* separates or is defines a transition between a segment a recessed end surface 504*g* and end surface 504*h*. That is, the recessed end surface 504*g* is recessed in the second direction D2 from the end surface 504*h*. In the illustrated embodiment, the trigger sleeve 504 includes two ramped surfaces 504*f* (and corresponding recessed end surfaces 504*g*) that are opposite each other (i.e., the ramped surfaces 504*f* are equally spaced circumferentially). In other embodiments, the ramped surfaces 504*f* may be unequally spaced circumferentially. In other embodiments, more than two ramped surfaces 504*f* may be provided.

The trigger sleeve 504 of the blade change mechanism 500 includes tabs 504*d* that are shaped to fit within cavities 508*b* of a rear cam 508. With reference to FIGS. 14A, 14C, 15A, 15C), the trigger sleeve 504 moves in the second direction D2 when the blade change mechanism 500 moves to the locked position such that the tabs 504*d* are not positioned within or otherwise engaged with the cavities 508*b*. In the locked position, the ribs 544*d* are radially aligned with the typical end surface 504*h*. As shown in FIGS. 14B, 14D, 15B, the trigger sleeve 504 moves in the first direction D1 when the blade change mechanism 500 is moved to the unlocked position such that end surfaces 504*e* of the tabs 504*d* are positioned within the cavities 508*b*. In the unlocked position, the ribs 544*d* are radially aligned with the recessed end surface 504*g* such that the trigger sleeve 504 can advance along the first direction D1.

Figure 15C:
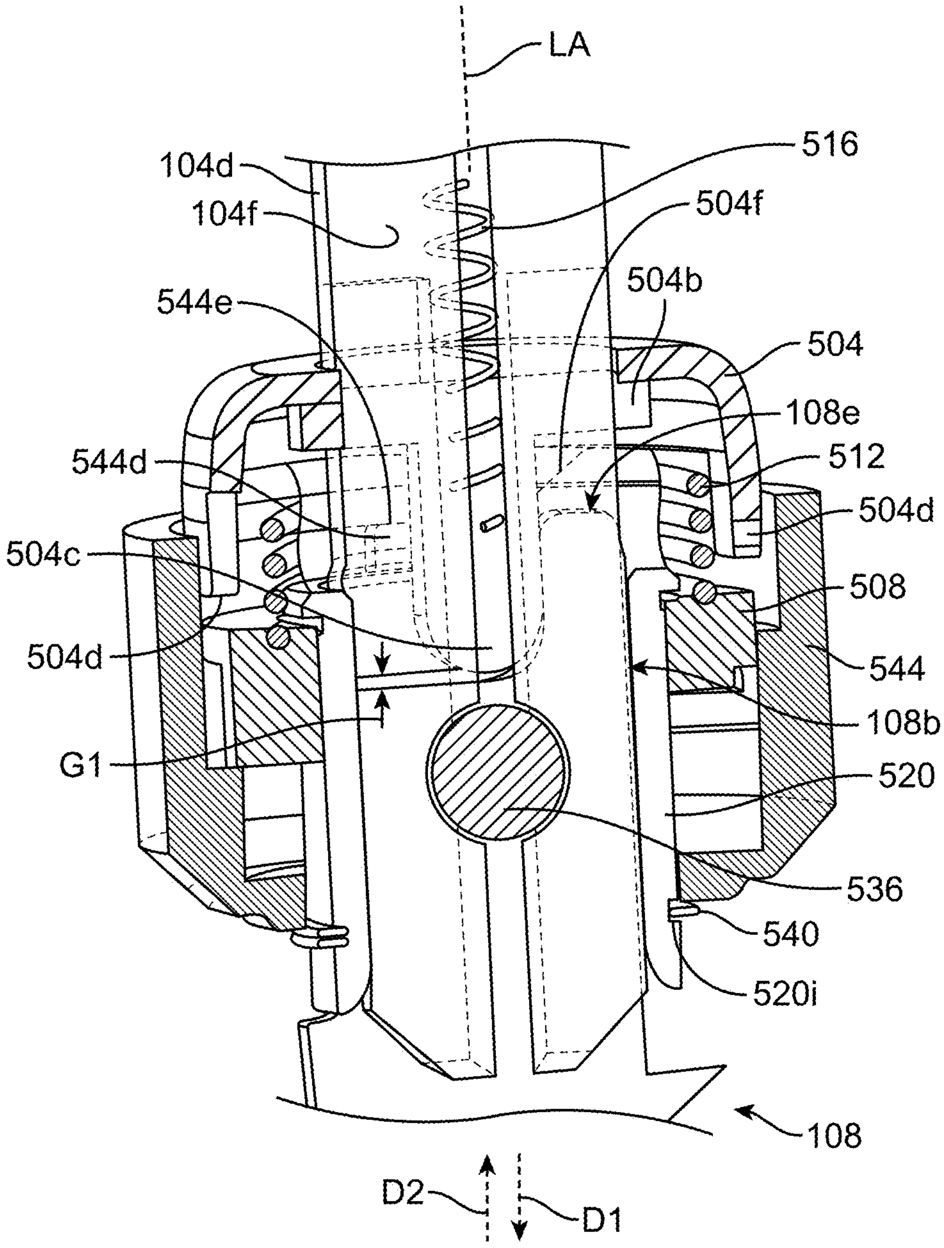
FIG. 15C is another cross-sectional view of the blade change mechanism of FIG. 14A in the locked position.
Figure 16:
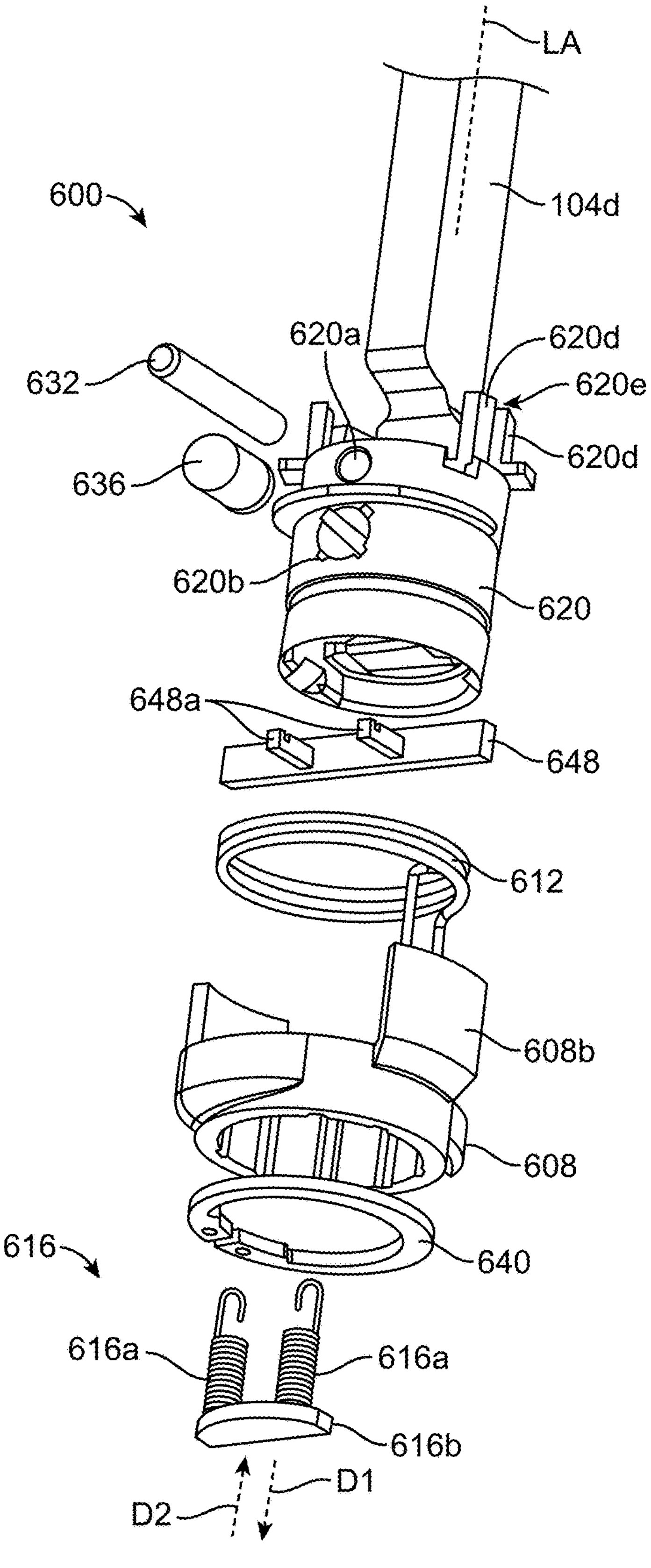
FIG. 16 is an exploded view of another blade change mechanism including an eject bar.

In the locked position shown in FIG. 15C, the ribs 544*d* and ramped surfaces 504*f* may locate the trigger sleeve 504 in position relative to the blade 108 such that a gap G1 exists between the finger 504*c* of the trigger sleeve 504 and the base end 108*b* of the blade 108. The gap G1 extends in an axial direction parallel to the longitudinal axis LA. The gap G1 ensures that the bias force retaining the blade change mechanism 500 in the locked position comes from the first spring 516 (i.e., from the torsion spring) and not the second spring 512 (i.e., not from the compression spring). In the illustrated embodiment, this gap G1 is approximately 0.2 millimeters to 0.5 millimeters, although other sized gaps G1 are possible and considered herein.

In the illustrated embodiment, the lock pin 536, rear cam 508, and second spring 512 define a blade retention structure that cooperates to hold the blade 108 in the locked position until release of the blade 108 is desired. In the illustrated locked position, the lock pin 536 contacts the blade 108, and the lock pin 536 is held in position by a cam surface (not shown) of the rear cam 508. The rear cam 508 and thus the cam surface (not shown) are biased toward the locked position by the second spring 512. It will be appreciated that the blade retention structure may include other components or structure to additionally or separately hold the blade in the locked position.

In the illustrated embodiment, the end surface 504*h*, ribs 544*d*, and first spring 516 define a blade release structure that cooperates to release the blade 108 from the locked position to the unlocked position when desired. In the illustrated unlocked position, the end surface 504*h* is held in engagement with the ribs 544*d* by the first spring 516. It will be appreciated that the blade retention structure may include other components or structure to additionally or separately hold the blade in the unlocked position.

FIGS. 16-19B illustrate another embodiment of a blade change mechanism 600. The blade change mechanism 600 is movable between a locked position in which the blade 108 is secured to the drive mechanism 104 and an unlocked position in which the blade 108 is removable from (e.g., removably coupled to) drive mechanism 104. In the exemplary blade change mechanism, as the blade change mechanism 600 reaches or nears the unlocked position, the blade 108 is ejected from the blade change mechanism 600. The blade change mechanism 600 is similar to the blade change mechanism 200. Like components of the blade change mechanism 200 are annotated with '600' series reference numerals to describe like components of the blade change mechanism 600.

Figure 17:
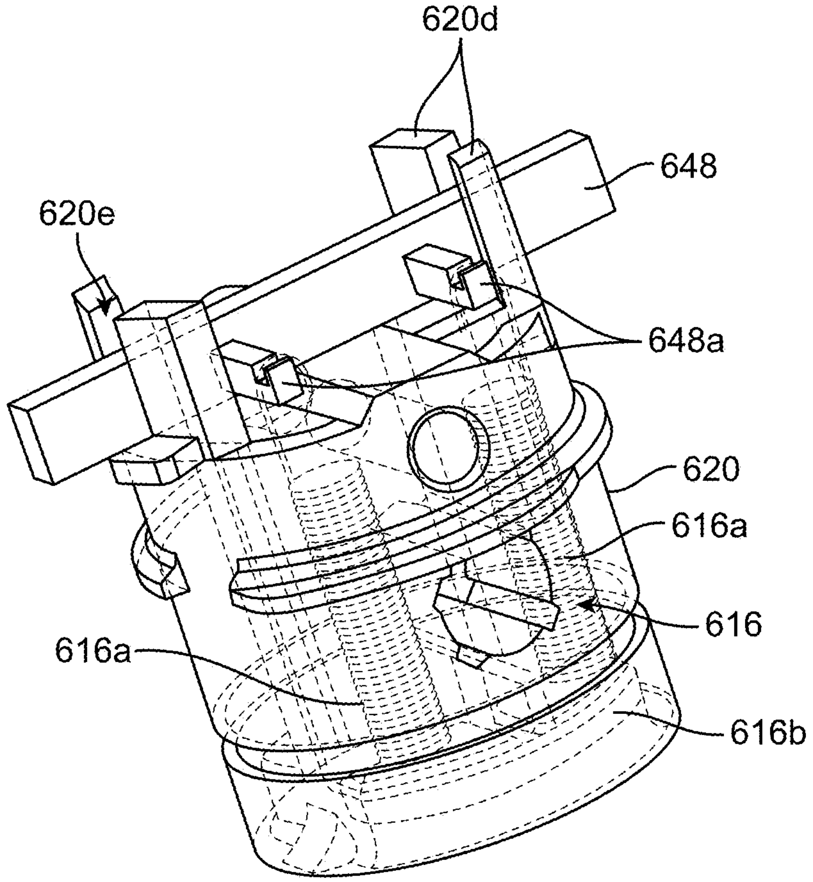
FIG. 17 is a perspective view of the blade change mechanism of FIG. 16.

The blade change mechanism 600 includes an eject bar 648 which is biased in the first direction D1 by a spring assembly 616. The spring assembly 616 includes a pair of springs 616*a* and a plate 616*b*. As illustrated in FIG. 17, one end of each of the springs 616*a* are each coupled to the plate 616*b*. The plate 616*b* is secured to the body 620. In some embodiments, the springs 616*a* may be welded or otherwise secured to the plate 616*b*. It is envisioned that one end of each of the springs 616*a* may be otherwise secured to the body 620 without the plate 616*b*.

The springs 616*a* each provide tensile force to the eject bar 648 to bias the eject bar 648 in the first direction D1. More specifically, the ends of the springs 616*a* opposite the plate 616*b* may be coupled to arms 648*a* of the eject bar 648. The arms 648*a* are spaced from one another along the length of the eject bar 648 and on opposite sides of the longitudinal axis LA. The springs 616*a* are also spaced from one another along the length of the plate 616*b* on opposite sides of the longitudinal axis LA. Accordingly, each of the springs 616*a* are engageable with one of the arms 648*a*. In other embodiments, fewer or more springs 616*a* may engage corresponding arms 648*a*. In the illustrated embodiment, the arms 648*a* extend perpendicular from the eject bar 648. The eject bar 648 replaces the bar 204*b* of the trigger sleeve 204 of the blade change mechanism 200 that is described above with regard to FIGS. 3-7B. The eject bar 648 is positioned in a bar receiving slot 620*e* between alignment projections 620*d* and is inhibited from rotation about the longitudinal axis LA in the bar receiving slot 620*e* by the projections 620*d*.

Figure 18A:
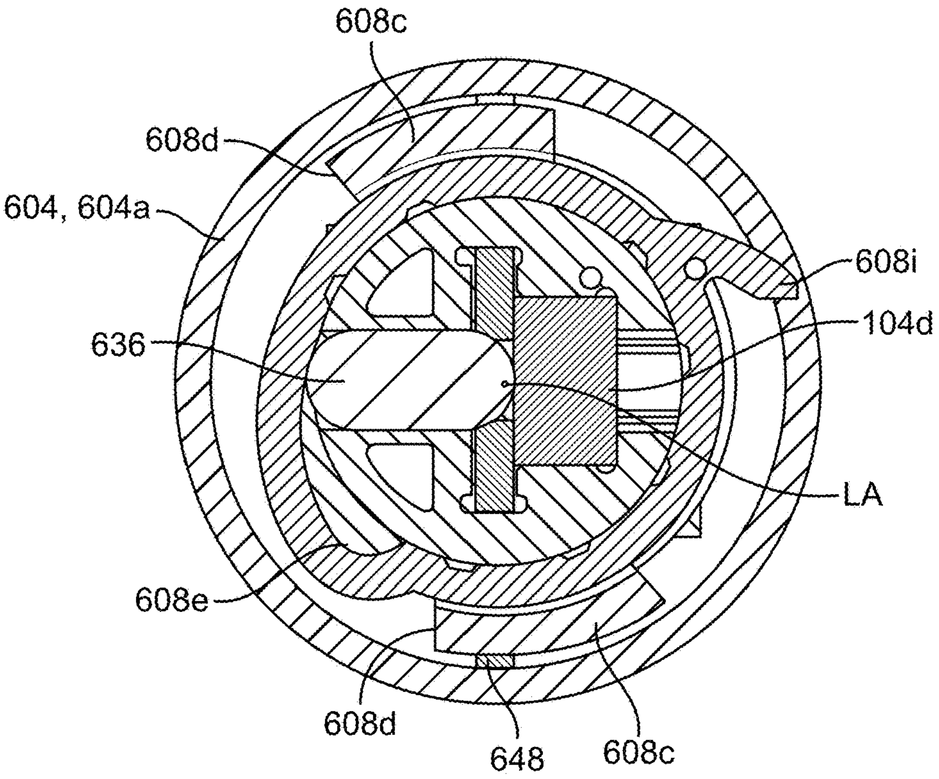
FIG. 18A is a cross-sectional view of the blade change mechanism of FIG. 16 in a locked position taken perpendicularly from a longitudinal axis of the blade change mechanism and in intersection with a lock pin of the blade change mechanism.
Figure 18B:
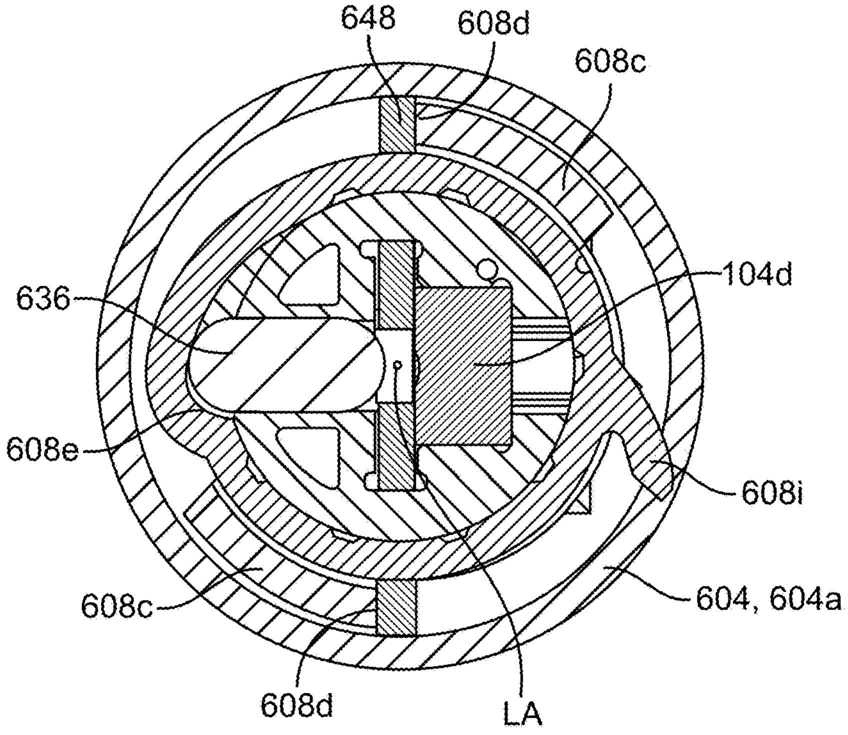
FIG. 18B is a cross-sectional view of the blade change mechanism of FIG. 16 17 in an unlocked position taken perpendicularly from a longitudinal axis of the blade change mechanism and in intersection with the lock pin of the blade change mechanism.
Figure 19A:
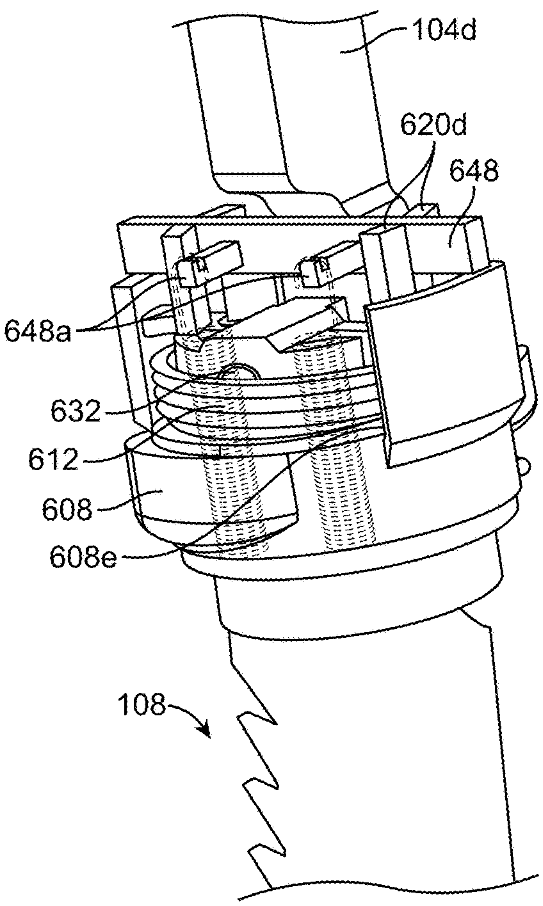
FIG. 19A is a perspective view of the blade change mechanism of FIG. 16 in the locked position.
Figure 19B:
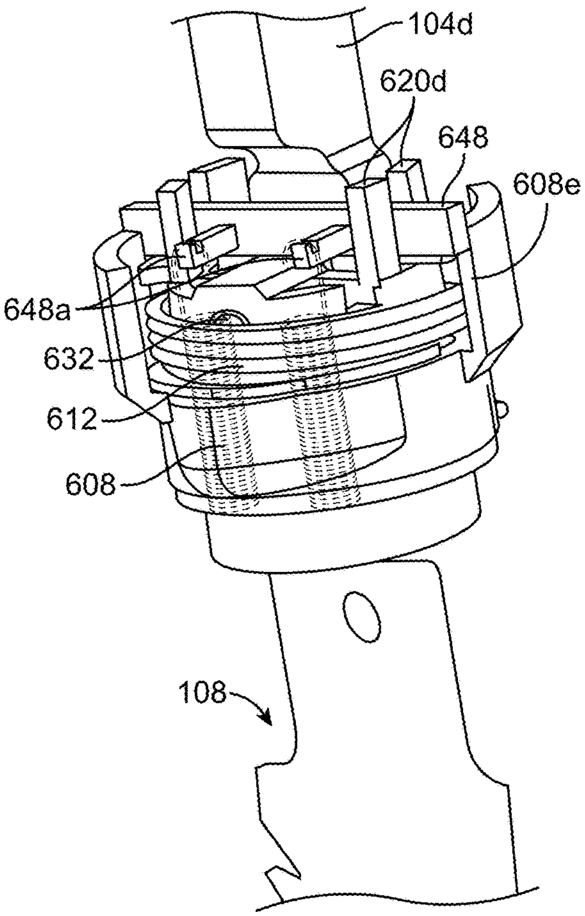
FIG. 19B is a perspective view of the blade change mechanism of FIG. 16 in the unlocked position.

As best illustrated in FIGS. 18A-19B, the eject bar 648 is movable between a locked position (FIGS. 18A, 19A) and an unlocked position (FIGS. 18B, 19B). Unlike the blade change mechanism 200 and the bar 204*b*, the eject bar 648 is biased in the first direction D1 due to tensile force applied by the springs 616*a*.

In the illustrated embodiment, the lock pin 636, cam surface 608*e*, and torsional spring 612 define a blade retention structure that cooperates to hold the blade 108 in the locked position until release of the blade 108 is desired. In the illustrated locked position, the lock pin 636 contacts the blade 108, and the lock pin 636 is held in position by the cam surface 608*e*. The eject sleeve 608 and thus the cam surface 608*e* are biased toward the locked position by the torsional spring 612. It will be appreciated that the blade retention structure may include other components or structure to additionally or separately hold the blade in the locked position.

In the illustrated embodiment, the eject bar 648, abutment surfaces 608*d*, and springs 616*a* define a blade release structure that cooperates to release the blade 108 from the locked position to the unlocked position when desired. In the illustrated unlocked position, the eject bar 648 is held in engagement with the abutment surfaces 608*d* by the springs 616*a*. It will be appreciated that the blade retention structure may include other components or structure to additionally or separately hold the blade in the unlocked position.

Figure 20:
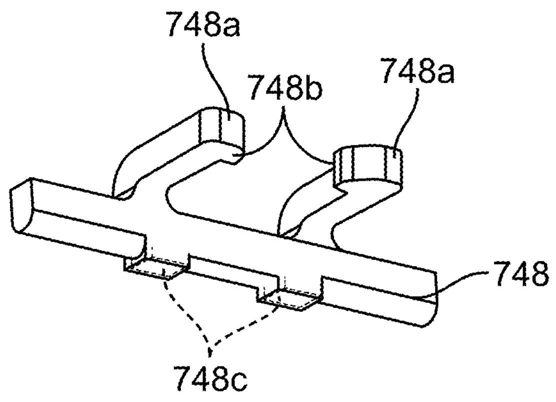
FIG. 20 is a perspective view of another exemplary eject bar for the blade change mechanism of FIG. 16.
Figure 21:
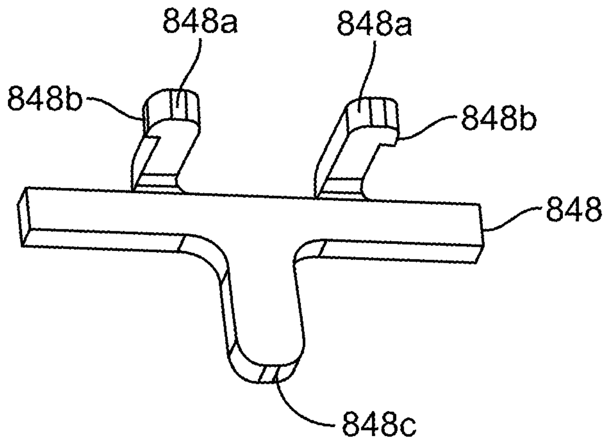
FIG. 21 is a perspective view of yet another exemplary eject bar for the blade change mechanism of FIG. 16.
Figure 22A:
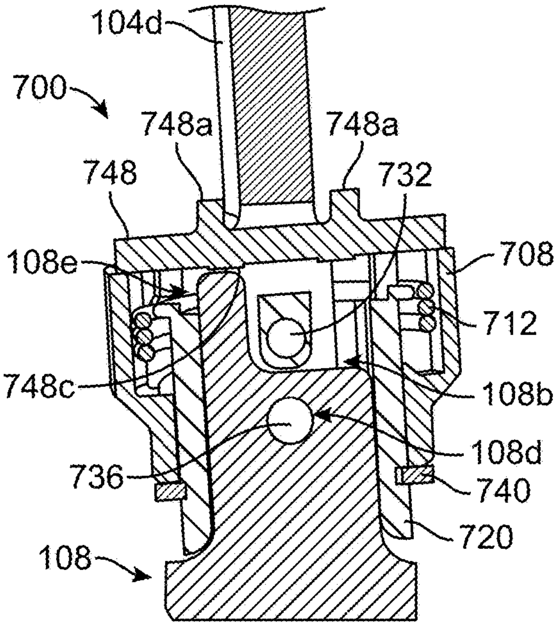
FIG. 22A is a cross-sectional view of a blade change mechanism including the eject bar of FIG. 20.
Figure 22B:
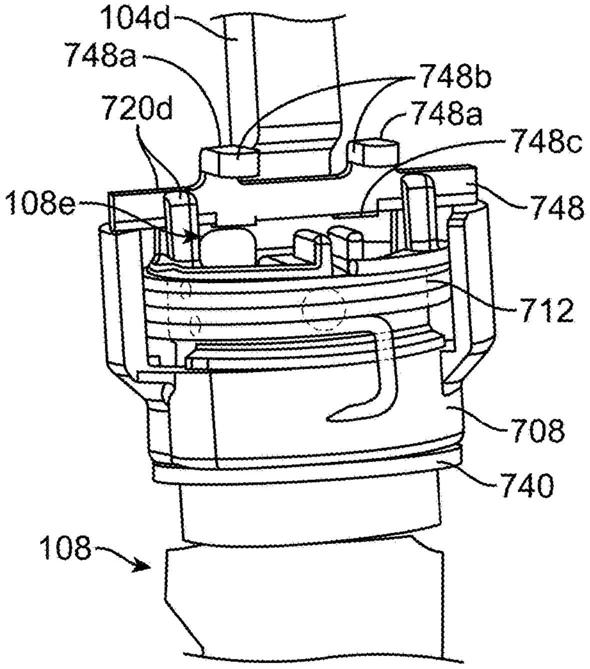
FIG. 22B is a perspective view of the blade change mechanism including the eject bar of FIG. 20.

FIGS. 20, 22A, and 22B illustrate another blade change mechanism 700 including an eject bar 748. Except as described below, the blade change mechanism 700 is the same as the blade change mechanism 600 and is movable between a locked position in which the blade 108 is secured to the drive mechanism 104 and an unlocked position in which the blade 108 is removable from (e.g., removably coupled to) drive mechanism 104. Components of the blade change mechanism 700 are the same as or similar to the components of the blade change mechanisms 200, 600 and are annotated with '700' series reference numerals to describe components of the blade change mechanism 700.

The eject bar 748 includes a pair of arms 748*a* having tangs 748*b* that extend toward the center of the eject bar 748. The eject bar 748 optionally may include blade engaging protrusions 748*c* that extend along the longitudinal axis LA in the first direction D1 from the remainder of the eject bar 748. The protrusions 748*c* protrude a small amount (e.g., between 0.2 millimeters and 0.5 millimeters) from the eject bar 748. As illustrated in FIGS. 22A and 22B, the protrusions 748*c* are configured to abut the finger 108*e* of the blade 108. Accordingly, as the blade 108 is pressed in the second direction D2, the finger 108*e* can contact the protrusions 748*c* to push the eject bar 748 in the second direction D2. The blade change mechanism 700 transitions to the locked position as the eject bar 748 is pushed in the second direction D2. As shown in FIG. 22B, the arms 748*a* are positioned on opposite sides of the transmission rod 104*d* with the tangs 748*b* facing towards the transmission rod 104*d* such that the springs 616*a* can be engaged by the tangs 748*b*. The tangs 748*b* may be otherwise provided on the arms 748*a*. In the illustrated embodiment, protrusions 748*c* are provided on opposite sides of the longitudinal axis LA of the eject bar 748.

Accordingly, in some embodiments, blades 108 with the fingers 108*e* extending from either side may press on the eject bar 748 with equal spacing. In other instances, the same blade 108 may be mounted in either a forward-facing position, as illustrated in FIG. 1 with the teeth 108*c* facing away from the motor 104*a* and the battery pack 104*b*, or a rearward-facing relationship (not illustrated) with the teeth 108*c* facing toward the motor 104*a* and the battery pack 104*b* (upward in FIG. 1). In either the forward-facing position or the rearward-facing position, the finger 108*e* of the blade 108 may press on the eject bar 748 with equal spacing. It should be appreciated that the eject bar 748 does not require the protrusions 748*c* for the assembly to function as described.

Figure 23A:
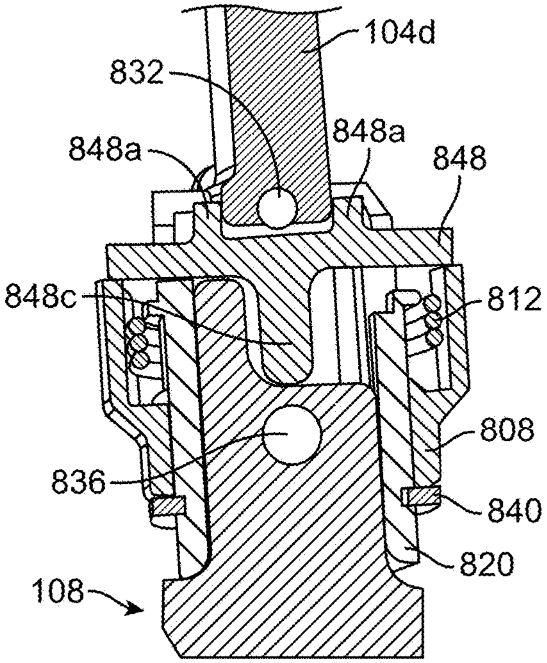
FIG. 23A is a cross-sectional view of a blade change mechanism including the eject bar of FIG. 21.
Figure 23B:
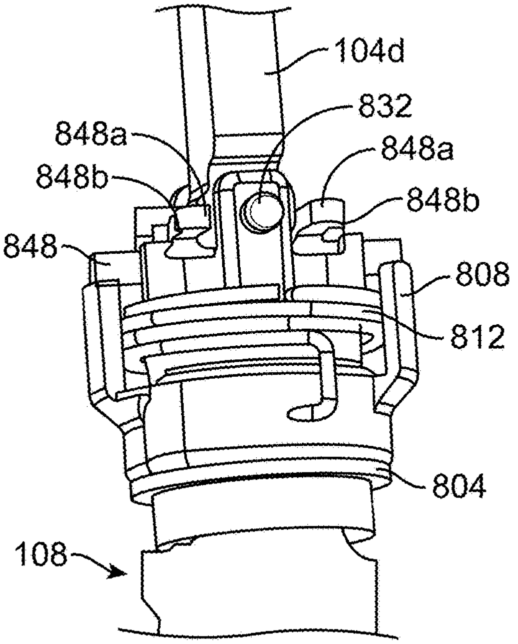
FIG. 23B is a perspective view of the blade change mechanism including the eject bar of FIG. 21.

FIGS. 23A-23B illustrate another blade change mechanism 800 including an eject bar 848. Except as described below, the blade change mechanism 800 is the same as the blade change mechanism 600 and is movable between a locked position in which the blade 108 is secured to the drive mechanism 104 and an unlocked position in which the blade 108 is removable from (e.g., removably coupled to) drive mechanism 104. Components of the blade change mechanism 800 are to the same as or similar to the components of the blade change mechanism, 200, 600 and are annotated with '800' series reference numerals to describe components of the blade change mechanism 800.

The eject bar 848 includes a pair of arms 848*a* having tangs 848*b* that extend outwardly from the center of the eject bar 848. The eject bar 848 also includes a finger 848*c* that extends along the longitudinal axis LA in the first direction D1 from the remainder of the eject bar 848. The protrusions 748*c* protrude from the eject bar 848 an amount generally corresponding to the amount the finger 108*e* protrudes from the base end 108*b* of the blade 108. As illustrated in FIGS. 23A and 23B, the fingers 848*c* are configured to abut the base end 108*b* of the blade 108. Accordingly, as the blade 108 is pressed in the second direction D2, the base end 108*b* can contact the finger 848*c* to push the eject bar 848 in the second direction D2. The blade change mechanism 800 transitions to the locked position as the eject bar 848 is pushed in the second direction D2. As shown in FIG. 23B, the arms 848*a* are positioned on opposite sides of the transmission rod 104*d* with the tangs 848*b* facing away from the transmission rod 104*d* such that the springs 616*a* can be engaged by the tangs 848*b*. The tangs 848*b* may be otherwise provided on the arms 848*a*. In the illustrated embodiment, the finger 848*c* is provided in alignment with the longitudinal axis LA.

Figure 24B:
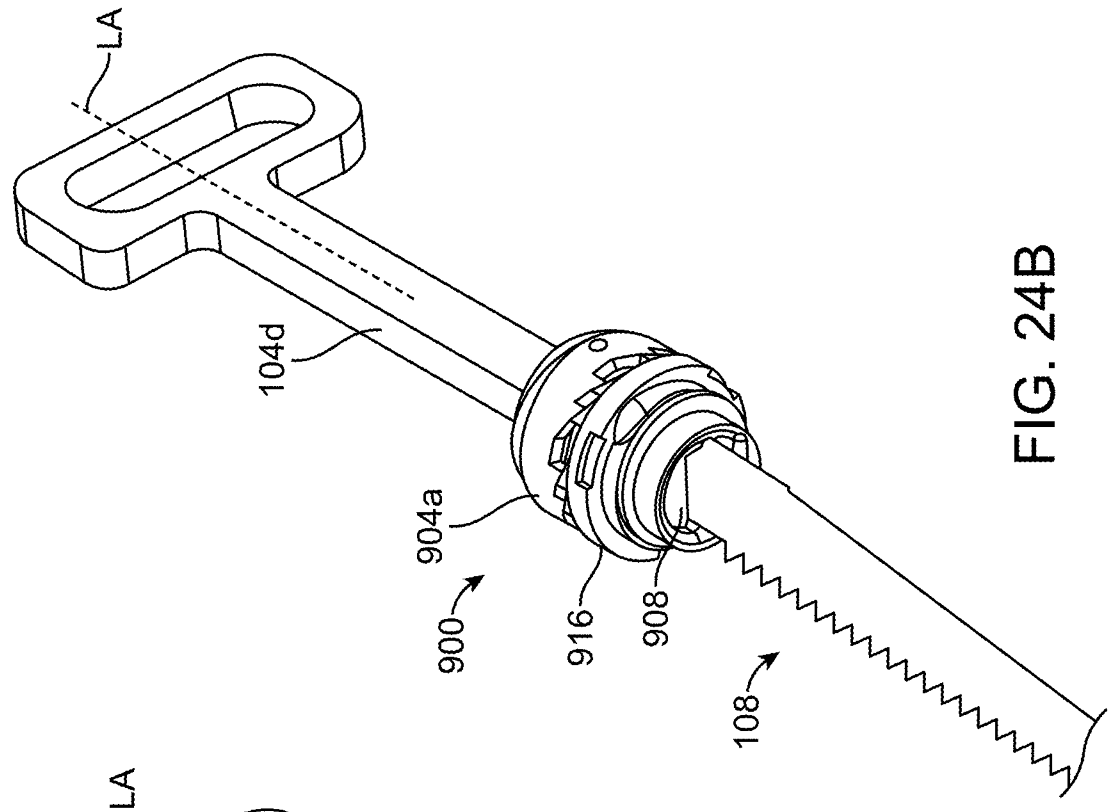
FIG. 24B is another perspective view of the blade change mechanism of FIG. 24A with the outer lock sleeve removed.
Figure 24A:
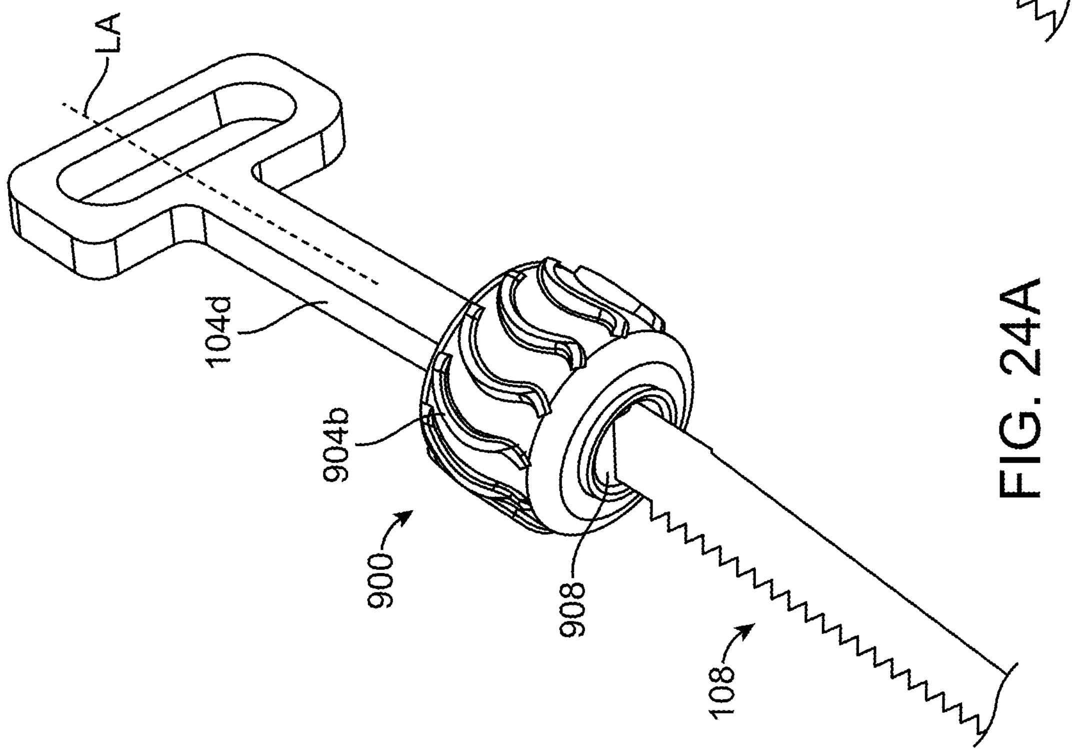
FIG. 24A is a perspective view of another blade change mechanism including an outer lock sleeve.
Figure 25:
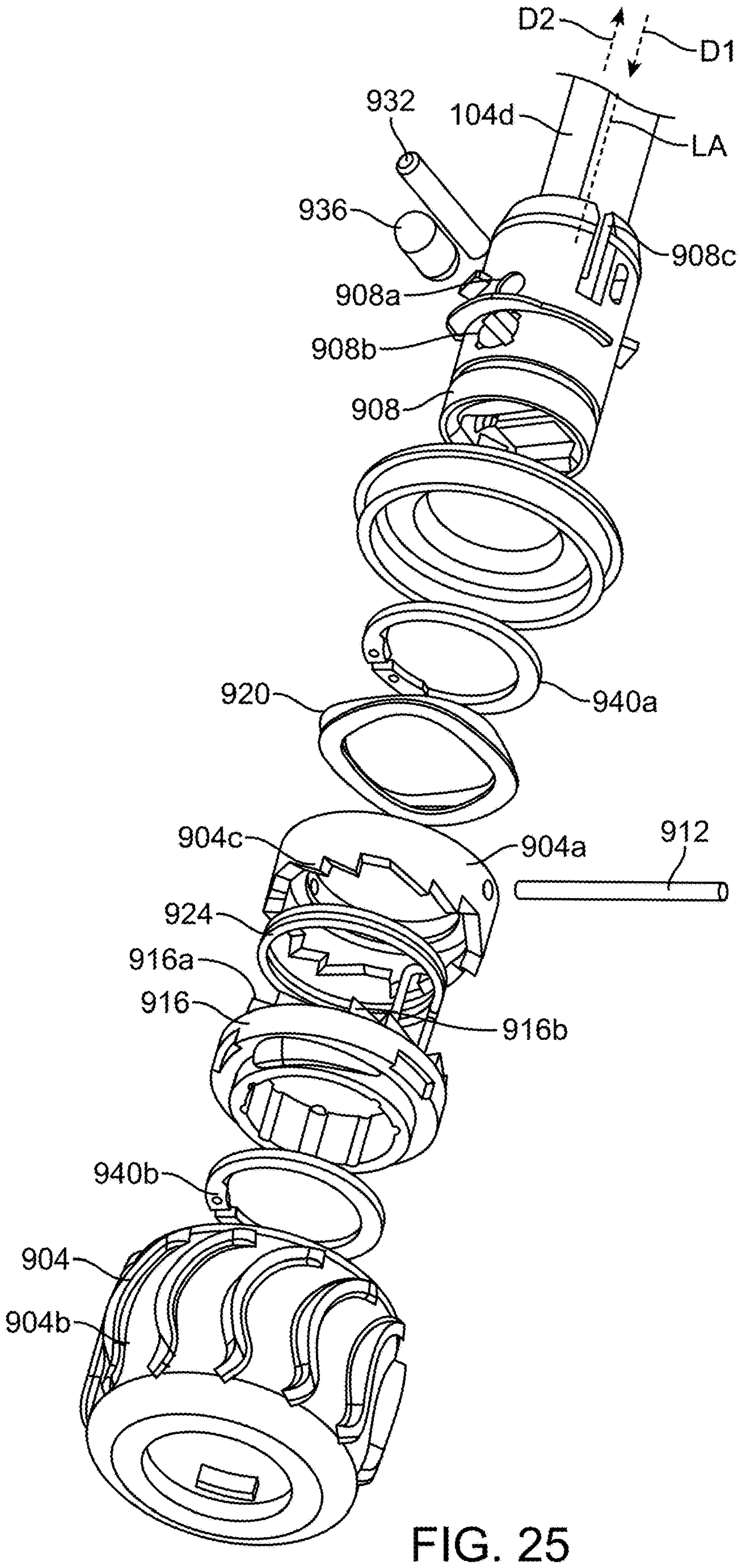
FIG. 25 is an exploded view of the blade change mechanism of FIG. 24A.
Figure 26A:
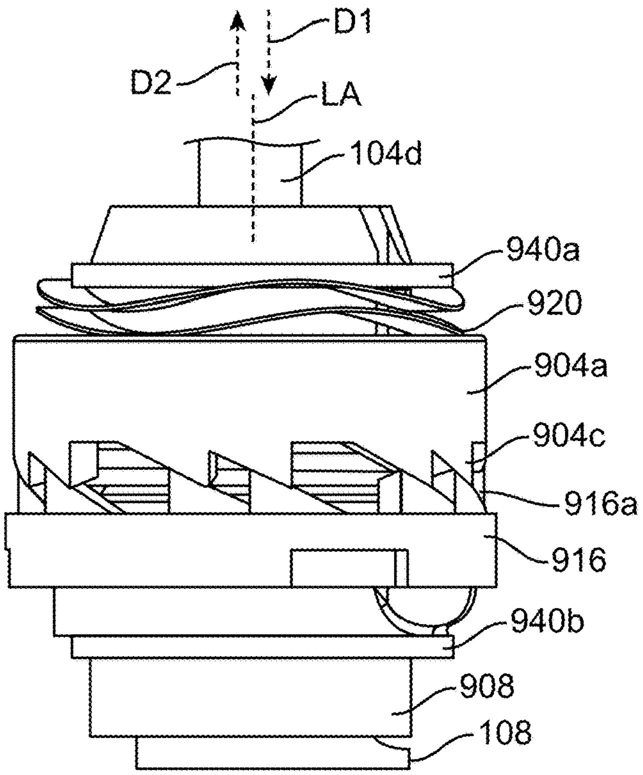
FIG. 26A is a side view of the blade change mechanism of FIG. 24A in an unlocked position and with the outer lock sleeve removed.
Figure 26B:
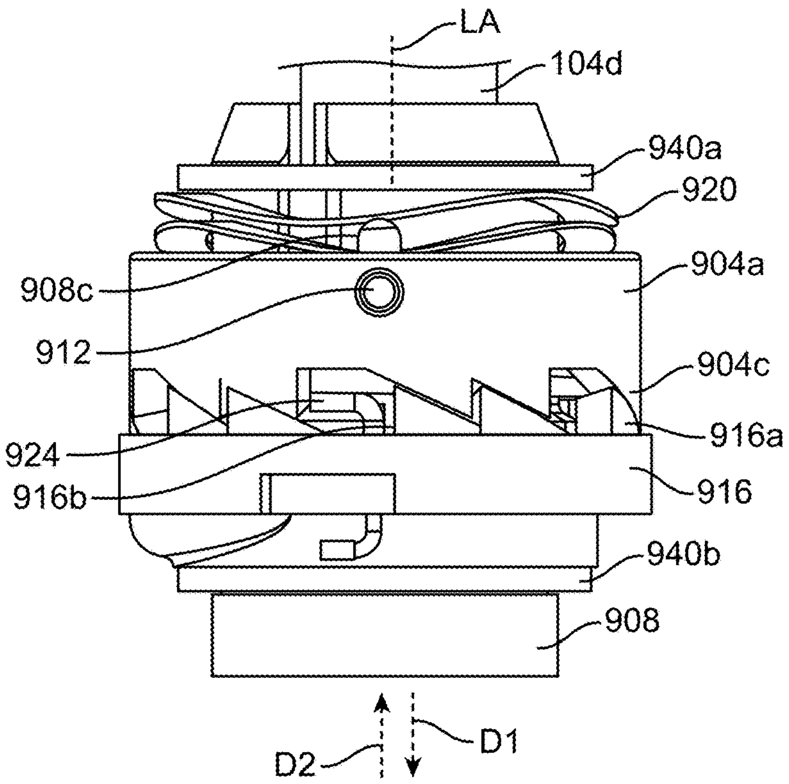
FIG. 26B is another side view of the blade change mechanism of FIG. 24A in a locked position and with the outer lock sleeve removed.
Figure 27A:
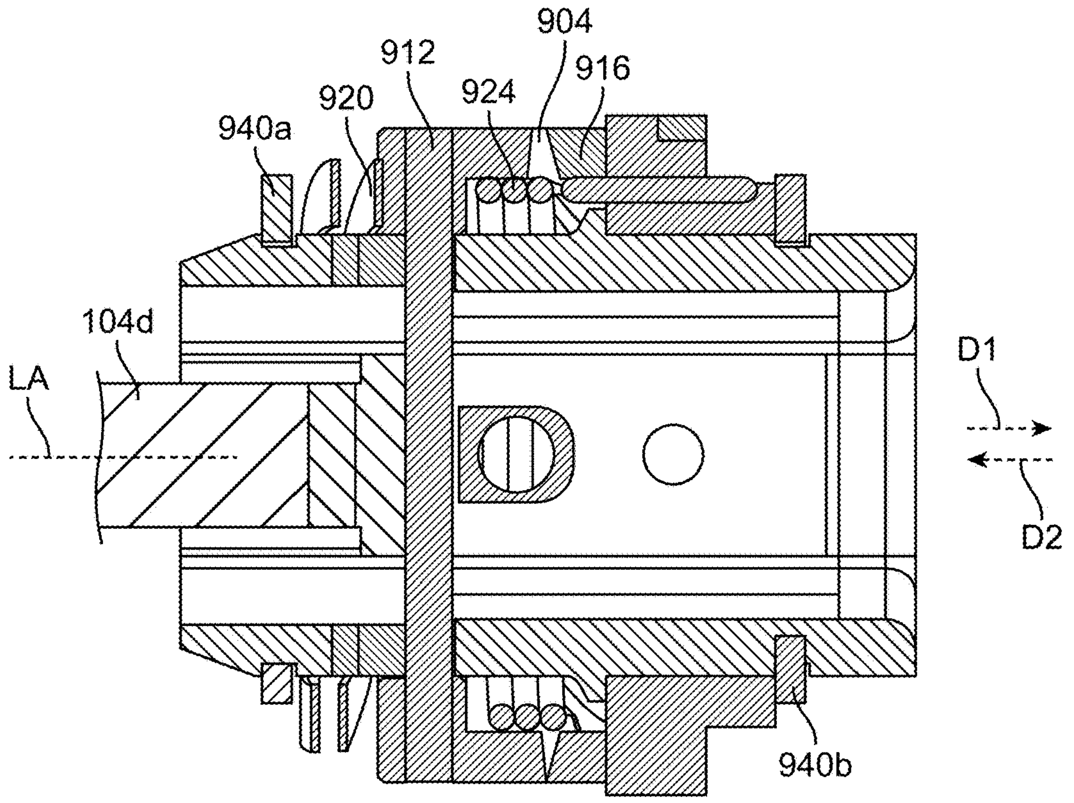
FIG. 27A is a cross-sectional view of the blade change mechanism of FIG. 24A in the unlocked position and with the outer lock sleeve removed.
Figure 27B:
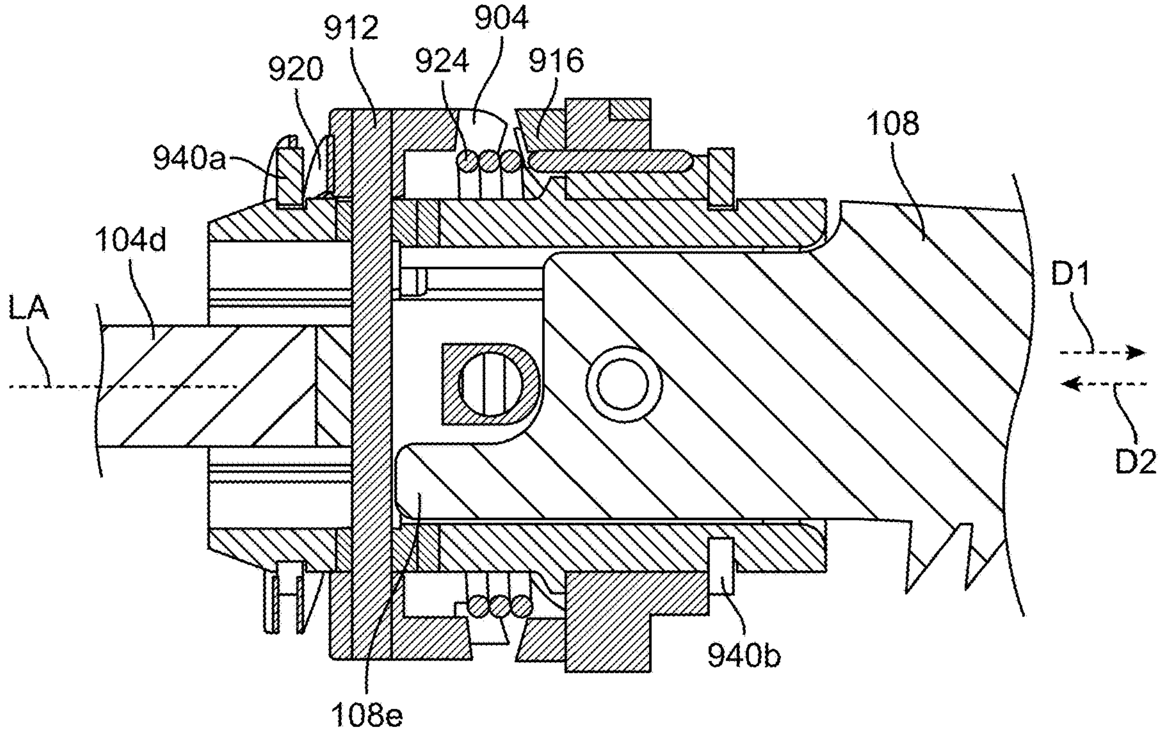
FIG. 27B is a cross-sectional view of the blade change mechanism of FIG. 24A in the locked position and with the outer lock sleeve removed.
Figure 28A:
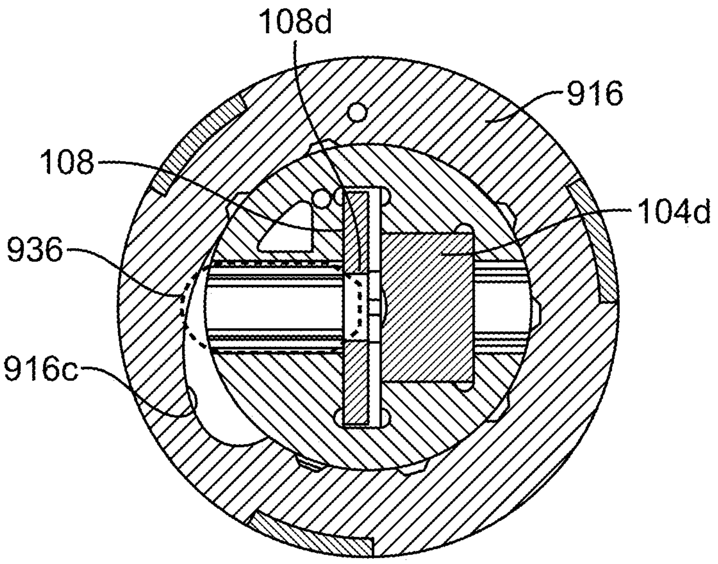
FIG. 28A is another cross-sectional view of the blade change mechanism of FIG. 24A in the locked position.
Figure 28B:
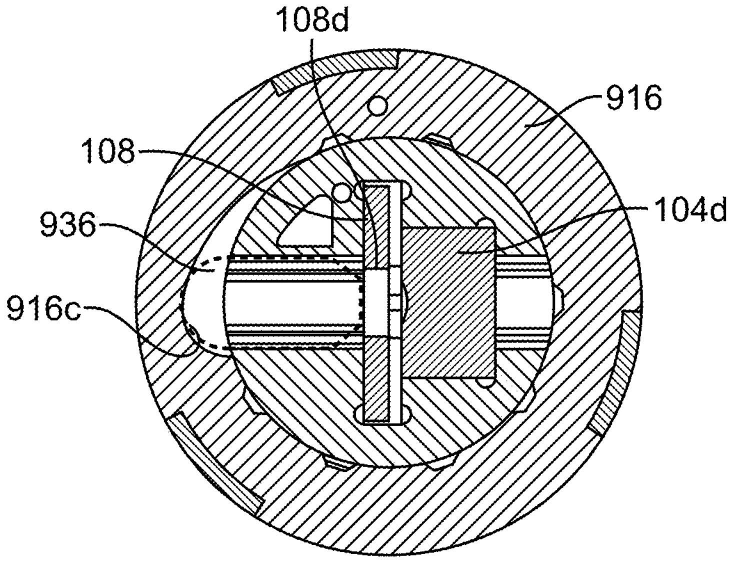
FIG. 28B is another cross-sectional view of the blade change mechanism of FIG. 24A in the unlocked position.

FIGS. 24A-28B illustrate another blade change mechanism 900. The blade change mechanism 900 is movable between a locked position in which the blade 108 is secured to the drive mechanism 104 and an unlocked position in which the blade 108 is removable from (e.g., removably coupled to) drive mechanism 104. In the exemplary blade change mechanism, as the blade change mechanism 900 reaches or nears the unlocked position, the blade 108 is ejected from the blade change mechanism 900. The blade change mechanism 900 includes a lock sleeve 904 which fits over a body 908. As illustrated in FIG. 24, the lock sleeve 904 includes an inner portion 904*a* (i.e. an inner lock sleeve) and an outer portion 904*b* (i.e. an outer lock sleeve). The inner portion 904*a* is positioned radially within the outer portion 904*b*. The body 908 includes a hole 908*a* for receiving a pin 932 which couples the body 908 to the transmission rod 104*d* and another hole 908*b* for receiving a lock pin 936. The lock sleeve 904 is pinned (e.g., secured) via a third pin 912 to the body 908 such that the lock sleeve 904 can only move axially along the longitudinal axis LA in a slot 908*c* of the body 908. Wave washers 920 may be stacked onto one another between an upper retainer 940*a* and the inner portion 904*a* of the lock sleeve 904 to bias the lock sleeve 904 forward (e.g., in the first direction D1).

Still referring to FIGS. 24A-28B, a pin sleeve 916 receives a lock pin (e.g., internal pin) 936 therein. The pin sleeve 916 includes a plurality of ramps 916*a* which generally oppose the ramps 904*c* of the lock sleeve 904. The wave washers 920 provide linear force in a direction parallel to the longitudinal axis LA to force engagement between the ramps 916*a* of the pin sleeve 916 and the ramps 904*c* of the lock sleeve 904. The pin sleeve 916 stops rotation past the unlocked position, and a block 916*b* (e.g., a side surface of one of the ramps 916*a*) of the pin sleeve 916 engages against the last ramp 904*c* on the lock sleeve 904 to prevent further rotation of the lock sleeve 904 relative to the pin sleeve 916.

In other words, the lock sleeve 904 is not capable of overclocking toward the unlocked position.

In use, the pin sleeve 916 and the lock sleeve 904 interact via a series of ramps 904*c*, 916*a* thereon that allow clockwise (opening) rotation and do not allow counter-clockwise (closing) rotation. Insertion of the blade 108 pushes on the third pin 912 of the lock sleeve 904 to move the lock sleeve 904 in the second direction D2 (e.g., backward) so that ramps 904*c* of the lock sleeve 904 clear the ramps 916*a* on the pin sleeve 916. At this point, the pin sleeve 916 rotates counter-clockwise about the longitudinal axis LA to the locked position due to a torsional spring 924, and the lock pin 936 presses the blade 108 against the transmission rod 104*d* to secure the blade 108 to the drive mechanism 104. When the pin sleeve 916 is manually turned clockwise, there is tactile feedback (clicking) due to the ramps 904*c*, 916*a* contacting one another, and the lock pin 936 retracts from pressing the blade 108 due to a cam surface 916*c* (FIGS. 28A, 28B) in the pin sleeve 916. The pin sleeve 916 is biased to turn counter-clockwise by the torsional spring 924. Rotation angle of the pin sleeve 916 is limited by the interaction of the pin sleeve 916 with the lock pin 936 and with the body 908.

In the illustrated embodiment, the lock pin 936, cam surface 916*c*, and torsional spring 924 define a blade retention structure that cooperates to hold the blade 108 in the locked position until release of the blade 108 is desired. In the illustrated locked position, the lock pin 936 contacts the blade 108, and the lock pin 936 is held in position by the cam surface 916*c*. The pin sleeve 916 and thus the cam surface 916*c* are biased toward the locked position by the torsional spring 924. It will be appreciated that the blade retention structure may include other components or structure to additionally or separately hold the blade in the locked position.

In the illustrated embodiment, the ramps 904*c*, block 916*b*, and wave washers 920 define a blade release structure that cooperates to release the blade 108 from the locked position to the unlocked position when desired. In the illustrated unlocked position, the ramps 904*c* are held in engagement with the block 916*b* by the wave washers 920. It will be appreciated that the blade retention structure may include other components or structure to additionally or separately hold the blade in the unlocked position.

FIGS. 29A-30B illustrate slightly different trigger sleeves 1004, 1104 for use in blade change mechanisms 1000, 1100, respectively, which are similar to the blade change mechanism 800. Like reference numerals as described above with regard to the blade change mechanism 800 and the trigger sleeve 304 are annotated with '1000' and '1100' series reference numerals to identify components of the blade change mechanisms 1000, 1100 and trigger sleeves 1004, 1104.

Figure 29A:
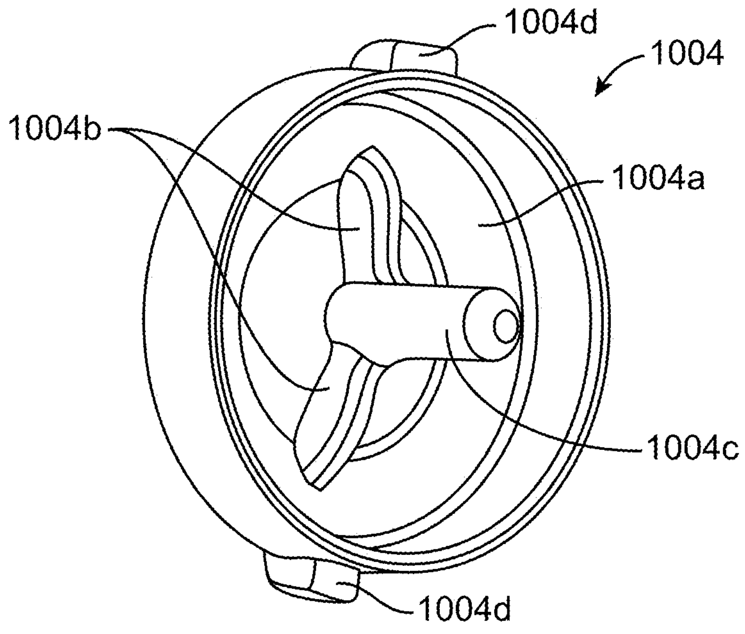
FIG. 29A is a perspective view of another trigger sleeve for use with a blade change mechanism.
Figure 29B:
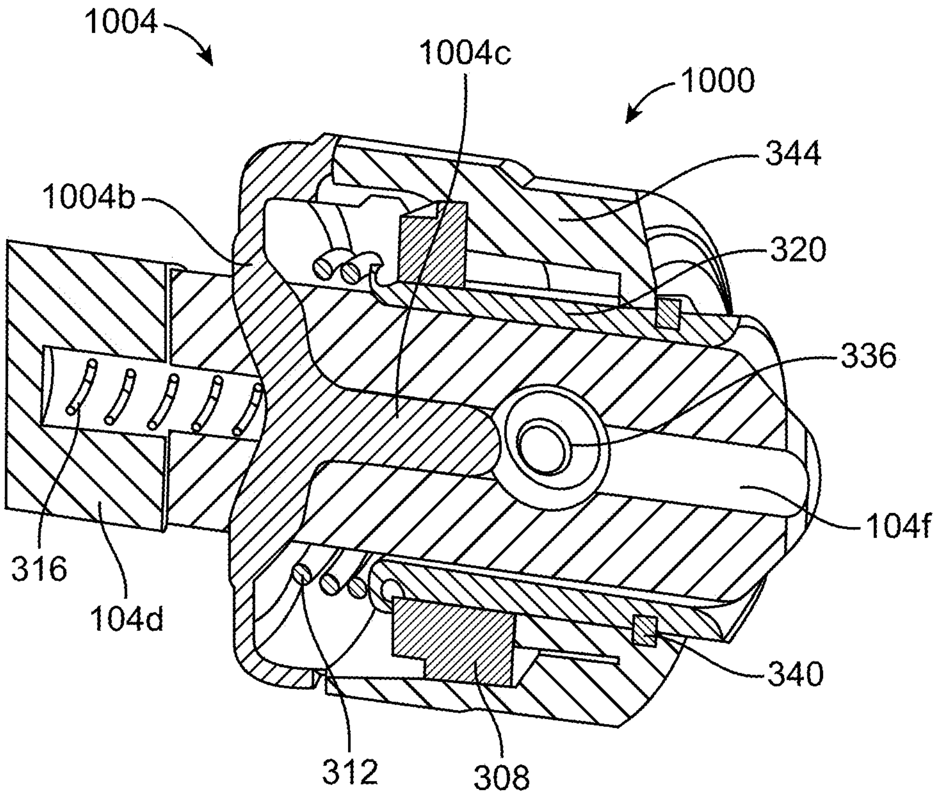
FIG. 29B is a cross-sectional view of a blade change mechanism and the alternate trigger sleeve of FIG. 29A.

With reference to FIGS. 29A and 29B, the trigger sleeve 1004 includes a body 1004*a*, a bar 1004*b*, a finger 1004, and tabs 1004*d* similar to the trigger sleeve 304. The bar 1004*b* is dimensioned with curves such that the overall shape of the bar 1004*b* is slightly different in comparison with the bar 304*b*. Each of the bar 304*b* and the bar 1004*b* is integrally formed with the bodies 304*a*, 1004*a*, respectively.

Figure 30A:
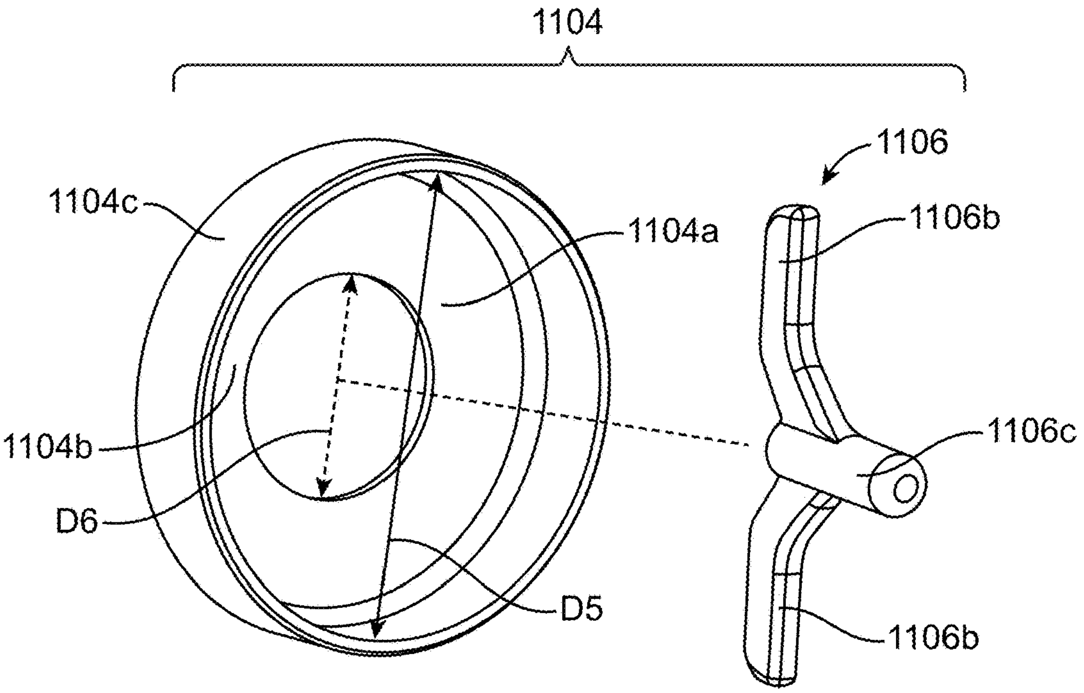
FIG. 30A is a perspective view of another alternate trigger sleeve for use with a blade change mechanism.
Figure 30B:
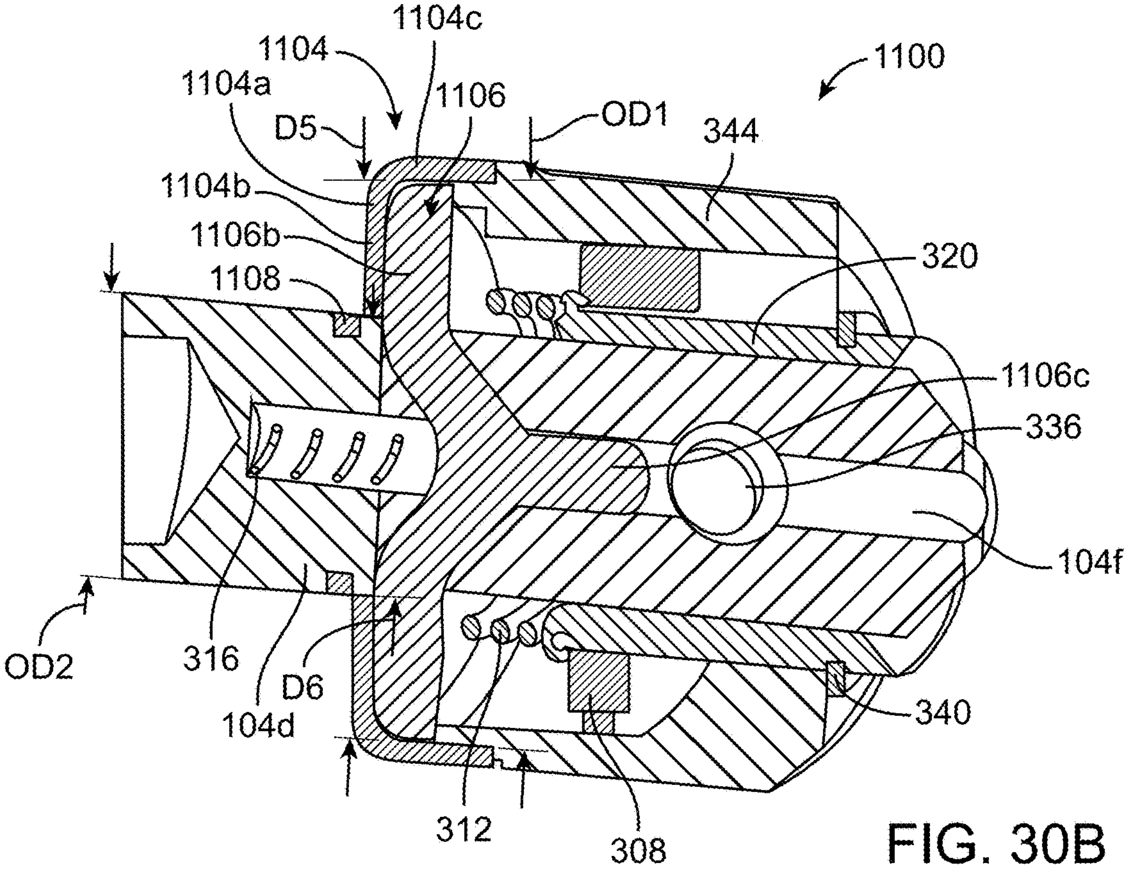
FIG. 30B is a cross-sectional view of a blade change mechanism and the alternate trigger sleeve of FIG. 30A.
Figure 30C:
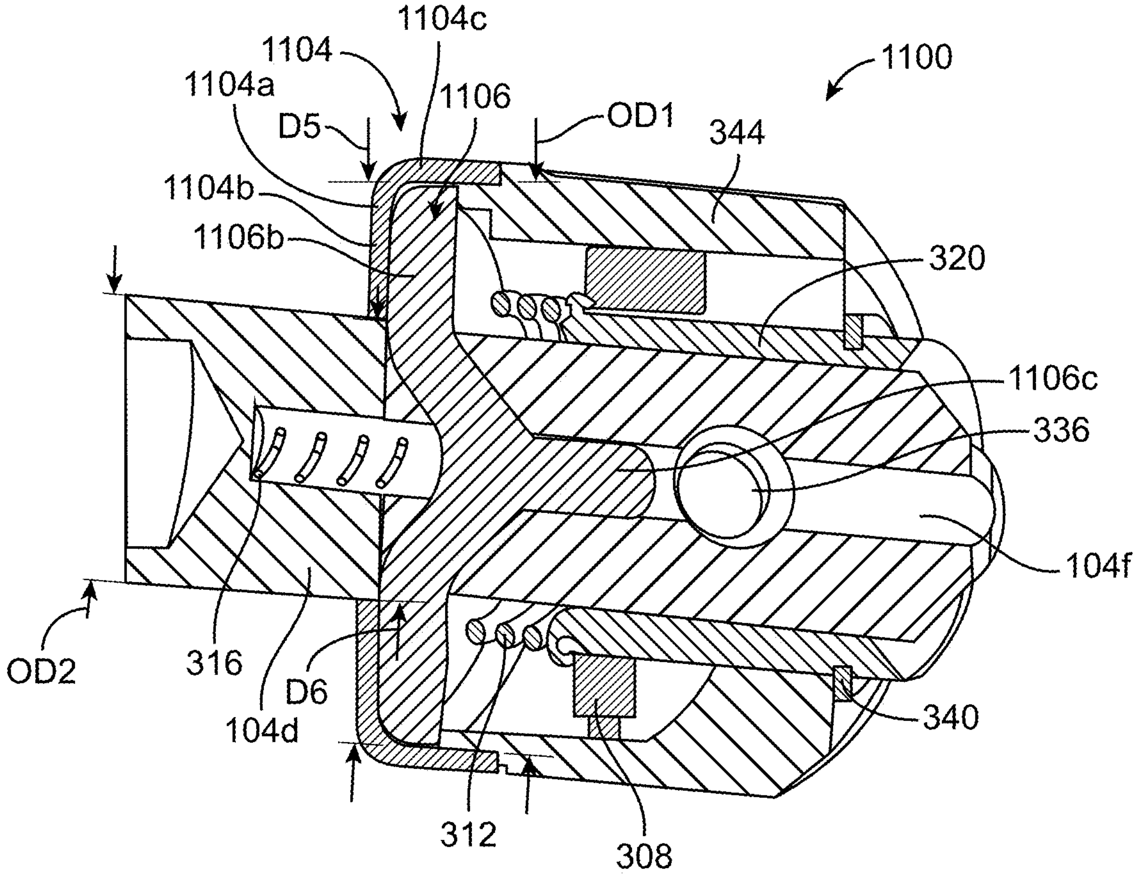
FIG. 30C is a cross-sectional view of another blade change mechanism and the alternate trigger sleeve of FIG. 30A.
Figure 31:
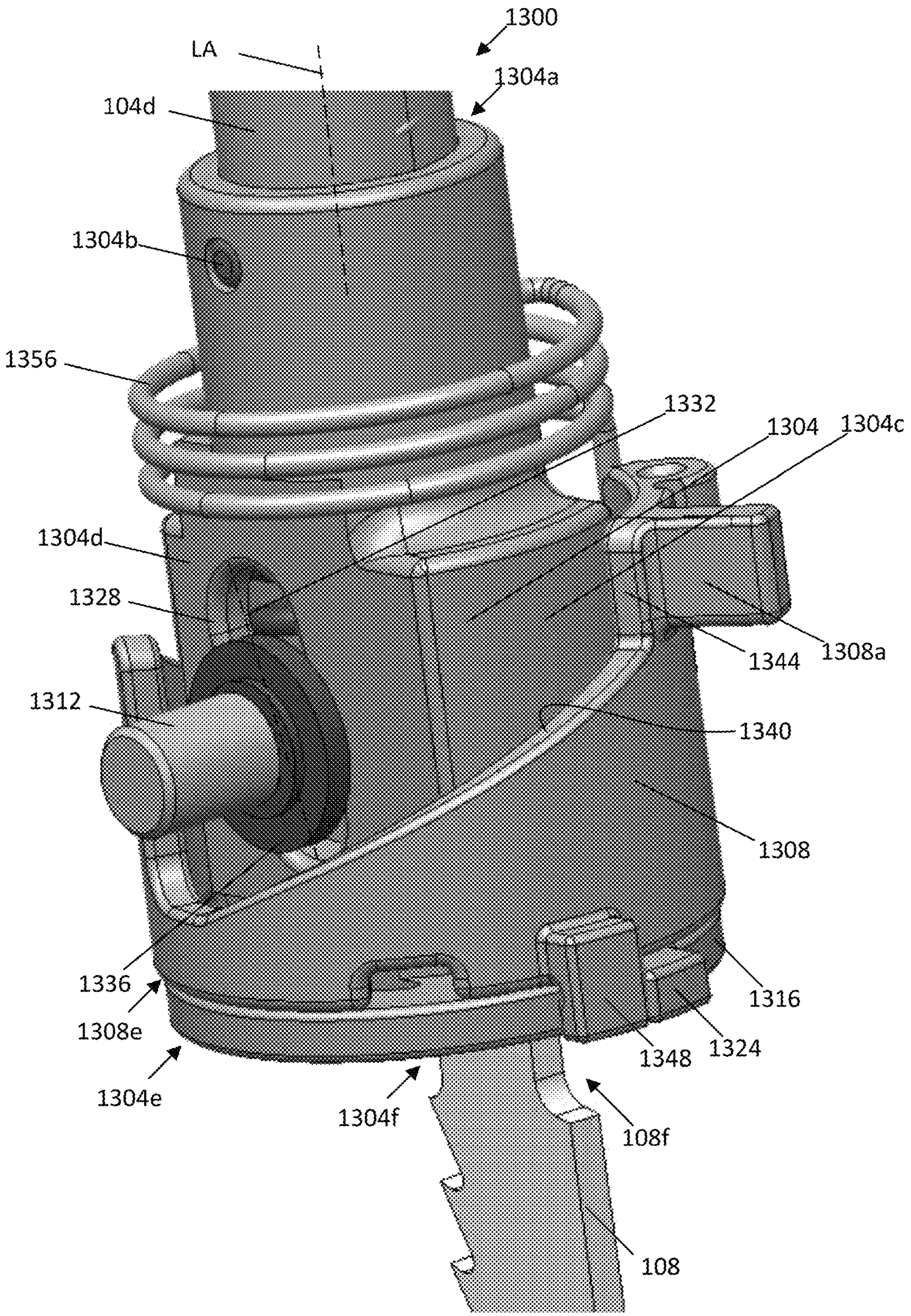
FIG. 31 is a perspective view of another blade change mechanism including a clamp member, a sleeve, and a lock pin.

With reference to FIGS. 30A and 30B, the trigger sleeve 1104 includes a body 1104*a* and a separate bar 1106. The body 1104*a* includes a radially extending portion 1104*b* and an axially extending portion 1104*c* that are connected to one another and take the form of annular disks. The bar 1106 includes two arms 1106*b* each extending from a finger 1106*c*. By forming the trigger sleeve 1104 with a separate body 1104*a* and bar 1106, it is possible to manufacture and process the body 1104*a* and the bar 1106 more efficiently. Additionally, assembly of the blade change mechanism 1100 (FIG. 30B) may be made more efficient by providing a separate body 1104*a* and bar 1106.

With reference to FIG. 30A, the illustrated body 1104*a* does not include structure equivalent to the tabs 304*d* of the trigger sleeve 304. Rather, an outer surface of the body 1104*a* is smooth. In other embodiments, structure equivalent to the tabs 304*d* may be provided on the body 1104*a*. Alternately, the rear cam 308 and/or the front cam 344 may be dimensioned with structure to perform functions of the tabs 304*d*.

The axially extending portion 1104*c* defines an inner dimension (e.g., diameter) D5. As shown in FIG. 30B, a portion of the front cam 344 of the blade change mechanism 1100 defines an outer diameter OD1 which interfaces with the axially extending portion 1104*c* of the body 1104*a*. In the illustrated embodiment, the dimension D5 of the axially extending portion 1104*c* is nominally lesser than the outer diameter OD1 of the front cam 344 that an interference fit is present between the body 1104*a* and the front cam 344. During assembly, the body 1104*a* is press-fit to the front cam 344. Accordingly, fewer parts are utilized, and manufacturing is simplified. In the illustrated embodiment, the arms 1106*b* of the bar 1106 are dimensioned similarly but slightly lesser than the dimension D5 of the axially extending portion 1104*c*. The arms 1106*b* are received within the axially extending portion 1104*c* of the trigger sleeve 1104.

With continued reference to FIG. 30B, the transmission rod 104*d* defines an outer diameter OD2. In the illustrated embodiment, the outer diameter OD2 of the transmission rod 104*d* is approximately equal to a dimension D6 (e.g., diameter) that spans an inner surface radially extending portion 1104*b* of the body 1104*a*. In the illustrated embodiment, a clamp 1108 (e.g., e-ring, c-clamp) is positioned rearward of the body 1104*a* to axially retain the position of the body 1104*a* (e.g., and thus the entire trigger sleeve 1104). For example, the body 1104*a* may not be translated in a rearward direction away from the lock pin 336. In other embodiments, the clamp 1108 may be defined by a shoulder of the transmission rod 104*d* engaged by the radially extending portion 1104*b* (i.e. the transmission rod 104*d* has a larger diameter than the opening of the radially extending portion 1104*b*). However, in other embodiments, the outer diameter OD2 of the transmission rod 104*d* may be nominally greater than the dimension D6 such that an interference fit is present between the body 1104*a* and the transmission rod 104*d*. In these types of blade change mechanisms, as illustrated in the blade change mechanism 1200 of FIG. 30C, the clamp 1108 may be omitted to further simplify the manufacturing of and reduce the number of costs associated with manufacturing the blade change mechanism 1100.

FIGS. 31-35 illustrate another blade change mechanism 1300 that may be automatically shifted to a locked state in which the blade 108 is connected to the transmission rod 104*d* upon receipt of the blade 108. The blade change mechanism 1300 is configured to automatically eject the blade 108 on shifting the blade change mechanism 1300 to an unlocked state. The blade change mechanism 1300 includes a clamp 1304, a sleeve 1308, and a lock pin 1312. The sleeve 1308 is rotatable relative to the clamp 1304 to facilitate a blade exchange. The blade change mechanism 1300 is operable with blades (e.g., the blade 108 illustrated in FIGS. 31-35) which include base ends 108*b* having cutouts 108*f* with a tang 108*g*.

The clamp 1304 interacts with the sleeve 1308 and transmission rod 104*d* to selectively lock and unlock the blade 108 to the blade change mechanism 1300. A tool-side end 1304*a* of the clamp 1304 is secured to the transmission rod 104*d* of the power tool 100 by a clamp pin 1304*b*. The clamp 1304 is oriented along the longitudinal axis LA of the blade change mechanism 1300. The clamp 1304 is generally cylindrical in shape along the longitudinal axis LA. The clamp 1304 includes a body 1304*c* having sidewalls 1304*d* which are planar. A blade end 1304*e* of the clamp 1304 opposite the tool-side end 1304*a* of the clamp 1304 includes a disc 1316. The disc 1316 has an outer diameter greater than the body 1304*c*. The clamp 1304 is dimensioned to receive and contact with the blade 108. More specifically, the disc 1316 includes a step 1320 capable of abutting the tang 108*g* of the blade 108 as described in detail below. The disc 1316 further includes a tab 1324 which extends radially outwardly from the longitudinal axis LA. The clamp 1304 further includes an opening 1304*f* dimensioned to receive the blade 108.

The clamp 1304 further includes a slot 1328 in communication with the opening 1304*f*. The slot 1328 is elongated along a slot axis 1332. The slot axis 1332 extends in a direction which is not parallel to the longitudinal axis LA of the blade change mechanism 1300. The slot 1328 is angled relative to the longitudinal axis LA. The lock pin 1312 is restricted for movement along the slot axis 1332. More specifically, the lock pin 1312 is restricted for translating movement relative to the clamp 1304 along the slot axis 1332. The slot axis 1332 includes a vertical component 1332*a* which is parallel to the longitudinal axis LA and a horizontal component 1332*b* which extends in a direction generally perpendicular to the longitudinal axis LA. In the illustrated embodiment, the slot 1328 is a through hole in the sidewalls 1304*d* of the clamp 1304, and the lock pin 1312 is located at least partially within a volume defined by the body 1304*c* of the clamp 1304. At least a portion of the lock pin 1312 is located outside of the volume defined by the by the body 1304*c* of the clamp 1304. Stated another way, a portion of the lock pin 1312 protrudes (e.g., laterally outward) beyond the outer bounds of the body 1304*c*. In the illustrated embodiment, a retainer 1336 coupled to the lock pin 1312 ensure that the lock pin 1312 travels along the slot axis 1332 in an orientation in which the lock pin 1312 itself is oriented generally perpendicular to the longitudinal axis LA.

The sleeve 1308 is generally annularly shaped and surrounds the clamp 1304. The sleeve 1308 includes a ramp surface 1340 that terminates at an end surface 1344. The ramp surface 1340 is helically shaped about the longitudinal axis LA. More specifically, the ramp surface 1340 has variable axial height (e.g., along the longitudinal axis LA) along a circumferential direction about the clamp 1304. The end surface 1344 defines an instantaneous step in axial height of the sleeve 1308 at an end of the ramp surface 1340 and acts as a stop. The sleeve 1308 includes a blade-side end 1308*e* which includes a projection 1348. The projection 1348 extends in a direction parallel to the longitudinal axis LA. The projection 1348 is dimensioned to be guided (e.g., rotated) along an outer surface of the disc 1316 during rotation of the sleeve 1308 relative to the clamp 1304. In the illustrated embodiment, the slot axis 1332 extends in a direction substantially normal to the ramp surface 1340. In some embodiments, other relationships between the slot axis 1332 and the ramp surface 1340 are possible.

Figures 32, 33, 34, 35:
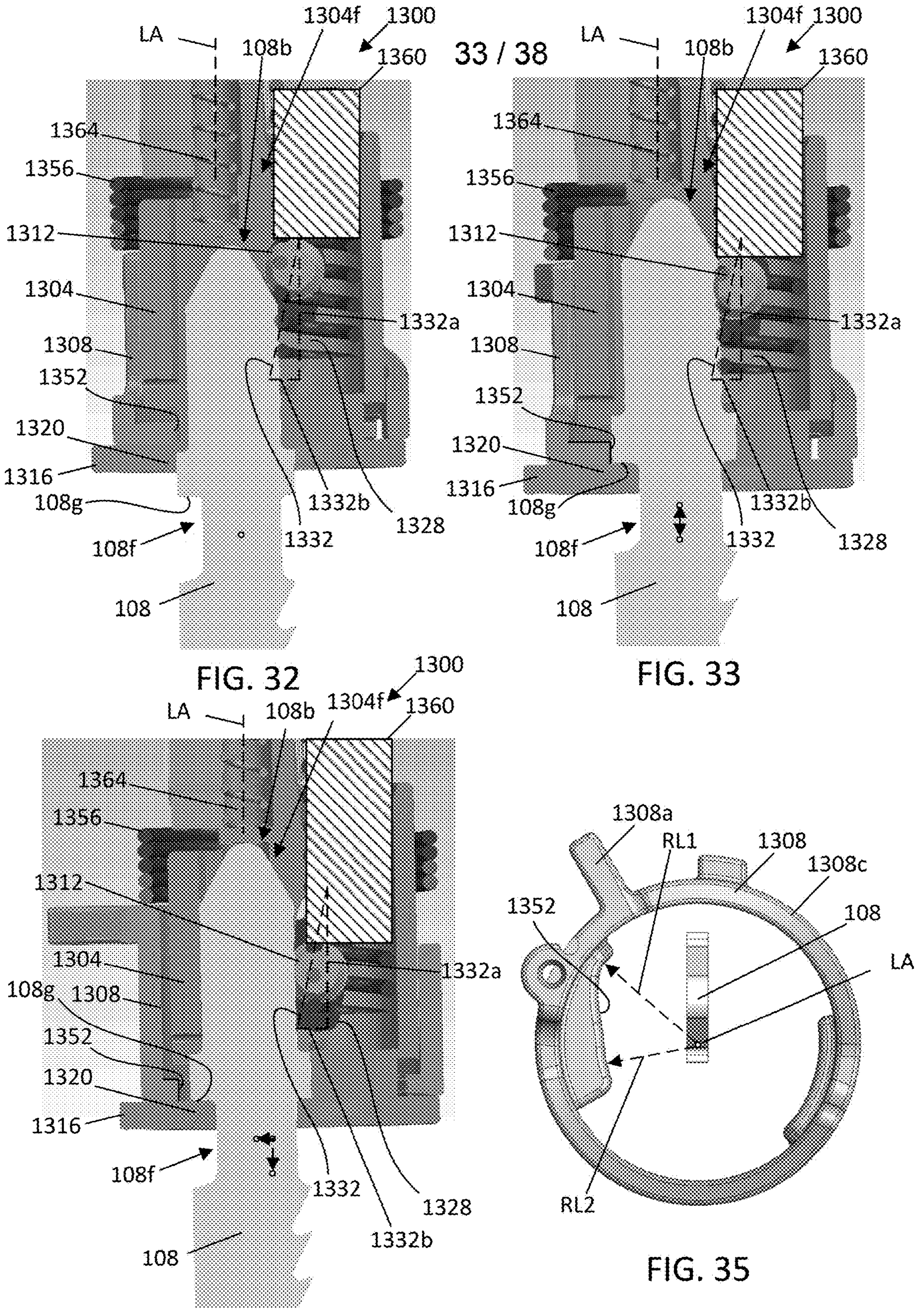
FIG. 32 is a cross-sectional view of the blade change mechanism of FIG. 31 in an unlocked state.
FIG. 33 is a cross-sectional view of the blade change mechanism of FIG. 31 in a transitional state between the unlocked state of FIG. 32 and a locked state.
FIG. 34 is a cross-sectional view of the blade change mechanism of FIG. 31 in the locked position.
FIG. 35 is an end view of a blade and a sleeve of the blade change mechanism of FIG. 31.
Figure 36:
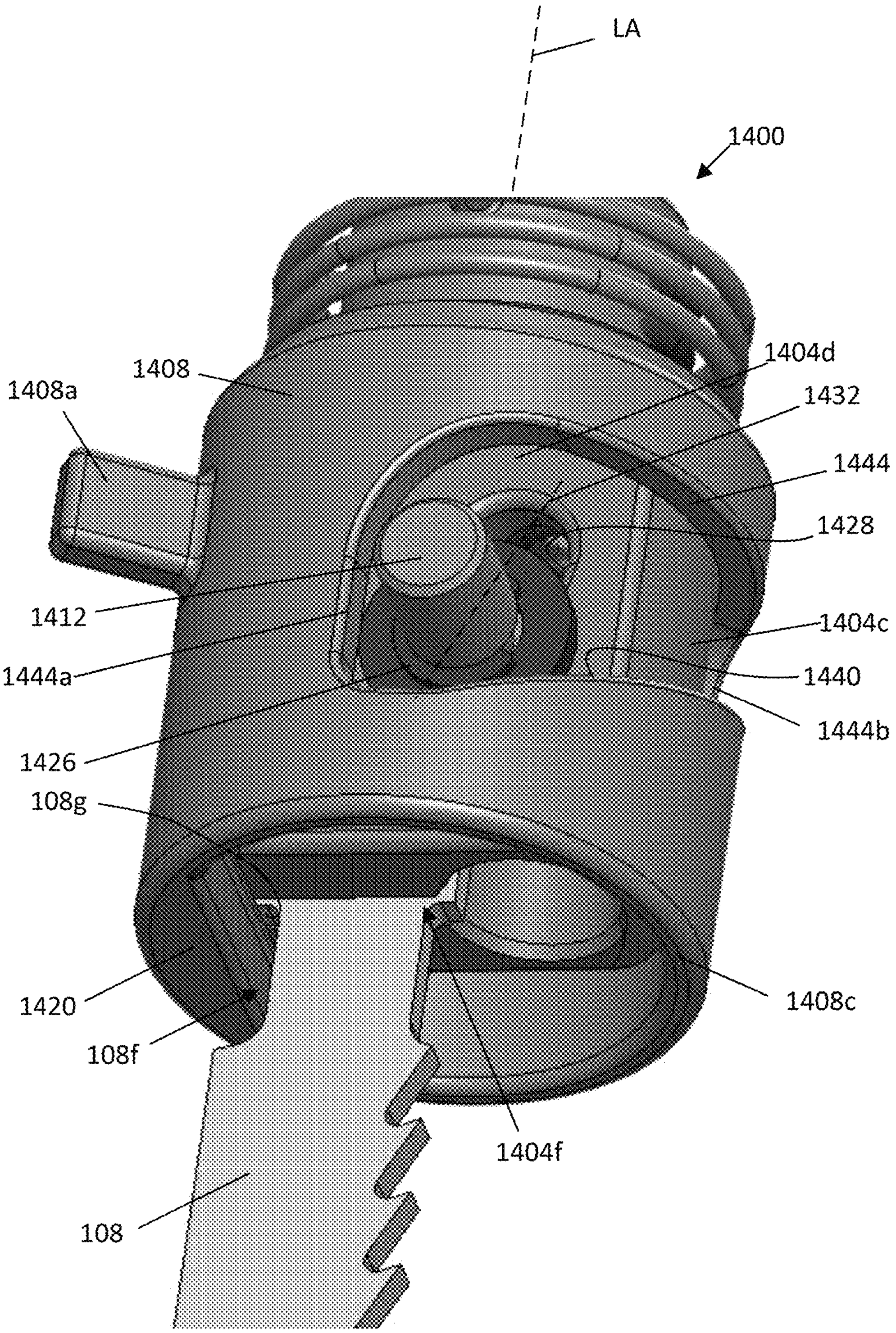
FIG. 36 is a perspective view of another blade change mechanism including a clamp member, a sleeve, and a lock pin.

FIG. 35 illustrates the generally annular shape of the sleeve 1308 in detail. The sleeve 1308 includes annular sidewalls 1308*c*, and cam surface 1352 extending inward from the annular sidewalls 1308*c*. As illustrated by reference lines RL1, RL2 extending from the longitudinal axis LA to the cam surface 1352 at different circumferential positions about the longitudinal axis LA, the cam surface 1352 varies a distance between the sleeve 1308 and the longitudinal axis LA.

FIGS. 32-34 illustrate a transition of the blade change mechanism 1300 from an unlocked state (FIG. 32) prior to insertion of the blade 108, a transition state (FIG. 33), and a locked state where the blade 108 is secured to the blade change mechanism 1300. Prior to insertion of the blade 108, a sleeve spring 1356 (e.g., a torsion spring) biases the sleeve 1308 into a position where the cam surface 1352 is axially aligned with the step 1320. In this position, a pin spring 1360 (e.g., a compression spring) biases the lock pin 1312 to a position ready to be contacted by the blade 108. In the illustrated embodiment, the pin spring 1360 biases the pin 1360 in a direction parallel to the longitudinal axis LA. The blade change mechanism 1300 includes an eject spring 1364 which, in the unlocked state, is relaxed and ready to be loaded by insertion of the blade 108.

The blade change mechanism 1300 is varied to the transition state after the blade 108 is initially inserted into mechanism 1300. Further insertion of the blade 108 causes the sleeve 1308 to automatically rotate to the locked position against the bias of the sleeve spring 1356, which allows the lock pin 1312 to act on the blade 108 (e.g., the blade tang 108*g*) to the shape of the ramped surface 1340. The lock pin 1312 pushes the blade 108 onto the step 1320.

Upon sufficient insertion of the blade 108, the sleeve 1308 rotates until the cam surface 1352 exposes the step 1320. The tang 108*g* of the blade 108 is pushed radially outward by the pin 1312 such that the blade 108 is held in position by the pin 1312 and the step 1320. Bias of the pin spring 1360 contributes to hold the blade 108 in the locked state. More specifically, a vertical component of force from the pin spring 1360 (due to the vertical component 1332*a* of the slot axis 1332) and a horizontal component of force from the pin spring 1360 hold the blade 108 in the locked state.

The blade change mechanism 1300 may be transitioned to the unlocked state by rotating the sleeve 1308 (e.g., via a tab 1308*a*). As the sleeve 1308 is rotated toward a release position corresponding with the unlocked state, the cam surface 1352 pushes the tang 108*g* off of the step 1320 and into the opening 1304*f* in the clamp 1304. Once the tang 108*g* clears the cam surface 1352 and is fully positioned within the opening 1304*f*, the eject spring 1364 ejects the blade 108 from the clamp 1304.

In the illustrated embodiment, over-rotation of the sleeve 1308 relative to the clamp 1304 is inhibited. In one direction, over-rotation is inhibited by contact between the tab 1324 and the projection 1348 (as in FIG. 31). In the opposite direction, over-rotation is inhibited by contact between the lock pin 1312 and the end surface 1344.

FIGS. 36-40 illustrate another blade change mechanism 1400 which may be automatically shifted to a locked state in which the blade 108 is connected to the transmission rod 104*d* upon receipt of the blade 108. The blade change mechanism 1400 is configured to automatically eject the blade 108 upon shifting the blade change mechanism 1400 to an unlocked state. The blade change mechanism 1400 includes a clamp 1404, a sleeve 1408, and a lock pin 1414 which generally operate in a similar manner to that of the blade change mechanism 1300.

Like features and components between the blade change mechanism 1400 and the blade change mechanism 1300 include reference numerals in the '1400' series of reference numerals.

A blade-side end 1408*e* of the sleeve 1408 includes a shoulder 1420 to hold the blade 108 in the locked state. The shoulder 1420 extends radially inwardly from annular sidewalls 1408*c* of the sleeve 1408. The sleeve 1408 includes a fully enclosed window 1444 having a first circumferential end surface 1444*a* and an opposite second circumferential end surface 1444*b*. The ramp surface 1440 extends between the first circumferential end surface 1444*a* and the second circumferential end surface 1444*b*. The ramp surface 1440 is helically dimensioned about the longitudinal axis LA as described above with regard to the ramp surface 1340.

Figure 37:
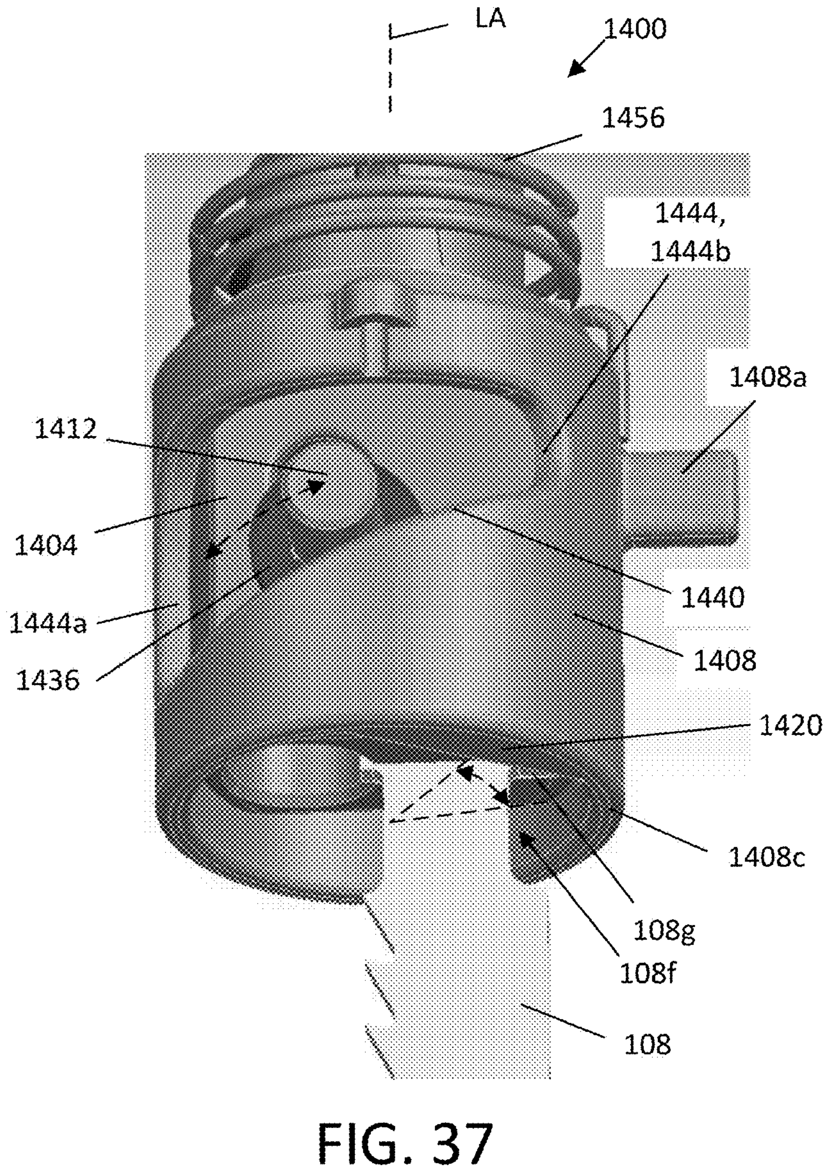
FIG. 37 is a perspective view of the blade change mechanism of FIG. 36 in an unlocked state.
Figure 38:
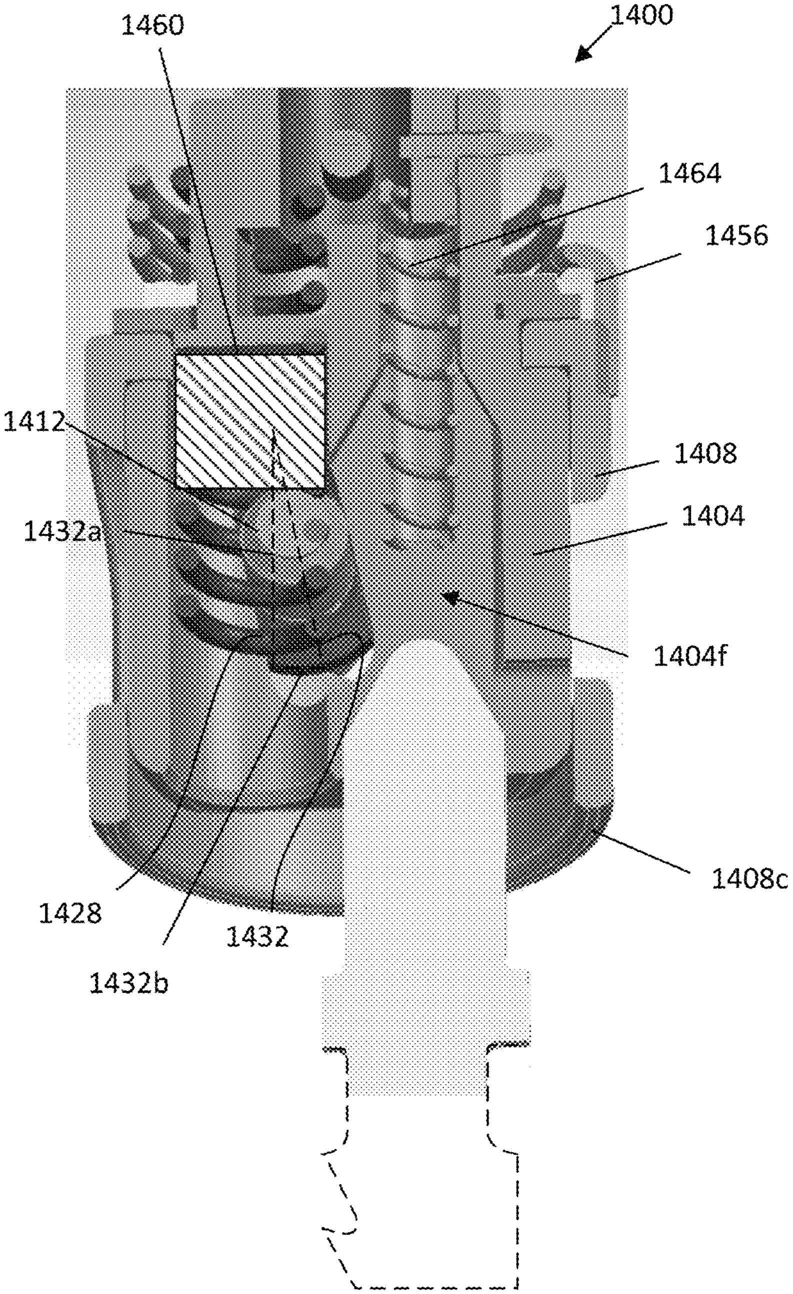
FIG. 38 is a cross-sectional view of the blade change mechanism of FIG. 36 in the unlocked state.
Figure 39:
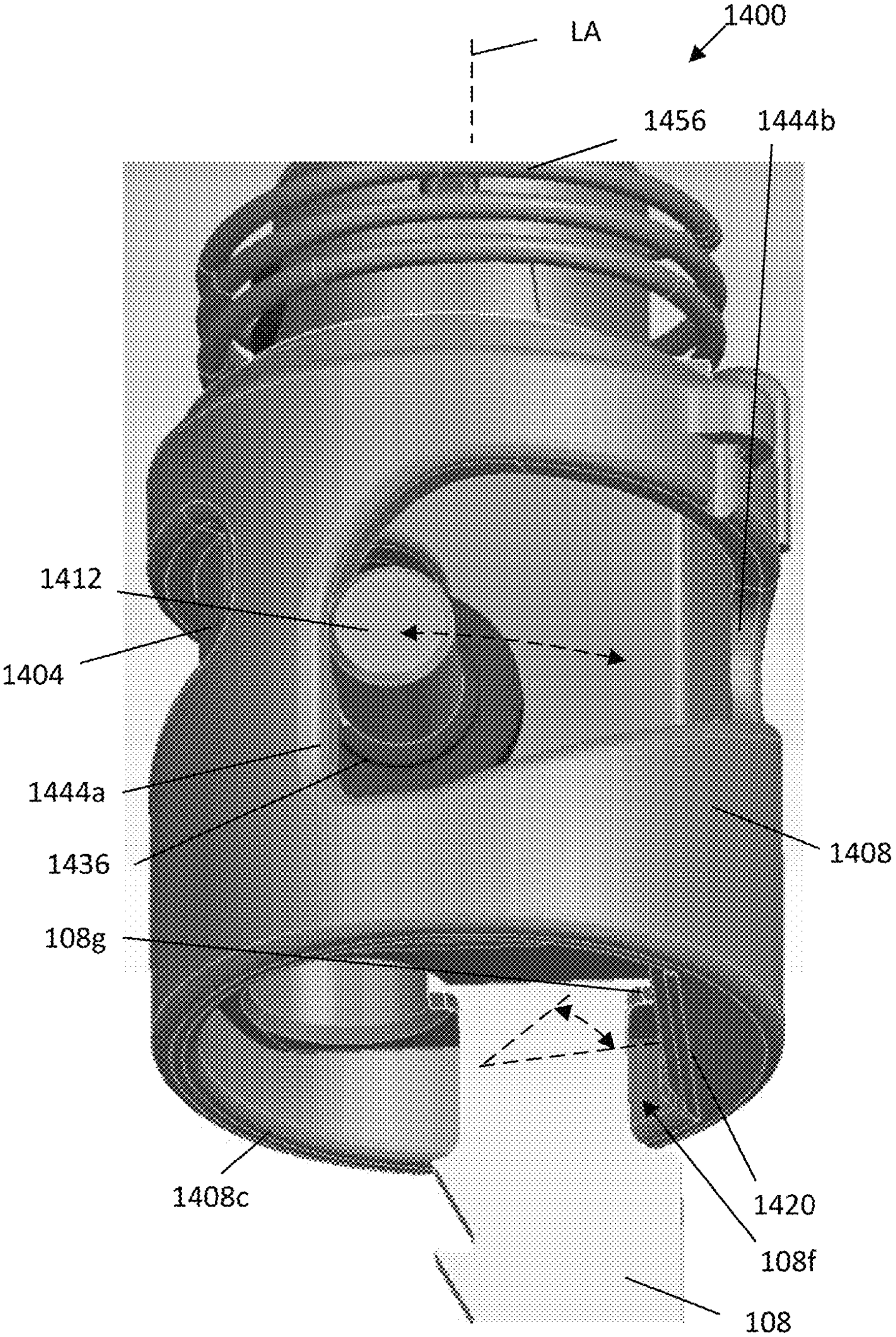
FIG. 39 is a perspective view of the blade change mechanism of FIG. 36 in a locked state.
Figure 40:
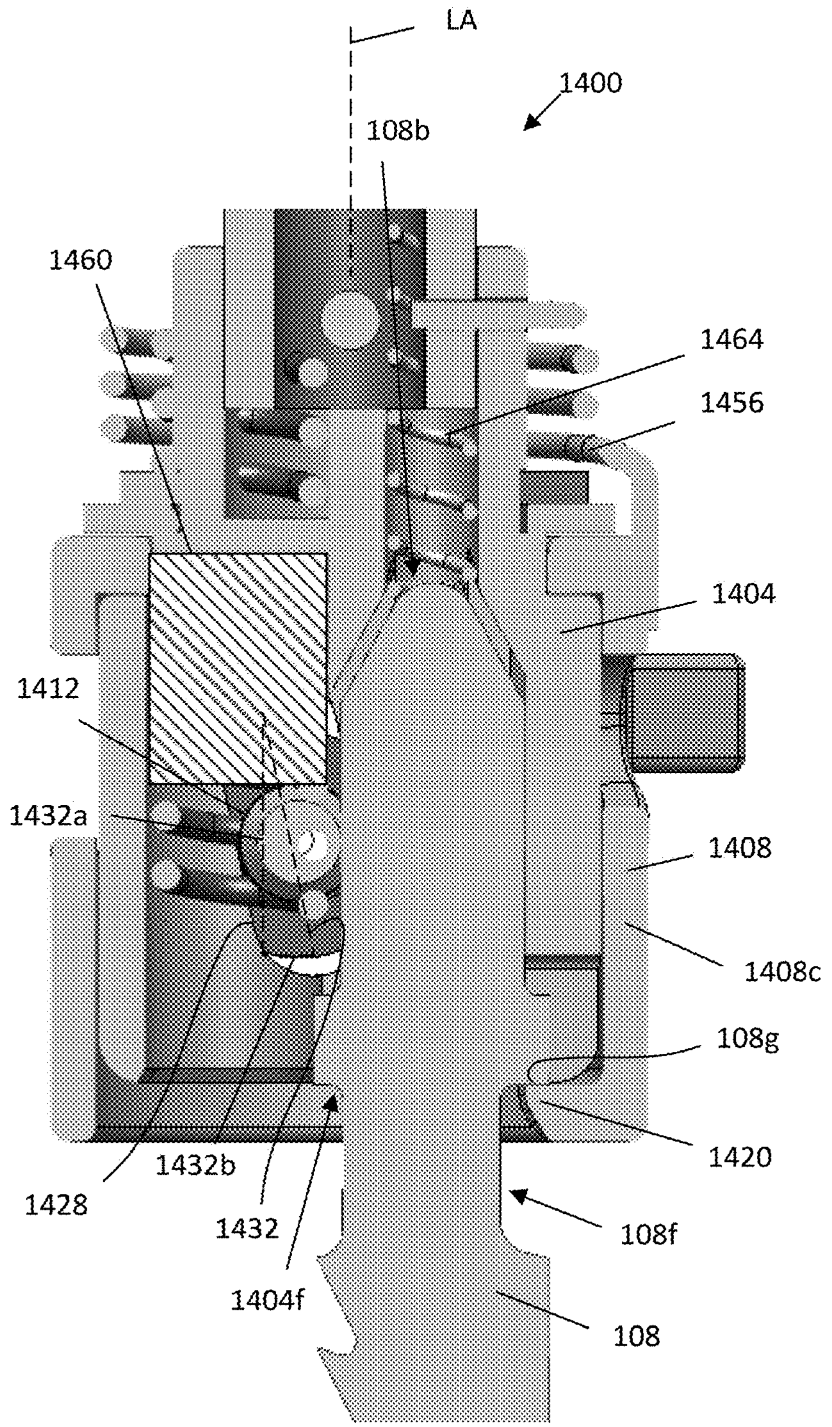
FIG. 40 is a cross-sectional view of the blade change mechanism of FIG. 36 in the locked state.

As illustrated in the unlocked state of FIGS. 37-38, the shoulder 1420 is angularly misaligned with the tang 108*f*. Upon insertion of the blade 108 into an opening 1404*f* of the clamp 1404, the lock pin 1414 is translated along a slot axis 1432 to load a pin spring 1460 and an eject spring 1464. In response to insertion of the blade 108, the sleeve rotates about the longitudinal axis LA to circumferentially align the shoulder 1420 with the tang 108*f*, and the lock pin 1414 presses against the ramp surface 1440 to hold the blade 108 on the shoulder 1420.

On full or sufficient insertion of the blade 108, tang 108*f* clears the shoulder 1420 and is biased by the pin spring 1460 and the lock pin 1414 in a radially outward direction relative to the longitudinal axis LA to be seated on the shoulder 1420.

To release the clamp mechanism 1400 from the locked state, the sleeve 1408 is rotated against the bias force of a sleeve spring 1456 until the shoulder 1420 is circumferentially misaligned with the tang 108*g*. The eject spring 1464 ejects the blade 108 from the opening 1404*f*, and the sleeve spring 1456 biases the sleeve 1408 and lock pin 1414 to their unlocked state.

The reciprocating saw 100 may include any one of the blade change mechanisms 200, 300, 400, 500, 600, 700, 800, 900, 1000, 1100, 1200, 1300, 1400 or a combination of features from any combination of the blade change mechanisms 200, 300, 400, 500, 600, 700, 800, 900, 1000, 1100, 1200, 1300, 1400.

As described above, some or all of the illustrated features may be omitted in a particular implementation within the scope of the present disclosure, and some illustrated features may not be required for implementation of all embodiments. The features described above may be implemented in combinations different from the combinations described above. The instant description does not prohibit implementation in another combination. Additionally, features of the above-described blade change mechanisms 200, 300, 400, 500, 600, 700, 800, 900, 1000, 1100 and the blade change mechanisms 200, 300, 400, 500, 600, 700, 800, 900, 1000, 1100, 1200, 1300, 1400 as a whole may be patentable independent from other features of and the other described blade change mechanisms 200, 300, 400, 500, 600, 700, 800, 900, 1000, 1100, 1200, 1300, 1400.

Although aspects of the disclosure have been described in detail with reference to certain preferred embodiments, variations and modifications exist within the scope of one or more independent aspects as described. It will be appreciated that each feature of the invention may form the basis of one or more claims on its own or in any combination with any other feature or features. The order in which the invention has been described in no way informs the features, alone or in combination, which may be novel and inventive. That is, the order that the invention has been described is only for convenience and should not be construed as limiting regarding what may be claimed.

CLAUSES

Clause 1. A blade change mechanism configured to attach to a blade to a transmission rod of a power tool, the blade change mechanism comprising: a support body; a blade retention structure coupled to the support body and including a blade retention component movable to hold the blade in a locked state in response to engagement of the blade with the blade change mechanism on insertion of the blade; a component movable to vary the blade retention component to hold the blade in the locked state, the component further movable to vary the blade retention component to an unlocked state in which the blade retention structure is disengaged from the blade, wherein the blade retention structure is held in the unlocked state absent the blade being fully inserted into the blade change mechanism.

Clause 2. The blade change mechanism of clause 1, wherein the blade retention component includes a lock pin and the component is an eject sleeve or a cam, and wherein rotation of the eject sleeve or the cam disengages the lock pin from the blade.

Clause 3. The blade change mechanism of clause 2, wherein the eject sleeve or the cam defines a cam surface configured to shift the lock pin to the locked state in which the lock pin is engaged with the blade.

Clause 4. The blade change mechanism of clause 2, wherein the eject sleeve or the cam defines a cam surface configured to shift the lock pin to the unlocked state in response to an unlocking force applied to the eject sleeve or the cam.

Clause 5. The blade change mechanism of clause 1, wherein the blade retention structure includes a lock pin, and wherein the lock pin is configured to automatically engage the blade in response to insertion of the blade into the blade change mechanism.

Clause 6. The blade change mechanism of clause 1, further comprising a trigger sleeve and a spring coupled to the trigger sleeve, wherein the trigger sleeve is movable against a bias force of the spring in response to insertion of the blade into the blade change mechanism to vary the blade retention structure to the locked state, and wherein the trigger sleeve is configured to transition the blade retention structure to the unlocked state in response to movement of the component.

Clause 7. The blade change mechanism of clause 6, wherein the trigger sleeve includes a bar, wherein the bar is configured to contact the blade on engagement of the blade with the blade change mechanism, and wherein the trigger sleeve including a generally annular body, wherein the bar defines a secant of the trigger sleeve as viewed from an end of the trigger sleeve.

Clause 8. The blade change mechanism of clause 7, wherein the trigger sleeve further includes a finger extending in a transverse direction from the bar, the finger being configured to abut a base end and a corresponding finger of the blade.

Clause 9. The blade change mechanism of clause 7, wherein the trigger sleeve further includes a tab configured to engage a cavity of the component to hold the blade retention structure in the unlocked state.

Clause 10. The blade change mechanism of clause 1, wherein the component includes an eject sleeve and the blade change mechanism further comprises a spring coupled to the eject sleeve, wherein the eject sleeve is movable against a bias force of the spring between a loaded state corresponding with the unlocked state of the blade change mechanism and a relaxed state corresponding with the locked state of the blade change mechanism.

Clause 11. The blade change mechanism of clause 1, wherein the blade is automatically ejected from the blade change mechanism as the blade change mechanism is transitioned from the locked state to the unlocked state.

Clause 12. A blade change mechanism configured to attach a blade to a transmission rod of a power tool, the blade change mechanism comprising: a trigger sleeve including a first retaining structure having a tab or a cavity; a cam including a cam surface and a second retaining structure having the other of the tab or the cavity; and a pin movable on movement of the cam between a locked position in which the blade is coupled to the transmission rod, and an unlocked position in which the blade is decoupled from the transmission rod, wherein the pin is movable to the locked position in response to insertion of the blade into the blade change mechanism and movement of the cam and cam surface; and wherein the pin is configured to be held in the unlocked state by engagement of the first retaining structure and the second retaining structure.

Clause 13. The blade change mechanism of clause 13, wherein the cam includes a pin sleeve and each of the first retaining structure and second retaining structure has a plurality of ramps.

Clause 14. The blade change mechanism of clause 13, wherein the cam is rotatable relative to the trigger sleeve to transition the pin between the locked position and the unlocked position.

Clause 15. The blade change mechanism of clause 13, further comprising a spring coupled to the trigger sleeve, wherein the trigger sleeve is movable against a bias force of the spring in response to insertion of the blade into the blade change mechanism to vary the pin to the locked state, and wherein the trigger sleeve is configured to eject the blade in response to movement of the cam and relaxation of the spring.

Clause 16. The blade change mechanism of clause 13, further comprising a spring coupled to the cam, wherein the cam is movable against a bias force of the spring between a loaded state corresponding with the unlocked position of the pin and a relaxed state corresponding with the locked position of the pin.

Clause 17. The blade change mechanism of clause 13, wherein the trigger sleeve includes an annular body with a radially extending portion and an axially extending portion with an inner surface, and wherein the cam has an outer surface interfacing with the axially extending portion of the trigger sleeve in an interference fit to secure the cam to the trigger sleeve.

Clause 18. The blade change mechanism of clause 13, further comprising a bar separate from the trigger sleeve and including one or more arms coupled to the trigger sleeve at least at the axially extending portion, and wherein the bar is configured to contact the blade on insertion of the blade.

Clause 19. A blade change mechanism configured to attach a blade to a transmission rod of a power tool, the blade change mechanism comprising: a body including a plurality of alignment projections; a trigger sleeve including a bar; a cam including a cam surface and an abutment surface; and a pin movable upon movement of the cam between a locked position in which the blade is attached to the transmission rod, and an unlocked position in which the blade is detached from the transmission rod, wherein the pin is moved to the locked position in response to insertion of the blade into the blade change mechanism and movement of the cam and cam surface, and wherein the cam is held in an unlocked state corresponding with the unlocked position of the pin by engagement of the abutment surface and the bar.

Clause 20. The blade change mechanism of clause 19, further including a body having a plurality of alignment projections which inhibit rotation o the bar within the body.

Various features of the invention are set forth in the following claims.

The invention claimed is:

1. A blade change mechanism configured to attach a blade to a transmission rod of a power tool, the blade change mechanism comprising:

a support body;

a front cam;

a rear cam coupled to the front cam;

a trigger sleeve removably engaged with the rear cam opposite the front cam; and a blade retention structure coupled to the support body and including a cam surface, a first spring, and a blade retention component defined at least in part by a lock pin, the blade retention component movable to hold the blade in a locked state in response to engagement of the blade with the blade change mechanism on insertion of the blade; and wherein the rear cam is rotatable via the first spring in response to engagement of the blade with the blade change mechanism to vary the blade retention component to hold the blade in the locked state, the rear cam rotatable via the front cam to vary the blade retention component to an unlocked state in which the blade retention structure is disengaged from the blade, wherein the blade retention structure is held in the unlocked state absent the blade being fully inserted into the blade change mechanism.

2. The blade change mechanism of claim 1, wherein rotation of the rear cam disengages the lock pin from the blade.

3. The blade change mechanism of claim 2, wherein the rear cam defines the cam surface configured to shift the lock pin to the locked state in which the lock pin is engaged with the blade.

4. The blade change mechanism of claim 2, wherein the rear cam defines the cam surface configured to shift the lock pin to the unlocked state in response to an unlocking force applied to the rear cam.

5. The blade change mechanism of claim 1, wherein the lock pin is configured to automatically engage the blade in response to insertion of the blade into the blade change mechanism.

6. The blade change mechanism of claim 1, further comprising a second spring coupled to the trigger sleeve, wherein the trigger sleeve is movable against a bias force of the second spring in response to insertion of the blade into the blade change mechanism to vary the blade retention structure to the locked state, and wherein the trigger sleeve is configured to transition the blade retention structure to the unlocked state in response to movement of the rear cam.

7. The blade change mechanism of claim 6, wherein the trigger sleeve includes a bar, wherein the bar is configured to contact the blade on engagement of the blade with the blade change mechanism, wherein the trigger sleeve including an annular body, and wherein the bar defines a secant of the trigger sleeve as viewed from an end of the trigger sleeve.

8. The blade change mechanism of claim 7, wherein the trigger sleeve further includes a finger extending in a transverse direction from the bar, the finger being configured to abut a base end and a corresponding finger of the blade.

9. The blade change mechanism of claim 7, wherein the trigger sleeve further includes a tab configured to engage a cavity of the rear cam to hold the blade retention structure in the unlocked state.

10. The blade change mechanism of claim 1, wherein the first spring is coupled to the rear cam, wherein the rear cam is movable against a bias force of the first spring between a loaded state corresponding with the unlocked state of the blade change mechanism and a relaxed state corresponding with the locked state of the blade change mechanism.

11. The blade change mechanism of claim 1, wherein the blade is automatically ejected from the blade change mechanism as the blade change mechanism is transitioned from the locked state to the unlocked state.

* * * * *